(12) United States Patent
Zankowski et al.

(10) Patent No.: US 11,028,496 B2
(45) Date of Patent: Jun. 8, 2021

(54) FABRICATION OF SOLID-STATE BATTERY CELLS AND SOLID-STATE BATTERIES

(71) Applicants: IMEC VZW, Leuven (BE); Katholieke Universiteit Leuven, KU LEUVEN R & D, Leuven (BE)

(72) Inventors: Stanislaw Piotr Zankowski, Leuven (BE); Philippe M. Vereecken, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/631,657

(22) PCT Filed: Jul. 13, 2018

(86) PCT No.: PCT/EP2018/069152
§ 371 (c)(1),
(2) Date: Jan. 16, 2020

(87) PCT Pub. No.: WO2019/016101
PCT Pub. Date: Jan. 24, 2019

(65) Prior Publication Data
US 2020/0194773 A1 Jun. 18, 2020

(30) Foreign Application Priority Data

Jul. 18, 2017 (EP) .................................... 17181782

(51) Int. Cl.
*C25D 11/04* (2006.01)
*C23F 1/20* (2006.01)
(Continued)

(52) U.S. Cl.
CPC ............. *C25D 11/045* (2013.01); *C23F 1/20* (2013.01); *C23F 1/28* (2013.01); *C25D 1/006* (2013.01);
(Continued)

(58) Field of Classification Search
None
See application file for complete search history.

(56) References Cited

U.S. PATENT DOCUMENTS

| 4,189,357 A | 2/1980 | Riggs, Jr. |
| 5,069,763 A | 12/1991 | Hradcovsky |

(Continued)

FOREIGN PATENT DOCUMENTS

| EP | 2562851 A1 | 2/2013 |
| EP | 2980014 A1 | 2/2016 |

(Continued)

OTHER PUBLICATIONS

PCT International Search Report and Written Opinion, PCT International Application No. PCT/2018/069152, dated Sep. 28, 2018, 18 pages.

*Primary Examiner* — Roberts P Culbert
(74) *Attorney, Agent, or Firm* — McDonnell Boehnen Hulbert & Berghoff LLP

(57) ABSTRACT

At least one embodiment relates to a method fabricating a solid-state battery cell. The method includes forming a plurality of spaced electrically conductive structures on a substrate. Forming the plurality of spaced electrically conductive structures on the substrate includes transforming at least part of a valve metal layer into a template that includes a plurality of spaced channels aligned longitudinally along a first direction. Transforming at least part of the valve metal layer into the template includes a first anodization step, a second anodization step, an etching step in an etching solution, and a deposition step. The method also includes forming a first layer of active electrode material on the plurality of spaced electrically conductive structures, depositing an electrolyte layer over the first layer of active (Continued)

electrode material, and forming a second layer of active electrode material over the electrolyte later.

20 Claims, 23 Drawing Sheets

(51) Int. Cl.
| | |
|---|---|
| C25D 1/00 | (2006.01) |
| C25D 9/02 | (2006.01) |
| C25D 11/02 | (2006.01) |
| C25D 11/12 | (2006.01) |
| C25D 11/18 | (2006.01) |
| C25D 11/34 | (2006.01) |
| C25D 9/06 | (2006.01) |
| C25D 11/10 | (2006.01) |
| H01M 4/66 | (2006.01) |
| H01M 8/0232 | (2016.01) |
| H01M 8/0247 | (2016.01) |
| C23F 1/28 | (2006.01) |
| C25D 3/12 | (2006.01) |
| C25D 11/24 | (2006.01) |
| H01M 4/04 | (2006.01) |
| H01M 4/80 | (2006.01) |
| B82Y 30/00 | (2011.01) |
| B82Y 40/00 | (2011.01) |

(52) U.S. Cl.
CPC .............. *C25D 3/12* (2013.01); *C25D 9/02* (2013.01); *C25D 9/06* (2013.01); *C25D 11/024* (2013.01); *C25D 11/10* (2013.01); *C25D 11/12* (2013.01); *C25D 11/18* (2013.01); *C25D 11/24* (2013.01); *C25D 11/34* (2013.01); *H01M 4/0404* (2013.01); *H01M 4/045* (2013.01); *H01M 4/0407* (2013.01); *H01M 4/0442* (2013.01); *H01M 4/0452* (2013.01); *H01M 4/0471* (2013.01); *H01M 4/661* (2013.01); *H01M 4/80* (2013.01); *H01M 8/0232* (2013.01); *H01M 8/0247* (2013.01); *B82Y 30/00* (2013.01); *B82Y 40/00* (2013.01)

(56) References Cited

U.S. PATENT DOCUMENTS

| | | | |
|---|---|---|---|
| 2009/0297913 | A1 | 12/2009 | Zhang et al. |
| 2011/0111290 | A1 | 5/2011 | Uchida et al. |
| 2014/0342236 | A1 | 11/2014 | Goyal |
| 2016/0032475 | A1 | 2/2016 | Huyghebaert et al. |

FOREIGN PATENT DOCUMENTS

| | | |
|---|---|---|
| EP | 3026764 A1 | 6/2016 |
| WO | 2009/105773 A2 | 8/2009 |

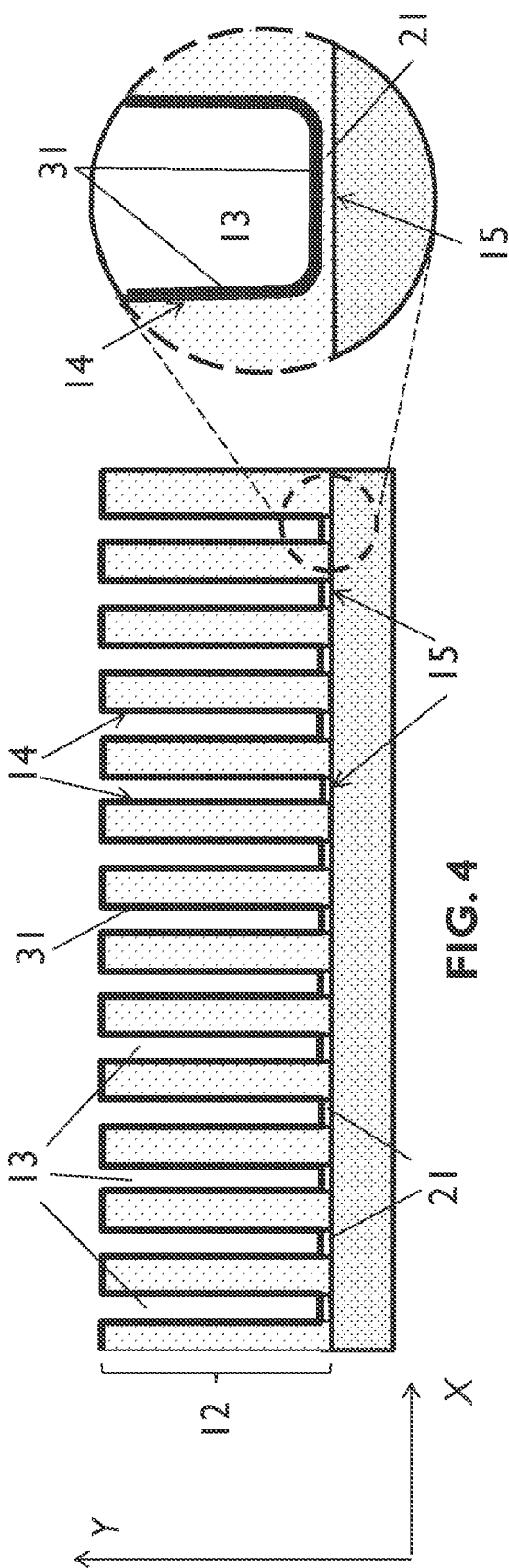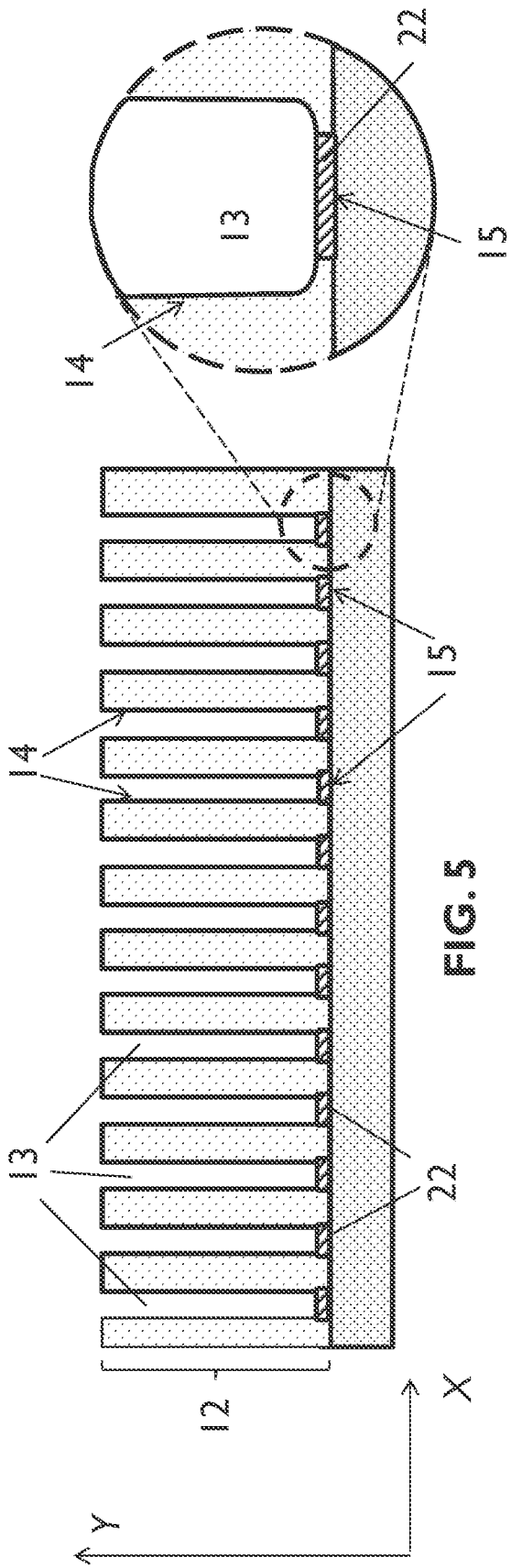

FABRICATION OF SOLID-STATE BATTERY CELLS AND SOLID-STATE BATTERIES

CROSS-REFERENCE TO RELATED APPLICATION

The present application is a national stage entry of PCT/EP2018/069152 filed Jul. 13, 2018, which claims priority to EP 17181782.8 filed on Jul. 18, 2017, the contents of each of which are hereby incorporated by reference.

FIELD

The present disclosure relates to methods for fabricating solid-state battery cells and solid-state batteries comprising a plurality of spaced electrically conductive (nano)structures, with a layer of active electrode material conformally formed thereon, and to solid-state battery cells and solid-state batteries thus obtained.

BACKGROUND

Solid-state batteries, and more in particular thin film solid-state batteries are attractive energy storage devices. Solid-state batteries are based on solid-state battery cells typically comprising a stack of a first current collector layer, a first electrode layer (e.g. a positive active material layer or cathode layer), a solid electrolyte layer, a second electrode layer (e.g. a negative active material layer or anode layer), and a second current collector layer. The batteries may further be encapsulated, such as for example in a polymer package.

In the example of solid-state Li ion insertion battery cells, the current collector layers may comprise a metal foil, such as a foil of aluminum, nickel or copper and the active cathode layer may for example comprise lithiated transition metal oxides or salts, such as lithium manganese oxide (LMO), lithium cobalt oxide (LCO), or lithium iron phosphate (LPO). The anode layer may for example comprise carbon, silicon, spinel lithium titanium oxide (LTO), or metallic lithium. The solid-state electrolyte may comprise glassy, ceramic, crystalline, or polymer lithium-containing materials. Due to the high electric and ionic resistivity of the active materials, the anode and cathode layer thicknesses are limited to less than 5 micrometers. This results in a limited energy and power density of the thin film solid-state battery cells.

To overcome these limitations, three-dimensional electrode structuring has been proposed to increase the surface area of the electrodes, thus increasing the amount of the active materials present in a unit area of a battery cell. In such three-dimensional approach, one of the main manufacturing challenges is conformal coating of battery materials on the three-dimensional electrode surfaces. Another challenge is the need for advanced, low-cost, methods for manufacturing the three-dimensional electrode structures.

A three-dimensional electrode structure may for example comprise or consist of a plurality of electrically conductive nanowires oriented along a same direction and being closely spaced, for example with a spacing between neighboring nanowires smaller than the nanowire length, such as for example a spacing that is a factor of 1.2 to 10 smaller than the nanowire length. A relatively cheap method for manufacturing such plurality of electrically conductive nanowires comprises electroplating of a metal in a porous anodic aluminum oxide (AAO) template formed by anodization of an aluminum foil. Up to 100 micrometer thick porous aluminum oxide templates can be produced. However, the pores or channels of the templates produced by anodization of aluminum foils are always covered with an insulating aluminum oxide barrier layer having a thickness of tens to hundreds of nanometers. This barrier layer may be removed from the channel bottoms to enable subsequent formation of the plurality of electrically conductive nanowires by electroplating.

Various methods are known for removing the barrier layer from the channel bottoms, without separation of the template from the underlying remaining part (non-anodized part) of the aluminum foil. For example, the voltage used in the anodization process may be gradually reduced during the final stage of anodization. This results in a reduction of the interpore distance and of the pore size at a bottom of the channels, with a barrier layer of smaller thickness, for example 1 nm or less. Such barrier layer thickness is sufficiently small to allow electroplating of a metal inside the channels or pores. However, this approach results in nanowires poorly connected to the substrate, through long (hundreds of nanometers long) root-like, thin (a few nm in diameter) nanowires. This may result in poor mechanical stability of the nanowires network, prone to delamination from the substrate.

Another method for removing the barrier layer from the channel bottoms of the template comprises thinning the barrier layer by immersing the template in a $H_3PO_4$ solution that slowly etches the barrier layer. This, however, results in excessive pore widening, resulting in nanowires formed in such a template that have a rather large diameter and that fill most of the volume. This limits the volume remaining available for the active electrode material to be coated thereon, eventually limiting the energy density of the electrode.

Yet another method for removing the barrier layer from the channel bottoms of the template comprises separation of the template from the underlying remaining part (non-anodized part) of the aluminum foil. According to this method, the aluminum foil is removed, e.g. dissolved, after formation of the porous template. This results in a fragile, free standing template with an exposed barrier layer at one side and open pores at another side. The exposed barrier layer is then removed, for example by single-side etching in a diluted $H_3PO_4$ solution, and a thin metal layer is deposited to act as a working electrode for subsequent electrodeposition of metallic nanowires in the template. However, the fragility of the free-standing template makes this method hard to implement in large-scale manufacturing.

Hence, there is a need for a method that allows removing the barrier layer from the channel bottoms of a porous anodic template for subsequent formation therein of a plurality of spaced nanowires e.g. by electroplating, wherein pore widening is avoided at one hand, wherein pore narrowing is avoided on the other hand, and wherein the method is suitable for implementation in large-scale manufacturing.

In a method for fabricating solid-state batteries having a three-dimensional electrode structure, there is a need for forming an active electrode material layer on the three-dimensional electrode structure. The active electrode material layer may be formed by a process that allows conformal deposition. A method that can be used is electroplating. For example, in case of Li ion insertion electrodes, manganese oxide ($MnO_x$ with $1 \leq x \leq 2$) may be used as a cathode precursor material, which is then further transformed into an active lithium manganese oxide (LMO) electrode material upon conversion with lithium (lithiation).

In large-scale manufacturing of commercial batteries, a hot acidic bath containing $MnSO_4$ and $H_2SO_4$ is typically used for the synthesis of $MnO_x$. However, due to the acidic nature of the bath, electrodeposition cannot be carried out on most metals, due to their inherent oxidation and dissolution in an acidic environment upon application of an anodic current. The only metals suitable for anodic deposition of $MnO_2$ from acidic baths are the noble metals such as Pt or Au or metals forming a stable, dense passive oxide layer on their surface, such as titanium. However, these metals are either very expensive (noble metals) or very difficult to electrodeposit (titanium).

Other methods for the fabrication of manganese oxide cathode precursors use neutral manganese baths based on organic complexes of $Mn^{2+}$, such as acetates or citrates. These baths, having a pH close to 7, can be used to electroplate $MnO_x$ precursors on less noble metals, such as Ni. However, due to the near-neutral pH of such baths and due to the presence of dissolved oxygen, these solutions are not stable and, upon time, $MnO_x$ precipitates are formed in the bath. This substantially limits the applicability of these baths for large-scale manufacturing, where stability of the baths is important from an economical and industrial point of view. The change in composition of the bath may also lead to changes in electroplating kinetics, resulting in poor reproducibility.

Further, in a method for fabricating solid-state batteries an annealing step (lithiation step) is typically done after deposition of the cathode precursor material on the electrode structure, to thereby activate (lithiate) the cathode precursor material and form an active (lithiated) cathode material. When using a non-noble metal such as for example a transition metal for forming the electrode structure, such annealing step may lead to thermal degradation (e.g. due to oxidation or another chemical reaction) of the electrode structure.

Hence, there is a need for a method that allows forming a layer of active electrode material on a broad range of metals, wherein the method may be a low-cost process suitable for large-scale manufacturing and wherein the method allows substantially conformal deposition. Further, there is a need for a method with a reduced risk of degradation of the electrode material during subsequent processing, such as annealing.

SUMMARY

The present disclosure provides solid-state battery cells and solid-state batteries comprising a plurality of spaced electrically conductive (nano)structures, for example formed of a transition metal, with a layer of active electrode material conformally coated thereon, and to provide methods for fabricating such solid-state battery cells and batteries.

The above is at least partially accomplished by methods and devices according to the present disclosure.

According to a first aspect, the present disclosure is related to a method for transforming at least part of a valve metal layer into a template comprising a plurality of spaced channels aligned longitudinally along a first direction. A method according to the first aspect of the present disclosure comprises a first anodization step anodizing at least part of the valve metal layer in the thickness direction and thereby forming a porous layer of valve metal oxide comprising a plurality of channels, each channel having channel walls aligned longitudinally along the first direction and having a channel bottom, the channel bottoms being coated with a first insulating metal oxide barrier layer as a result of the first anodization step; next a protective treatment inducing hydrophobic surfaces to the channel walls and channel bottoms; a second anodization step after the protective treatment, thereby substantially removing the first insulating metal oxide barrier layer from the channel bottoms and inducing anodization only at the bottoms of the plurality of channels and creating a second insulating metal oxide barrier layer at the channel bottoms; and an etching step in an acidic etching solution or in a basic etching solution, thereby removing the second insulating metal oxide barrier layer from the channel bottoms. The plurality of spaced channels may for example comprise a plurality of spaced nanochannels.

In the context of the present disclosure, a valve metal is a metal selected from the group of aluminum, tungsten, titanium, tantalum, hafnium, niobium, vanadium, and zirconium. In the context of the present disclosure, a valve metal layer is a layer comprising a valve metal or a valve metal alloy. A valve metal layer may be a single layer or it may be a layer stack comprising at least two valve metal layers. In some embodiments of a method of the first aspect of the present disclosure a valve metal layer comprising a layer of aluminum, an aluminum alloy, titanium, a titanium alloy, tantalum, or a tantalum alloy may be used.

In embodiments of a method of the first aspect, performing the protective treatment may comprise annealing at a temperature in the range between 300° C. and 550° C.

In embodiments of a method of the first aspect, performing the protective treatment may comprise depositing a protective layer over the channel walls and over the channel bottoms. In such embodiments, the second anodization step additionally removes the protective layer only from the channel bottoms.

Some embodiments of the method of the first aspect of the present disclosure allow for removing a barrier layer from the channel bottoms of a template formed by anodization, wherein the barrier layer can be removed with a limited pore widening at one hand and with a limited pore narrowing on the other hand. This results in a template comprising a plurality of spaced channels having a diameter that is substantially constant along their entire length, i.e. up to the bottom.

A limited pore narrowing may allow for forming afterwards a plurality of structures inside the plurality of channels with mechanical stability, a limited risk of delamination from an underlying substrate, and with an electrical and mechanical contact with the underlying substrate, for example an electrically conductive underlying substrate.

A limited pore widening may result in a template comprising a plurality of spaced channels having a diameter (corresponding to a final pore diameter) that is smaller than, e.g. substantially smaller than, a spacing between neighboring channels (wherein the spacing is defined here as a distance between facing channel walls). This may allow for forming afterwards a plurality of structures inside the plurality of channels of the template that take in a reduced volume as compared to alternate templates wherein pore widening results in channels being spaced at a distance that is typically smaller than their diameter. A plurality of structures may allow for taking in a reduced volume that an increased volume remains available between the structures, e.g. for deposition of an additional layer or additional layers. For example, a plurality of structures formed inside the plurality of channels may be used as a current collector in electrochemical devices such as for example electrochemical sensors, batteries, supercapacitors, fuel cells, (photo)

electrolyzers, or chemical reactors. The increased volume available between the structures may then for example be utilized for providing a layer of functional material, such as a layer of active electrode material or an electrolyte material, the present disclosure not being limited thereto.

A method of the first aspect of the present disclosure may be relatively straightforward. It may not require sophisticated equipment or vacuum equipment and it is therefore potentially low-cost. It is suitable for implementation in large-scale manufacturing.

A method of the first aspect of the present disclosure may provide for the use of an anodization based process for forming the template allows for control of a diameter of the plurality of spaced channels and a distance between neighboring channels by controlling a voltage or a current used during anodization. A method of the first aspect of the present disclosure may allow for the use of an anodization based process for forming the template allows for control of a depth of the plurality of spaced channels by controlling a duration of the first anodization step.

In embodiments of a method of the first aspect wherein performing the protective treatment comprises depositing a protective layer on the channel walls and on the channel bottoms, the protective layer may for example comprise hydrophobic silane or a polymer that is resistant to the etching solution, such as for example polystyrene, poly (methyl 2-methylpropanoate), or poly(dimethylsiloxane).

In embodiments of a method of the first aspect of the present disclosure the etching solution may be an aqueous solution, which may allow the to be formed without the use of organic solvents, resulting in an environmentally friendly method. The aqueous etching solution may for example be an acidic etching solution comprising phosphoric acid, sulfuric acid, oxalic acid, or chromic acid, or a combination thereof. Alternatively, the etching solution may be a basic etching solution e.g. comprising ammonia, hydrogen peroxide, potassium hydroxide, or a combination thereof.

In embodiments of a method of the first aspect the etching solution may further comprise a surface tension adjusting agent, which may allow the surface tension adjusting agent to facilitate penetration of the etching solution inside the plurality of channels towards the channel bottoms. The surface tension adjusting agent may for example be selected from ethyl alcohol, isopropyl alcohol, acetone, and sodium dodecyl sulphate, the present disclosure not being limited thereto.

Embodiments of a method of the first aspect of the present disclosure may further comprise providing ultrasonic waves during the second anodization step, which may facilitate removal of the first insulating metal oxide barrier layer and, if present, removal of the protective layer, from the channel bottoms during the second anodization step. It may further facilitate removal of the second insulating metal oxide barrier layer from the channel bottoms during the etching step. Embodiments of a method of the first aspect of the present disclosure may comprise providing ultrasonic waves during the first anodization step. Embodiments of a method of the first aspect of the present disclosure may comprise providing ultrasonic waves during both the first anodization step and the second anodization step.

In embodiments of a method of the first aspect of the present disclosure the first anodization step may anodize only a part of the valve metal layer in the thickness direction, to thereby form the template and defining a substrate supporting the template, wherein the substrate comprises a remaining, non-anodized part of the valve metal layer. This may allow the formation of templates from a free-standing metal layer such as a free-standing metal foil, e.g. a free-standing aluminum foil. In such embodiments, the need for providing a separate substrate supporting the valve metal layer may be reduced, which may lead to a reduced cost. Using a free-standing layer of metal may allow an anodizing of the layer at two opposite sides or surfaces, thus allowing the formation of a stack comprising a first porous layer of valve metal oxide (first template), a non-anodized valve metal layer (substrate) and a second porous layer of valve metal oxide (second template). Such a stack comprising a first template and a second template at opposite substrate sides may for example be used for forming a plurality of spaced (nano)structures in a fabrication process of solid-state batteries comprising a stack of battery cells. Such embodiments may include a single substrate that provides support for nanostructures (the nanostructures e.g. having the function of a current collector) at both sides of the substrate, thus reducing the volume occupied by substrate material per battery cell.

In other embodiments of a method of the first aspect of the present disclosure the valve metal layer may be provided on an electrically conductive substrate. In this context, "electrically conductive substrate" also includes any substrate comprising an electrically conductive layer at an exposed surface thereof. In such embodiments, the first anodization step may anodize the valve metal layer throughout the layer in the thickness direction, to thereby form a porous layer of valve metal oxide comprising a plurality of channels, each channel having channel walls aligned longitudinally along the first direction and having a channel bottom, the channel bottoms being located at an interface between the valve metal layer and the underlying electrically conductive layer or substrate. In such embodiments, the etching step exposes the electrically conductive layer at the channel bottoms. The electrically conductive layer may for example be a titanium nitride layer, a titanium layer, a nickel layer, an indium tin oxide layer, a gold layer, or a platinum layer, the present disclosure not being limited thereto.

According to a second aspect, the present disclosure is related to a template comprising a plurality of spaced channels aligned longitudinally along a first direction, wherein the template is obtainable by a method according to an embodiment of the first aspect of the present disclosure.

In general, features of the second aspect of the present disclosure provide similar advantages as discussed above in relation to the first aspect of the present disclosure.

In some embodiments, the template of the second aspect of the present disclosure may provide that the plurality of spaced channels have a diameter that is substantially constant along their entire length, i.e. up to the bottom, and that they may have a channel bottom free of any barrier layer, i.e. exposing an underlying substrate. This may allow for the formation afterwards of a plurality of structures inside the plurality of channels with mechanical stability, a limited risk of delamination from an underlying substrate, and with an electrical and mechanical contact with the underlying substrate, for example an electrically conductive underlying substrate.

In some embodiments of the template of the second aspect, the plurality of spaced channels may have a diameter that is smaller than, e.g. substantially smaller than, a spacing between neighboring channels (wherein the spacing is defined here as a distance between facing channel walls). This may allow for the formation afterwards of a plurality of structures inside the plurality of channels of the template that take in a reduced volume as compared to alternate templates wherein pore widening results in channels being spaced at a distance that is typically smaller than their diameter. In some embodiments, a plurality of structures may take in a reduced volume such that an increased volume remains available between the structures, e.g. for deposition of an additional layer or additional layers. For example, a plurality of structures formed inside the plurality of channels may be used as a current collector in electrochemical devices such as electrochemical sensors, batteries, supercapacitors, fuel cells, (photo)electrolyzers, or chemical reactors. The increased volume available between the structures may then for example be utilized for providing a layer of functional material, such as for example a layer of active electrode material or an electrolyte material, the present disclosure not being limited thereto.

In embodiments of a template of the second aspect of the present disclosure, the first direction may be at an angle in the range between 60° and 90°, for example between 80° and 90°, with respect to a surface of the valve metal layer from which the template is formed. For example, the first direction may be substantially orthogonal to a surface of the valve metal layer.

In embodiments of a template of the second aspect of the present disclosure, the template may further comprise a plurality of interconnecting channels oriented along a second direction different from the first direction, wherein the interconnecting channels form a connection between neighboring spaced channels oriented along the first direction. The second direction may for example be substantially orthogonal to the first direction. A template comprising such interconnecting channels may allow for a formation afterwards of a plurality of interconnected structures inside the plurality of channels of the template. Such plurality of interconnected structures may for example form a mesh-shaped structure.

According to a third aspect, the present disclosure is related to a method for forming a plurality of spaced structures on a substrate. A method according to the third aspect of the present disclosure comprises transforming at least part of a valve metal layer into a template comprising a plurality of spaced channels aligned longitudinally along a first direction according to an embodiment of the first aspect of the present disclosure, thereby forming the template and defining the substrate, and depositing a solid functional material within the channels of the template to thereby form the plurality of spaced structures inside the plurality of spaced channels. This results in a plurality of spaced structures being aligned longitudinally along the first direction. The method may further comprise removing the template by etching. Examples of spaced electrically conductive structures that may be formed using a method of the third aspect of the present disclosure are pillars, nanopillars, wires, nanowires, tubes (or "hollow" wires), nanotubes, meshes, and nanomeshes.

In the context of the third aspect of the present disclosure, a functional material or functional material layer is a material or material layer that satisfies or provides a defined functionality and/or has defined properties, adjusted for a device in which it is integrated.

In embodiments of a method of the third aspect of the present disclosure, depositing the solid functional material within the channels of the template may comprise depositing an electrically conductive material, a semiconductor material, an electrically insulating material, or a combination thereof.

In embodiments, depositing the solid functional material within the channels of the template may comprise filling the channels with the solid functional material, e.g. completely filling the channels in a lateral direction orthogonal to the first direction. In embodiments, depositing the solid functional material within the channels may comprise depositing a layer of solid functional material on the channel walls, thereby only partially filling the channels in a lateral direction with the solid functional material and leaving openings inside.

In embodiments of a method of the third aspect of the present disclosure, depositing the solid functional material within the channels of the template may comprise depositing an electrically conductive material by galvanostatic or potentiostatic electrodeposition or plating, to thereby form a plurality of spaced electrically conductive structures. In such embodiments, a low-resistance electrical contact may be established between the plurality of spaced electrically conductive structures and an underlying electrically conductive substrate. The electrical contact may for example have a contact sheet resistance lower than 1 Ohm $cm^2$.

In general, features of the third aspect of the present disclosure provide similar advantages as discussed above in relation to the previous aspects of the present disclosure.

A method of the third aspect of the present disclosure may allow for the formation of a plurality of spaced structures on a substrate with mechanical stability, a limited risk of delamination from the underlying substrate, and mechanical contact with the underlying substrate. A method of the third aspect of the present disclosure may allow for the formation of a plurality of spaced electrically conductive structures with an electrical contact to an underlying electrically conductive substrate, such as for example with a contact sheet resistance lower than 1 Ohm $cm^2$. A method of the third aspect of the present disclosure may allow for the formation of a plurality of spaced structures, e.g. electrically conductive structures, taking in a relatively limited volume, thereby leaving an increased volume available in between the plurality of spaced structures, for example for deposition of an additional layer, e.g. an additional layer of functional material, such as e.g. a layer of active electrode material.

A method of the third aspect of the present disclosure may be relatively straightforward. It may not require sophisticated equipment or vacuum equipment and is therefore potentially low-cost. It is suitable for implementation in large-scale manufacturing.

A method of the third aspect of the present disclosure may allow for control of a diameter and a length (height) of the plurality of spaced structures, e.g. electrically conductive structures, and of a distance between neighboring structures. This may enable, for example, control of the energy density and power density of a battery cell having a current collector comprising such a plurality of spaced electrically conductive structures.

In embodiments of the method of the third aspect of the present disclosure the electrically conductive material deposited within the channels of the template to thereby form the plurality of spaced electrically conductive structures may be a transition metal, which may result in a reduced cost. Further, this may allow for a reduction in a cost of battery cells having a current collector comprising such plurality of spaced electrically conductive transition metal structures. In embodiments of the third aspect of the present disclosure the transition metal may for example be selected from nickel, copper, and chromium.

According to a fourth aspect, the present disclosure is related to an entity comprising a substrate with a plurality of spaced structures thereon, the plurality of spaced structures being aligned longitudinally along a first direction and being obtainable by a method according to an embodiment of the third aspect of the present disclosure.

In general, features of the fourth aspect of the present disclosure provide similar advantages as discussed above in relation to the previous aspects of the present disclosure.

In embodiments of an entity of the fourth aspect of the present disclosure the first direction may be at an angle in the range between 60 and 90, for example between 80 and 90, with respect to a surface of the substrate. For example, the first direction may be substantially orthogonal to a surface of the substrate.

In embodiments of an entity of the fourth aspect of the present disclosure, the entity may further comprise a plurality of interconnecting structures oriented along a second direction different from the first direction, wherein the interconnecting structures form a connection between neighboring spaced structures oriented along the first direction, thereby forming for example a mesh-shaped structure. The second direction may for example be substantially orthogonal to the first direction, the present disclosure not being limited thereto, In embodiments of the fourth aspect of the present disclosure the plurality of spaced structures and, if present, the plurality of interconnecting structures, may comprise an electrically conductive material, a semiconductor material, an electrically insulating material, or a combination thereof.

According to a fifth aspect, the present disclosure is related to a device comprising an entity according to the fourth aspect of the present disclosure. In embodiments of the fifth aspect of the present disclosure the device may for example be an electrochemical device, such as e.g. an electrochemical sensor, a battery, a supercapacitor, a fuel cell, an electrolyzer, a photo-electrolyzer, or a chemical reactor, the present disclosure not being limited thereto.

In general, features of the fifth aspect of the present disclosure provide similar advantages as discussed above in relation to the previous aspects of the present disclosure.

According to a sixth aspect, the present disclosure is related to a method for forming a layer of a functional material on an electrically conductive substrate, such as for example on a transition metal substrate. A method according to the sixth aspect of the present disclosure comprises depositing an interlayer on the substrate, wherein the interlayer comprises a transition metal oxide, a noble metal, or a noble-metal oxide, and wherein the interlayer has a thickness in the range between 0.5 nm and 30 nm, for example in the range between 0.5 nm and 10 nm; depositing a functional material precursor layer on the interlayer; and activating the functional material precursor layer by annealing to thereby form the layer of functional material.

In embodiments of the method of the sixth aspect of the present disclosure the layer of functional material may for example be a layer of active electrode material. In such embodiments depositing the functional material precursor layer comprises depositing an electrode material precursor layer. The annealing step for activating the electrode material precursor layer may be done in the presence of an ion containing precursor, such as for example a lithium containing precursor, a sodium containing precursor or a magnesium containing precursor, the present disclosure not being limited thereto. In embodiments of the sixth aspect of the present disclosure the electrode material may be a cathode material or an anode material. The functional material precursor layer may be a layer of cathode precursor material, for example comprising manganese oxide, manganese dioxide, cobalt oxide, manganese nickel oxide, or iron phosphate, or it may be a layer of anode precursor material.

In general, features of the sixth aspect of the present disclosure provide similar advantages as discussed above in relation to the previous aspects of the present disclosure.

Providing an interlayer in accordance with a method of the sixth aspect of the present disclosure may result in a reduced risk of degradation of the underlying electrically conductive substrate material, such as for example a reduced risk of oxidation of the electrically conductive substrate material. The electrically conductive substrate may for example be used as a current collector of a battery cell. Providing an interlayer in accordance with a method of the sixth aspect of the present disclosure may result in a reduced risk of degradation (e.g. oxidation) of the current collector material, for example under the influence of the step of activating the layer of electrode precursor material by annealing.

Providing an interlayer in accordance with a method of the sixth aspect of the present disclosure may result in a reduced risk of degradation of the underlying electrically conductive substrate material, e.g. current collector material, under the influence of an electrochemical deposition process, as may for example be used for depositing the functional material precursor layer. Such electrochemical deposition process may for example comprise deposition in an acidic bath, for example for depositing the layer of electrode precursor material (electrode material precursor layer), the present disclosure not being limited thereto.

In embodiments of the sixth aspect of the present disclosure depositing the functional material precursor layer, e.g. layer of electrode precursor material, may comprise anodic electrodeposition from an acidic solution or from a basic solution, where anodic electrodeposition may be a low-cost process suitable for large scale manufacturing. In some embodiments, the use of an acidic solution may offer stability of the electrodeposition bath.

A method of the sixth aspect of the present disclosure may allow for the formation of a functional material layer, such as a layer of active electrode material, on a broad range of metals, including for example relatively cheap transition metals. This further allows for example reducing a cost of battery cells having a current collector structure comprising such plurality of spaced electrically conductive transition metal structures.

A method of the sixth aspect of the present disclosure may allow for the conformal formation of a layer of functional material on a large variety of metal substrates, including transition metal substrates, for example on three-dimensional transition metal substrates. More in particular, a method of the sixth aspect of the present disclosure may allow for the conformal formation of a layer of active cathode material on a large variety of metal substrates, including transition metal substrates, for example on three-dimensional transition metal substrates This is may allow for the fabrication of solid-state battery cells with an improved energy density and power density (e.g. unlike alternative fabrication techniques where an active anode material is formed on a three-dimensional substrate). This is related to a generally lower capacity of cathode materials as compared to anode materials. Therefore, three-dimensional structuring of a cathode layer may enhance the capacity, energy density and power density of a battery cell as compared to an approach wherein only the anode layer is three-dimensionally structured and not the cathode layer.

In embodiments of the sixth aspect of the present disclosure the electrically conductive substrate may be a three-dimensional substrate comprising a plurality of spaced electrically conductive structures being substantially aligned along a first direction, which may result in a substantially increased electrode surface area as compared to flat substrates, which may further lead to substantially higher charging rates of solid-state battery cells comprising such three-dimensional electrode structure. In embodiments of the sixth aspect of the present disclosure the electrically conductive substrate may further comprise a plurality of electrically conductive interconnecting structures oriented along a second direction different from the first direction, such as for example substantially orthogonal to the first direction, wherein the electrically conductive interconnecting structures form a connection between neighboring electrically conductive structures oriented along the first direction.

Examples of spaced electrically conductive structures are pillars, nanopillars, wires, nanowires, tubes (or "hollow" wires), nanotubes, meshes, and nanomeshes. Such structures may enable the formation of flexible battery cells, due to a reduced mechanical stress upon bending.

In embodiments of the sixth aspect of the present disclosure wherein the interlayer comprises a transition metal oxide, depositing the interlayer may for example comprise electrodeposition in a solution having a pH in the range of 7 to 12. The use of a neutral or basic solution for depositing the interlayer on the substrate, e.g. transition metal substrate, may allow for the formation of the interlayer with a reduced risk of degradation of the substrate, e.g. transition metal substrate, under the influence of the interlayer deposition process. Using an electrodeposition process for depositing the interlayer may be suitable for low-cost large-scale manufacturing. The transition metal oxide may for example comprise chromium oxide, nickel oxide, titanium oxide, or manganese oxide.

According to a seventh aspect, the present disclosure is related to a method for fabricating a solid-state battery cell. A method according to the seventh aspect of the present disclosure comprises forming a plurality of spaced electrically conductive structures on a substrate according to a method of the third aspect of the present disclosure; forming a first layer of active electrode material on the plurality of electrically conductive structures, wherein the first layer of active electrode material conformally coats surfaces of the plurality of electrically conductive structures; depositing an electrolyte layer over the first layer of active electrode material; and forming a second layer of active electrode material over the electrolyte layer, wherein one of the first layer of active electrode material and the second layer of active electrode material forms a cathode layer and the other one forms an anode layer of the solid-state battery cell. The plurality of spaced electrically conductive structures may form a first current collector of the solid-state battery cell. The method may further comprise depositing a second current collector or collector layer over the second layer of active electrode material.

In embodiments of the method of the seventh aspect of the present disclosure forming the first layer of active electrode material on the plurality of electrically conductive structures may be done according to an embodiment of the sixth aspect of the present disclosure.

In general, features of the seventh aspect of the present disclosure provide similar advantages as discussed above in relation to the previous aspects of the present disclosure.

A method of the seventh aspect of the present disclosure may allow a substantial part of the fabrication steps to be done using a low-cost electrochemical deposition process. More in particular, the anodization steps in the method for forming a template, the step of depositing an electrically conductive material within the template and the step of depositing an electrode material precursor layer may be done using an electrochemical deposition process. These steps may be done in the same equipment. A method of the seventh aspect of the present disclosure may allow the electrochemical deposition processes to be performed in an aqueous solution without organic solvents, resulting in an environmental-friendly fabrication method.

According to an eighth aspect, the present disclosure is related to a method for fabricating a solid-state battery cell. A method according to the eighth aspect of the present disclosure comprises: forming a plurality of spaced electrically conductive structures on a substrate; forming a first layer of active electrode material on the plurality of spaced electrically conductive structures in accordance with an embodiment of the sixth aspect of the present disclosure, wherein the first layer of active electrode material conformally coats surfaces of the plurality of spaced electrically conductive structures; depositing an electrolyte layer over the first layer of active electrode material; and forming a second layer of active electrode material over the electrolyte layer, wherein one of the first layer of active electrode material and the second layer of active electrode material forms a cathode layer and the other one forms an anode layer of the solid-state battery cell. The plurality of spaced electrically conductive structures may form a first current collector layer of the solid-state battery cell. The method may further comprise depositing a second current collector layer over the second layer of active electrode material.

In general, features of the eighth aspect of the present disclosure provide similar advantages as discussed above in relation to the previous aspects of the present disclosure.

According to a ninth aspect, the present disclosure is related to a method for fabricating a solid-state battery. A method according to the ninth aspect of the present disclosure comprises: fabricating a plurality of solid-state battery cells in accordance with an embodiment of the seventh or the eighth aspect of the present disclosure; and forming a stack of the plurality of solid-state battery cells with an electrolyte being provided in between neighboring solid-state battery cells.

In general, features of the ninth aspect of the present disclosure provide similar advantages as discussed above in relation to the previous aspects of the present disclosure.

According to a tenth aspect, the present disclosure is related to a solid-state battery cell. A solid-state battery cell according to the tenth aspect of the present disclosure comprises a plurality of spaced electrically conductive structures; a first layer of active electrode material conformally coating surfaces of the plurality of spaced electrically conductive structures; an electrolyte layer over the first layer of active electrode material; a second layer of active electrode material over the electrolyte layer, wherein one of the first layer of active electrode material and the second layer of active electrode material forms a cathode layer and the other one forms an anode layer of the solid-state battery cell; and a 0.5 nm to 10 nm thick interlayer between the plurality of electrically conductive structures and the first layer of active electrode material, wherein the interlayer comprises a transition metal oxide, a noble metal, or a noble-metal oxide. In embodiments of the tenth aspect of the present disclosure the plurality of spaced electrically conductive structures may form a first current collector layer of the solid-state battery cell. The solid-state battery cell may further comprise a second current collector layer over the second layer of active electrode material.

In general, features of the tenth aspect of the present disclosure provide similar advantages as discussed above in relation to the previous aspects of the present disclosure.

According to an eleventh aspect, the present disclosure is related to a solid-date battery comprising at least one, for example a plurality of, e.g. a stack of, solid-state battery cells according to the tenth aspect of the present disclosure.

In general, features of the eleventh aspect of the present disclosure provide similar advantages as discussed above in relation to the previous aspects of the present disclosure.

Particular aspects of the disclosure are set out in the accompanying independent and dependent claims. Features from the dependent claims may be combined with features of the independent claims and with features of other dependent claims as appropriate and not merely as explicitly set out in the claims.

The above and other characteristics and features of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

BRIEF DESCRIPTION OF THE DRAWINGS

FIG. 4 schematically shows a cross section illustrating results of successive steps of the process sequence of FIG. 1, according to example embodiments.

FIG. 5 schematically shows a cross section illustrating results of successive steps of the process sequence of FIG. 1, according to example embodiments.

Figure 1:
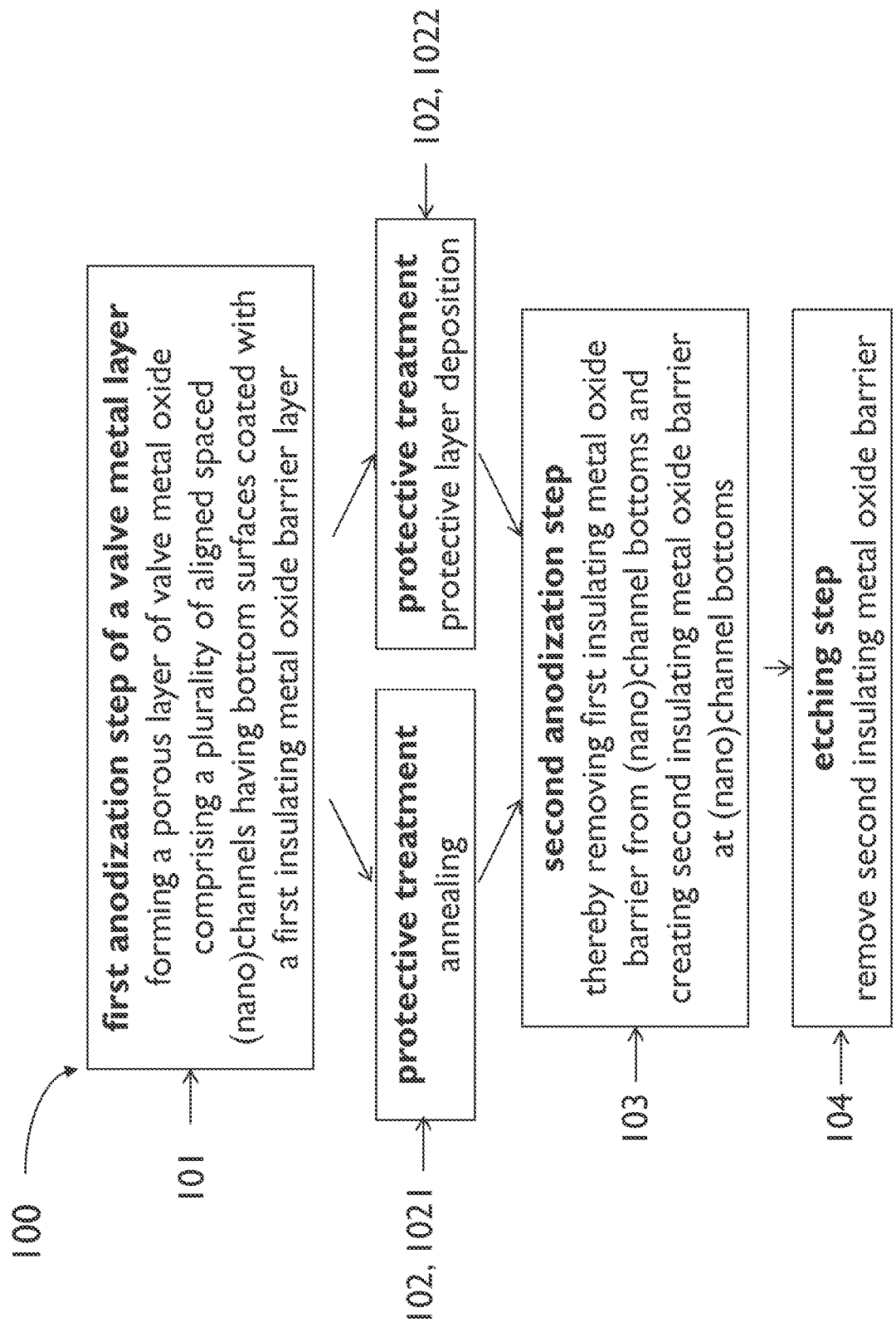
FIG. 1 illustrates an example process sequence of a method for transforming at least part of a valve metal layer into a template comprising a plurality of spaced (nano) channels, according to example embodiments.

In the different figures, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second, third, and the like in the description and in the claims, are used for distinguishing between similar elements and not necessarily for describing a sequence, either temporally, spatially, in ranking, or in any other manner. It is to be understood that the terms so used are interchangeable under appropriate circumstances and that the embodiments of the disclosure described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps, or components, or groups thereof. Thus, the scope of the expression "a device comprising A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, standardized methods, structures and techniques have not been shown in detail in order not to obscure an understanding of this description.

The following terms are provided solely to aid in the understanding of the disclosure.

In the context of the present disclosure, a battery cell is a structure comprising two electrode layers with an electrolyte layer in between, i.e. a structure comprising a stack of a first electrode layer (first layer of active electrode material)/electrolyte layer/second electrode layer (second layer of active electrode material). The first electrode layer and the second electrode layer are of opposite polarity. A battery may comprise a single battery cell or it may comprise a plurality of, e.g. at least two, battery cells. A battery may comprise two or more battery cells connected in series or in parallel, or a combination of series and parallel connected battery cells. A battery further comprises a first current collector layer and a second collector layer, the first current collector layer and the second current collector layer being of opposite polarity.

In the context of the present disclosure, an ion insertion battery cell is a battery cell comprising electrodes that can accept or release cations or anions during operation of the battery cell. Ion insertion battery cells can rely on the insertion/extraction of only one cation element, multiple cation elements, only anions or a mixture of anion and cation elements. An ion insertion battery cell further comprises an electrolyte that allows for ionic conduction of the respective ion used, while being (electro)chemically stable with regard to the used electrode materials.

In a rechargeable battery cell, each of the electrodes has a first polarity during the discharge (i.e. battery operation) and a second, opposite polarity during charging. Technically speaking however, the negative electrode is the anode during the discharge and the cathode during charging. Vice versa, the positive electrode is the cathode during discharge and the anode when charging the battery. In the context of the present disclosure, the terminology of the discharge (i.e. battery operation) is used. Herein further, with anode the negative electrode is meant and with cathode the positive electrode is meant. Through the disclosure, when referred to "anode material" it is meant the negative electrode material and when referred to "cathode material" it is meant the positive electrode material.

In the context of the present disclosure, an active electrode material is a material that is a component of a battery electrode layer. In the active electrode material, the actual electrochemical transformation (change in valence or oxidation state of the atoms) takes place, which gives rise to storage of chemical energy in the electrode. An electrode layer is typically composed of the active electrode material and supporting material.

In the context of the present disclosure, the term "anodization" when applied to a valve metal (such as for example aluminum) or to a valve metal layer refers to an electrochemical process comprising applying a potential or a current between the valve metal layer (the material to be anodized) functioning as a working electrode at one hand and a counter-electrode at the other hand, in the presence of an acid electrolyte. This method leads to the formation of a porous layer of valve metal oxide comprising plurality of pores or channels, e.g. a cluster of channels, arranged in an orderly fashion (e.g. hexagonally) perpendicularly to the surface of the layer. This cluster may be referred to as an array, due to the orderly nature of the arrangement.

In the context of the present disclosure, a valve metal is a metal that can be oxidized using an anodization process (anodic oxidation) to thereby form a stable valve metal oxide. More in particular, in the context of the present disclosure, a valve metal is a metal selected from the group of aluminum, tungsten, titanium, tantalum, hafnium, niobium, vanadium, and zirconium. In the context of the present disclosure, a valve metal layer is a layer comprising a valve metal or a valve metal alloy (or a "doped" valve metal). An example of an aluminum alloy that may for example be used in the context of the present disclosure is a copper doped aluminum layer, e.g. with a doping concentration in the range between 1% and 10%, the present disclosure not being limited thereto.

In the context of the present disclosure, when referring to a substrate, the substrate may be a planar substrate or a non-planar, e.g. three-dimensional (3D) substrate. In the context of the present disclosure, a 3D substrate may for example comprise a plurality of 3D features, 3D structures, such as 3D micro- or nano-structures, such as for example a plurality of micro-pillars or nano-pillars, a plurality of microwires or nanowires, or 3D (nano)meshes, (nano)tubes, and/or other porous structures, such as for example porous anodized alumina. The 3D features may be present in a regular pattern, such as for example a regular array pattern, or they may be randomly distributed over the substrate.

In the context of the present disclosure, a plurality of spaced channels refers to a plurality of channels that are separated in space from one another, i.e. that are located at a distance from each other. The plurality of spaced channels may be either completely separated from each other, e.g. by a surrounding medium, or they may be interconnected, for example partially interconnected, e.g. by a plurality of interconnecting channels through a surrounding medium. The plurality of interconnecting channels may for example have a longitudinal orientation substantially orthogonal to a longitudinal orientation of the plurality of spaced channels.

In the context of the present disclosure, a template comprising a plurality of spaced channels aligned longitudinally along a direction may refer to a template comprising a plurality of channels being completely separated from each other or to a template comprising a plurality of channels that are interconnected, for example partially interconnected by a plurality of interconnecting channels. The interconnecting channels may be oriented in a direction substantially orthogonal to the longitudinal direction of the plurality of spaced channels. In the context of the present disclosure, a template comprising a plurality of spaced channels aligned longitudinally along a direction may refer to a template comprising two or more regions positioned subsequently along the longitudinal direction, wherein at least a first region comprises a plurality of completely separated (non-interconnected) spaced channels and wherein at least a second region comprises a plurality of interconnected spaced channels (being interconnected by interconnecting channels).

In the context of the present disclosure, a plurality of spaced structures, e.g. nanostructures, aligned longitudinally along a direction refers to a plurality of structures, e.g. nanostructures, that are located at a distance from each other. The plurality of (nano)structures may for example comprise (nano)pillars, (nano)wires, (nano)meshes, or (nano)tubes. The plurality of structures, e.g. nanostructures, may be either completely separated from each other, e.g. by a surrounding medium such as air or a solid material different from the (nano)structure material, or they may be interconnected, for example partially interconnected, e.g. by a plurality of interconnecting structures, e.g. interconnecting nanostructures. The plurality of interconnecting (nano)structures may for example have a longitudinal orientation substantially orthogonal to a longitudinal orientation of the plurality of spaced (nano)structures. The interconnecting (nano)structures are typically made of the same material as the spaced (nano)structures themselves. In the context of the present disclosure, a plurality of spaced (nano)structures aligned longitudinally along a direction may refer to structure comprising two or more regions positioned subsequently along the longitudinal direction, wherein at least a first region comprises a plurality of spaced, completely separated (non-interconnected) (nano)structures and wherein at least a second region comprises a plurality of spaced, interconnected (nano)structures (for example being interconnected by inter-connecting (nano)structures).

In the context of the present disclosure, a functional material or functional material layer is a material or material layer that satisfies or provides a defined functionality and/or has defined properties, adjusted for a device in which it is integrated. A functional material may for example comprise a metal, a metal alloy, a semiconductor, an oxide, a metal hydride, a ceramic material, a metal-organic crystal, a polymer, or an organic supramolecular solid, the present disclosure not being limited thereto. It provides a defined functionality or property, such as for example a high electrical conductivity, catalytic activity towards chemical reactions, electrochemical activity towards ion insertion, high optical absorbance, iridescence, photoluminescence, high magnetic anisotropy, or piezoelectricity, the present disclosure not being limited thereto. This is adjusted for the final device or intended field of application in which it is used. A functional material or a functional material layer may for example have the functionality of an electrode, a current collector, a catalyst, an energy storage material, a light absorber, a photonic crystal, a light emitter, an information storage medium, an ion trap, or a gas absorber, the present disclosure not being limited thereto.

The disclosure will now be described by a detailed description of several embodiments of the disclosure. It is clear that other embodiments of the disclosure can be configured according to the knowledge of persons skilled in the art without departing from the technical teaching of the disclosure, the disclosure being limited only by the terms of the appended claims.

According to a first aspect, the present disclosure is related to a method for transforming at least part of a valve metal layer into a template comprising a plurality of spaced (nano)channels aligned longitudinally along a first direction. An example of a method according to an embodiment of the first aspect of the present disclosure is schematically illustrated in FIG. 1, showing a flow chart comprising an example process sequence and in FIG. 2 to FIG. 8, schematically showing cross sections illustrating results of successive steps of the process sequence of FIG. 1.

As illustrated in the example shown in FIG. 1, a method 100 according to an embodiment of the first aspect of the present disclosure comprises a first anodization step 101 of at least part of a valve metal layer, the first anodization step 101 resulting in the formation of a porous layer of valve metal oxide comprising a plurality of aligned spaced (nano) channels having bottom surfaces coated with a first insulating metal oxide barrier. The plurality of (nano)channels formed as a result of the first anodization step are substantially aligned longitudinally along a first direction. The plurality of (nano)channels each have (nano)channel walls substantially aligned longitudinally along the first direction and a (nano)channel bottom substantially parallel with a surface of the valve metal layer. As a result of the first anodization step the surfaces of the (nano)channel bottoms are covered with a first insulating metal oxide barrier layer, for example a first valve metal oxide barrier layer.

Figure 2:
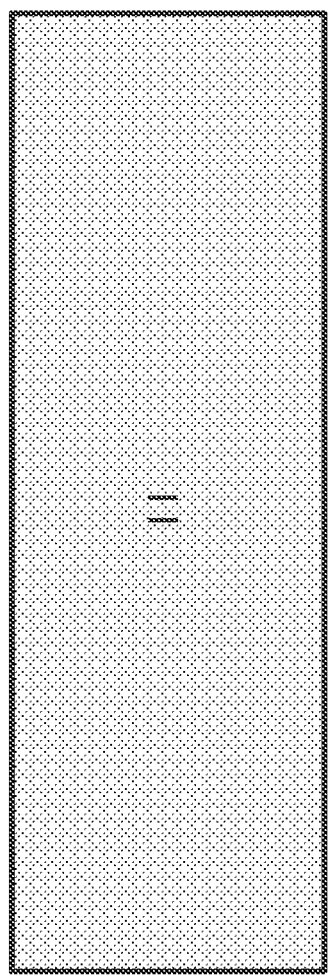
FIG. 2 schematically shows a cross section illustrating results of successive steps of the process sequence of FIG. 1, according to example embodiments.
Figure 3:
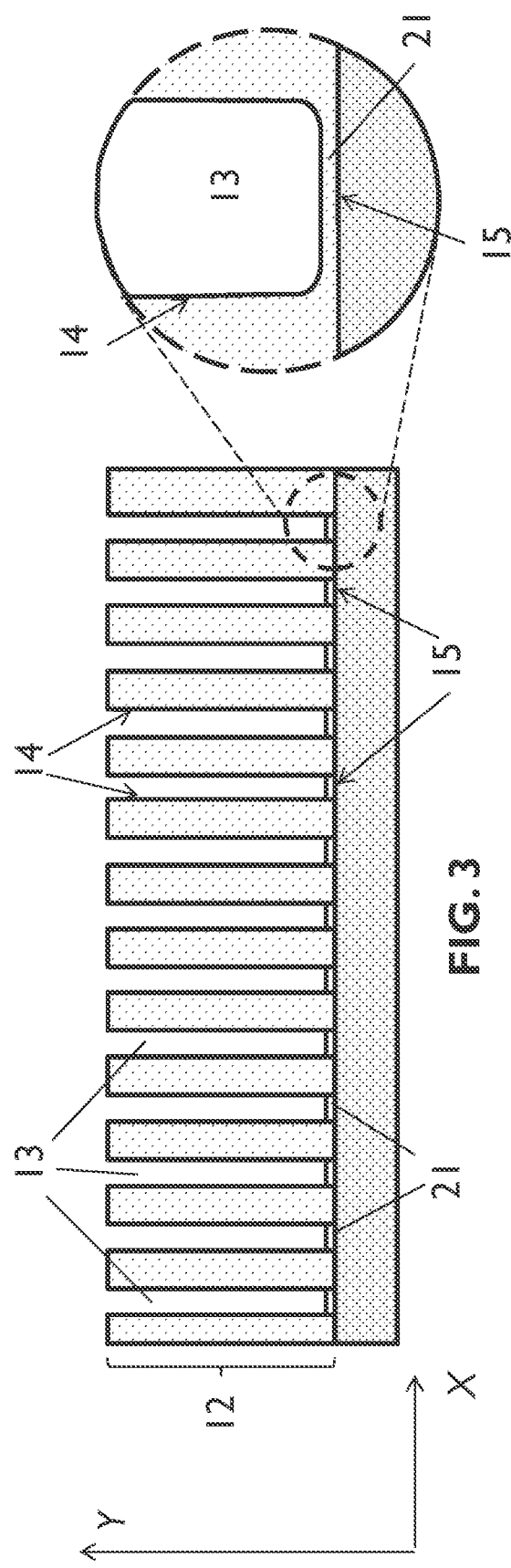
FIG. 3 schematically shows a cross section illustrating results of successive steps of the process sequence of FIG. 1, according to example embodiments.

In embodiments of the first aspect of the present disclosure the valve metal layer may be a free-standing layer, for example a flexible free-standing layer such as a metal foil, or the valve metal layer may be provided on a substrate, for example on a rigid substrate or on a flexible substrate. FIG. 2 illustrates an example of an embodiment wherein the valve metal layer 11 is a free-standing layer, but the present disclosure is not limited thereto. The first anodization step 101 may result in a structure as schematically shown in FIG. 3. It illustrates formation of a porous layer 12 of anodized metal comprising a plurality of spaced (nano)channels 13 that are substantially aligned longitudinally along a first direction. In embodiments of the present disclosure the first direction may correspond to a thickness direction of the valve metal layer, i.e. it may be substantially orthogonal to a surface of the valve metal layer, as schematically illustrated in the example shown in FIG. 3. However, the present disclosure is not limited thereto, and the first direction may be at an angle, for example at an angle in the range between 60° and 90°, with respect to a surface of the valve metal layer. FIG. 3 illustrates an example wherein the first direction is orthogonal to the surface of the valve metal layer 11. In other words, the first direction corresponds to a thickness direction Y of the valve metal layer 11. The plurality of (nano)channels 13 each have (nano)channel walls 14 substantially aligned longitudinally along the thickness direction Y and a (nano)channel bottom 15. As a result of the first anodization step 101 the surface of the (nano)channel bottoms 15 is covered with a first insulating metal oxide barrier layer 21, as shown more in detail in the inset of FIG. 3.

In the example illustrated in FIG. 3 the porous layer 12 comprising the plurality of channels 13 is formed only in a part of the valve metal layer. However, the present disclosure is not limited thereto. For example, in embodiments according to the first aspect wherein the valve metal layer 11 is provided on a substrate (not illustrated) the porous layer 12 comprising the plurality of (nano)channels 13 may also be formed throughout the valve metal layer 11, thereby exposing the underlying substrate at the channel bottoms.

In embodiments of the present disclosure (not illustrated) the first anodization step may comprise complete immersion of a free-standing valve metal layer 11 in an anodizing solution. In such embodiments, the first anodization step may result in the formation of a first porous layer of valve metal oxide comprising a plurality of spaced (nano)channels at a first side of the valve metal layer and simultaneously in the formation of a second porous layer of valve metal oxide comprising a plurality of spaced (nano)channels at a second, opposite side of the valve metal layer. In between the first porous layer and the second porous layer a non-anodized valve metal layer remains.

A method 100 according to embodiments of the first aspect of the present disclosure comprises, after the first anodization step 101, performing a protective treatment 102 (FIG. 1). The protective treatment induces hydrophobic surfaces to the (nano)channel walls 14 and (nano)channel bottoms 15, i.e. it results in (nano)channels 13 having hydrophobic (nano)channel wall surfaces and hydrophobic (nano)channel bottom surfaces.

In embodiments of the first aspect of the present disclosure, performing the protective treatment may comprise annealing 102, 1021 (FIG. 1), such as for example annealing at a temperature in the range between 300° C. and 550° C. The annealing may be done in an inert atmosphere, such as for example in nitrogen or argon, or in air. Annealing may be done under ambient pressure or at a reduced pressure, such as in vacuum.

In embodiments of the first aspect of the present disclosure, performing the protective treatment may comprise depositing 102, 1022 (FIG. 1) a protective layer over the (nano)channel walls and over the (nano)channel bottoms. This is schematically illustrated in FIG. 4, showing a protective layer 31 being provided on the (nano)channel walls 14 and on the first insulating metal oxide barrier layer 21 that is present on the (nano)channel bottoms 15. The protective layer 31 is also formed on an upper surface of the porous layer 12.

In embodiments the protective layer may be a layer comprising hydrophobic silane, e.g. formed by vapor deposition, for example in air or in vacuum, for example at a temperature in the range between 80° C. and 120° C. In other embodiments the protective layer may be a polymer layer, e.g. formed by application of polymer solution onto the pore walls and bottoms of the template and drying. Such a protective polymer layer may for example be formed by immersing the sample in 1% to 20% solution of polystyrene or PMMA (poly(methyl 2-methylpropanoate)), or PDMS (poly(dimethylsiloxane)), dissolved in acetone, in toluene or in a chlorinated solvent such as dichloromethane and spin coating the excess of the solution, followed by drying at a temperature e.g. in the range between 20° C. and 60° C., e.g. in air or in vacuum.

In embodiments of the first aspect of the present disclosure, performing the protective treatment may comprise both depositing 102, 1022 (FIG. 1) a protective layer 31 over, e.g. directly on, the (nano)channel walls and over the (nano) channel bottoms and annealing 102, 1021 (FIG. 1).

The protective treatment results in the formation of hydrophobic surfaces on the (nano)channel walls and (nano) channel bottoms. Such a hydrophobic surface may provide protection against wetting, e.g. against wetting by an etchant used in subsequent process steps, and therefore it may provide protection against etching.

A method 100 according to embodiments of the first aspect of the present disclosure comprises, after the protective treatment 102, 1021, 1022, a second anodization step 103 (FIG. 1). The second anodization step may for example be done using similar anodization conditions as used for the first anodization step, e.g. for a relatively short period, such as for example 1 minute to 30 minutes. In embodiments of the first aspect of the present disclosure, this second anodization step affects the (nano)channel bottoms only and induces hydrophilic surfaces at the (nano)channel bottoms only. In embodiments wherein a protective layer 31 has been deposited (FIG. 1, step 1022; FIG. 4), the second anodization step 103 results in removal of the protective layer 31 from the bottom of the plurality of spaced (nano)channels. The second anodization step thus results in the formation of hydrophilic, unprotected (nano)channel bottoms (e.g. not protected against wetting). The second anodization step further results in removal of the first insulating metal oxide barrier layer 21 from the (nano)channel bottoms. The second anodization step leaves the plurality of (nano)channel walls substantially unaffected, i.e. the plurality of (nano)channel walls remain substantially protected. The second anodization step results in further anodization only at the bottoms of the plurality of (nano)channels and creates a second (unprotected) insulating metal oxide barrier layer at the (nano) channel bottoms.

FIG. 5 schematically illustrates a cross section of the structure as may be obtained after having performed the second anodization step in a method according to an embodiment of the first aspect of the present disclosure wherein the protective treatment comprises annealing. More in particular, FIG. 5 illustrates the first metal oxide barrier layer 21 being removed from the channel bottoms 15 and being replaced by a second metal oxide barrier layer 22 at the channel bottoms 15 as a result of the second anodization step 103.

Figure 6:
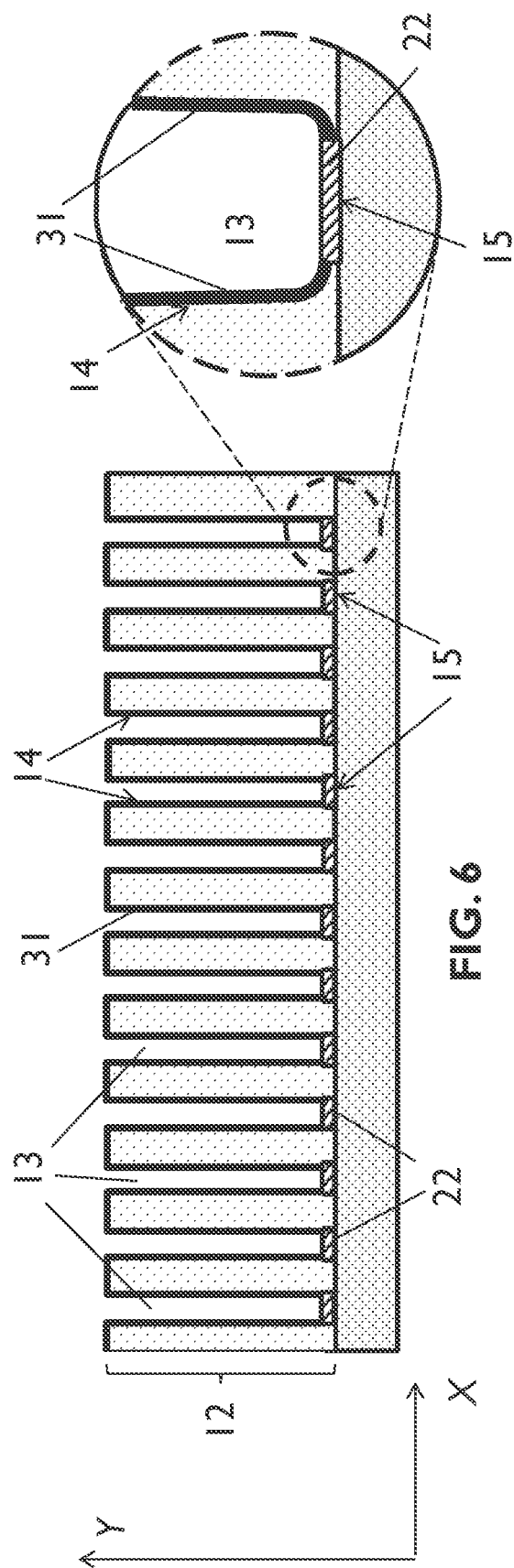
FIG. 6 schematically shows a cross section illustrating results of successive steps of the process sequence of FIG. 1, according to example embodiments.

FIG. 6 schematically illustrates a cross section of the structure as may be obtained after having performed the second anodization step in a method according to an embodiment of the first aspect of the present disclosure wherein the protective treatment comprises depositing a protective layer 31. More in particular, FIG. 6 illustrates the protective layer 31 and the first metal oxide barrier layer 21 being removed from the channel bottoms 15 and being replaced by a second metal oxide barrier layer 22 at the channel bottoms 15 as a result of the second anodization step 103. FIG. 6 further illustrates that the channel walls 14 remain protected by protective layer 31.

A method 100 according to embodiments of the first aspect of the present disclosure further comprises an etching step 104 (FIG. 1), for example in an acidic etching solution or in a basic etching solution. At this stage of the process the (nano)channel walls 14 are substantially protected against etching, e.g. against wetting, as a result of the protective treatment 102 previously performed, resulting in hydrophobic surfaces at the (nano)channel walls. At this stage of the process only the (nano)channel bottoms 15 (more in particular the second insulating metal oxide barrier layer 22 at the (nano)channel bottoms 15) are subject to wetting and thus etching. Therefore, this etching step 104 only removes the second insulating metal oxide barrier layer 22 from the plurality of (nano)channel bottoms 15 and does not affect the porous layer 12. As such, widening of the plurality of (nano)channels 13 during this etching step may be substantially avoided. The etching step may for example comprise etching in an aqueous solution of $H_3PO_4$ or KOH. The etching solution may comprise a surface tension adjusting agent such as for example ethanol, isopropyl alcohol, acetone, or sodium dodecyl sulfate, the present disclosure not being limited thereto. For example, a solution comprising 1 wt % to 30 wt % of $H_3PO_4$ and 1 wt % to 60 wt % of isopropyl alcohol in water may be used for the etching step.

Figure 7:
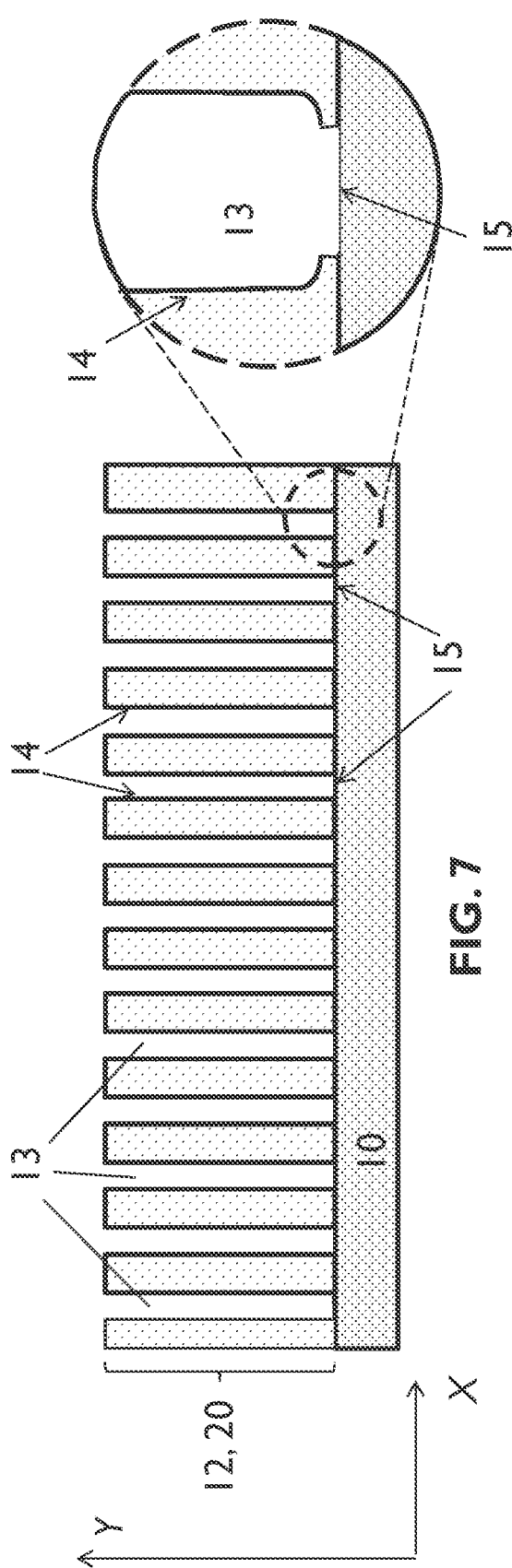
FIG. 7 schematically shows a cross section illustrating results of successive steps of the process sequence of FIG. 1 and schematically shows a cross section of an example of a template, according to example embodiments.

FIG. 7 schematically illustrates a cross section of the structure as may be obtained after having performed the etching step 104 in a method 100 according to an embodiment of the first aspect of the present disclosure wherein the protective treatment comprises annealing. More in particular, FIG. 7 illustrates that, after this etching step 104, the (nano)channel bottoms 15 are exposed (i.e. the second metal oxide barrier layer 22 has been removed from the (nano) channel bottoms 15). The (nano)channel walls 14 remain unaffected, and there is no widening of the (nano)channels 13.

Figure 8:
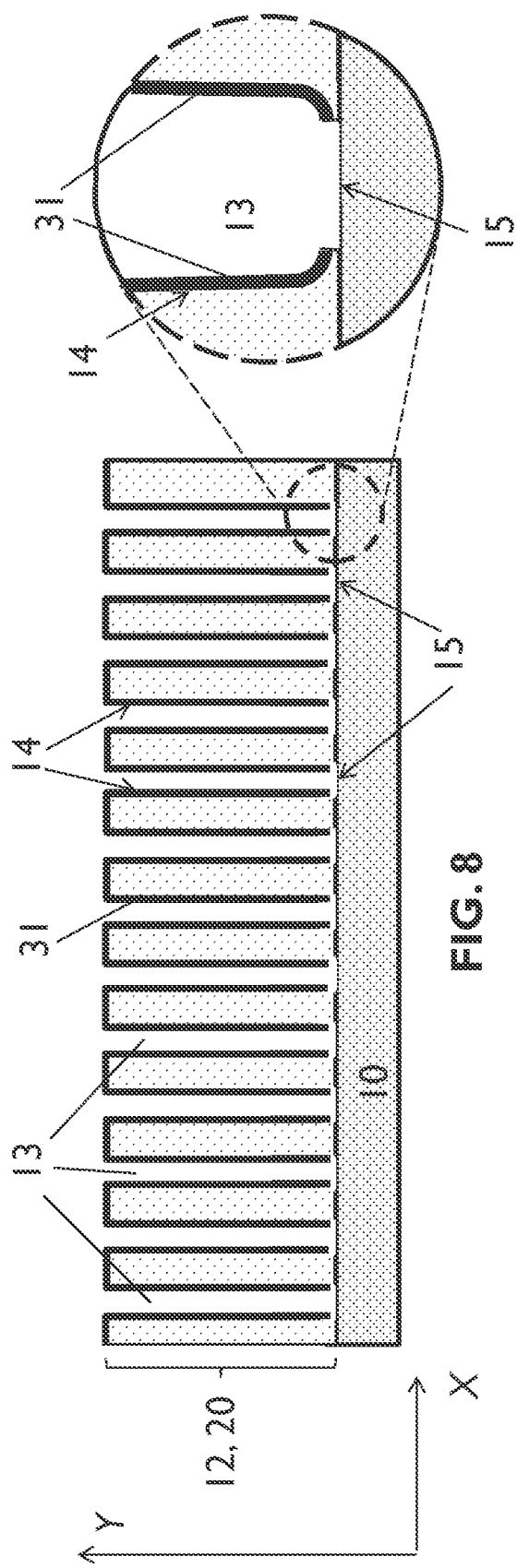
FIG. 8 schematically shows a cross section illustrating results of successive steps of the process sequence of FIG. 1 and schematically shows a cross section of an example of a template, according to example embodiments.

FIG. 8 schematically illustrates a cross section of the structure as may be obtained after having performed the etching step 104 in a method 100 according to an embodiment of the first aspect of the present disclosure wherein the protective treatment comprises depositing a protective layer. More in particular, FIG. 8 illustrates that, after this etching step 104, the (nano)channel bottoms 15 are exposed (i.e. the second metal oxide barrier layer 22 has been removed from the (nano)channel bottoms 15). It also illustrates that the (nano)channel walls 14 are still covered with the protective layer 31.

As illustrated in FIG. 7 and in FIG. 8, the structure obtained after performing the etching step comprises a template 20 comprising a plurality of spaced (nano)channels 13 aligned longitudinally along a first direction (in the example shown the thickness direction Y of the valve metal layer) and a substrate 10 supporting the template 20. FIG. 7 and FIG. 8 thus illustrate examples of a template 20 according to embodiments of the second aspect of the present disclosure. In the examples shown in FIG. 7 and FIG. 8 the substrate 10 corresponds to a remaining, non-anodized part of the valve metal layer 11.

After the etching step 104 the structure comprising the substrate 10 and the template 20 (FIG. 7, FIG. 8) may be immersed in a basic solution of zinc oxide to thereby produce a thin conductive zinc layer at the (nano)channel bottoms. The presence of such a thin conductive zinc layer at the (nano)channel bottoms enables or facilitates electroplating of a variety of metals in the plurality of (nano) channels in a subsequent step.

In embodiments of the present disclosure the valve metal layer 11 may consist of a single layer or it may comprise more than one, e.g. a plurality of (stacked) layers, e.g. having a different composition. For example, the valve metal layer may consist of an aluminum layer, such as for example an aluminum layer of 99% or higher purity, with a thickness for example in the range between 1 micrometer and 1 mm. In other embodiments it may for example consist of a doped aluminum layer, such as for example a copper doped aluminum layer, e.g. with a doping concentration in the range between 1% and 10% and a thickness e.g. in the range between 1 micrometer and 1 mm. In other embodiments, it may be a layer stack comprising a first layer and a second layer, wherein the first layer is for example an aluminum layer of 99% or higher purity and wherein the second layer is for example a doped, e.g. copper doped, aluminum layer. The doped aluminum layer may for example have a doping concentration in the range between 1% and 10% and the thickness of this layer may for example be in the range between 1 micrometer and 100 micrometers.

In embodiments of the present disclosure the valve metal layer 11 may be a free-standing layer such as a free-standing foil, such as for example an aluminum foil, e.g. having a thickness in the range between 10 micrometers and 1 millimeter. In other embodiments of the present disclosure, the layer valve metal layer may be a non-free-standing layer: it may for example be provided on a substrate, such as a flexible substrate. Using a flexible substrate may allow for the fabrication of flexible solid-state batteries. Examples of flexible substrates that may be used are a metal foil (such as aluminum, nickel, or copper foil), mica and polyimide tape.

The substrate may be coated with an electrically conductive layer such as a nickel layer, a titanium layer, or a titanium nitride layer.

In embodiments wherein the valve metal layer is a free-standing layer, the first anodization step may be only done in part of the layer, i.e. not throughout the valve metal layer, such that a part of the layer remains unaffected. In such embodiments the remaining (non-anodized) part of the valve metal layer can be maintained as a carrier (or substrate 10) for the anodized part (template 20). In the further description, when reference is made to a substrate, this may refer to a substrate on which a valve metal layer is initially provided, or, in embodiments wherein a free-standing valve metal layer is used, it may refer to a substrate 10 corresponding to a part of the valve metal layer that is remaining after the anodization step (i.e. the part that is not anodized, not transformed into a porous layer), as for example illustrated in FIG. 7 and FIG. 8. In embodiments wherein the anodization steps comprise complete immersion of a free standing valve metal layer 11 in an anodizing solution, resulting in the formation of a first porous layer of valve metal oxide at a first side of the valve metal layer and simultaneously in the formation of a second porous layer of valve metal oxide at a second, opposite side of the valve metal layer, the substrate 10 (non-anodized part) is present between the first porous layer and the second porous layer. In other words, a "first porous layer/substrate/second porous layer" stack is formed.

The first anodization step of the valve metal layer, for example a layer comprising aluminum, may be performed by immersing the valve metal layer al in an anodizing solution, for example an acidic medium, such as a solution of sulfuric, oxalic, or phosphoric acid and applying a constant voltage difference between the valve metal layer and a counter electrode such as a titanium electrode (e.g. a sheet or a mesh) or a platinum electrode (potentiostatic anodization). The voltage difference may for example be in the range between 10 V and 500 V. Alternatively, a constant current may be applied to the valve metal layer through the anodizing solution (galvanostatic anodization). By selecting and controlling the anodization parameters the size of the plurality of (nano)channels (e.g. their diameter), and the distribution of the plurality of (nano)channels (e.g. the distance between neighboring (nano)channels) may be well controlled.

For example, experiments were performed wherein a potential of 40 V was applied between an aluminum layer (working electrode) and a counter electrode, in a 0.3M oxalic acid at 30° C. to perform anodization of an aluminum layer. This resulted in the formation of a plurality of 40 nm wide (i.e. having a diameter of 40 nm) spaced nanochannels having a longitudinal direction substantially orthogonal to the aluminum layer surface, the plurality of nanochannels being located at a distance from each other (distance between the centers of the nanochannels) of about 100 nm in a direction substantially parallel with the aluminum layer surface.

The longitudinal size of the plurality of spaced nanochannels (i.e. the length of the nanochannels, corresponding to the depth of anodization into the valve metal layer, i.e. the distance between the nanochannel bottoms and an upper surface of the valve metal layer) depends on the duration of the first anodization step. It may for example be in the range between 100 nm and 100 micrometers, the present disclosure not being limited thereto. The first anodization step may for example have a duration in the range between 1 hour and 12 hours.

Where the valve metal layer comprises an aluminum layer of high purity, such as for example an aluminum layer of 99% or higher purity, the first anodization step results in the formation of a plurality of separated, non-interconnected (nano)channels. Where the valve metal layer comprises a doped aluminum layer, such as for example a copper doped aluminum layer, e.g. with a doping concentration in the range between 1% and 10%, the first anodization step results in the formation of a plurality of spaced (nano)channels that are interconnected by interconnecting (nano)channels having a longitudinal orientation substantially orthogonal to the longitudinal orientation of the plurality of spaced (nano) channels. In embodiments wherein the valve metal layer is a layer stack comprising a first layer and a second layer, wherein the first layer is for example an aluminum layer of 99% or higher purity and wherein the second layer is a doped, e.g. copper doped, aluminum layer, a plurality of spaced (nano)channels is formed wherein the plurality of spaced (nano)channels are separated (non-interconnected) in a first region (corresponding to the first layer) and wherein the plurality of spaced (nano)channels are interconnected in a second region (corresponding to the second layer). The formation of interconnecting (nano)channels may result in an increased surface area and an improved mechanical stability of (nano)structures that may be formed subsequently within the template.

For example, experiments were performed wherein a potential of 40 V was applied between a Cu doped aluminum layer (working electrode) and a counter electrode, in a 0.3M oxalic acid at 30° C. This resulted in the formation of a plurality of 40 nm wide spaced nanochannels having a longitudinal direction substantially orthogonal to the metal layer surface, the plurality of spaced nanochannels being located at a distance from each other of about 100 nm in a direction substantially parallel with the metal layer surface, and in addition to the formation of 40 nm wide branches or interconnecting nanochannels having a longitudinal direction substantially parallel to the metal layer surface and being separated by a distance of about 100 nm in a direction substantially orthogonal to the metal layer surface.

In embodiments wherein the valve metal layer is provided on a substrate, such as a flexible substrate, coated with an electrically conductive layer such as for example a nickel, titanium, or titanium nitride layer, the first anodization step may proceed till a plurality of (nano)channels if formed throughout the valve metal layer. In such embodiments, the bottom of the plurality of (nano)channels thus formed is located at an interface between the valve metal layer and the underlying electrically conductive layer, i.e. at an interface between the porous layer resulting from the first anodization step and the substrate 10. When during the first anodization step the bottom of the plurality of (nano)channels reaches the underlying substrate 10, this leads to a decrease of current in case of potentiostatic anodization, or an increase in potential in case of galvanostatic anodization. In this way, it may be easily detected when the spaced (nano)channels 13 thus formed reach the substrate 10, i.e. at which moment the plurality of spaced (nano)channels are formed throughout the valve metal layer.

In embodiments, the second anodization step 103 may be performed under irradiation of ultrasonic waves. Such ultrasonic waves may for example be generated by a ultrasound generating horn, immersed in the anodizing solution. Providing ultrasonic waves may facilitate removal of the first insulating metal oxide barrier layer 21 and, if present, removal of the protective layer 31 from the (nano)channel bottoms during the second anodization step 103. Providing ultrasonic waves may further facilitate removal of the second insulating metal oxide barrier layer 22 from the (nano)channel bottoms during the etching step 104.

According to a third aspect, the present disclosure is related to a method for forming a plurality of spaced (nano)structures, such as for example a plurality of spaced electrically conductive (nano)structures, on a substrate. An example of a method according to the third aspect of the present disclosure is schematically illustrated in FIG. 9, showing a flow chart comprising an example process sequence, and in FIG. 7, FIG. 8, FIG. 10 and FIG. 11, schematically showing cross sections illustrating results of successive steps of the process sequence of FIG. 9.

Figure 9:
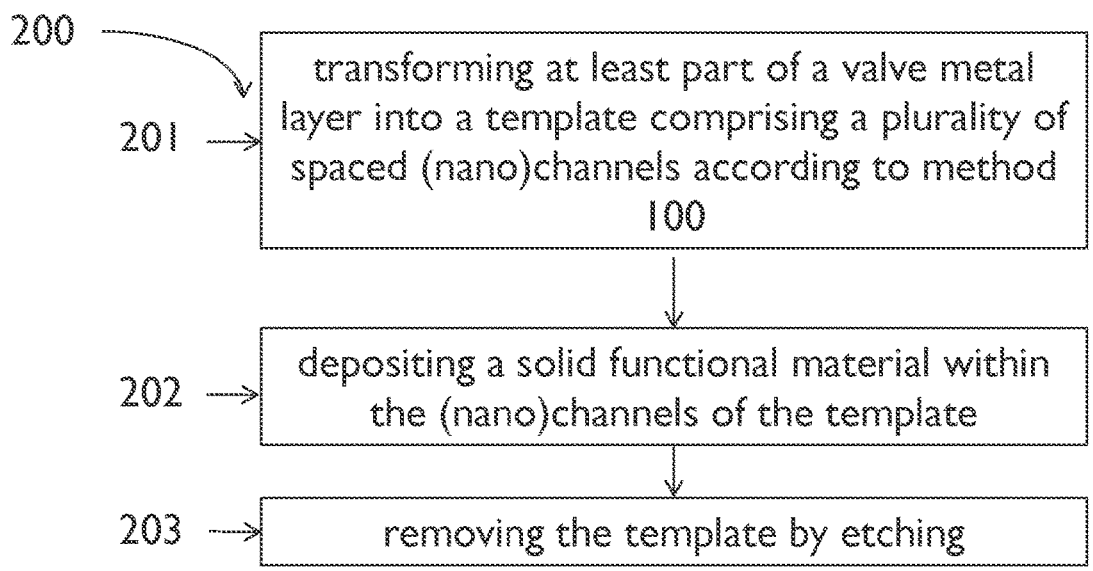
FIG. 9 illustrates an example process sequence of a method for forming a plurality of spaced (nano)structures on a substrate, according to example embodiments.

As illustrated in the example shown in FIG. 9, a method 200 according to an embodiment of the third aspect of the present disclosure comprises first transforming 201 at least part of a valve metal layer 11 into a template 20 comprising a plurality of spaced (nano)channels 13 aligned longitudinally along a first direction, in accordance with a method 100 of the first aspect of the present disclosure. Examples of a structure resulting from this step 201 are schematically shown in FIG. 7 and FIG. 8.

Figure 10:
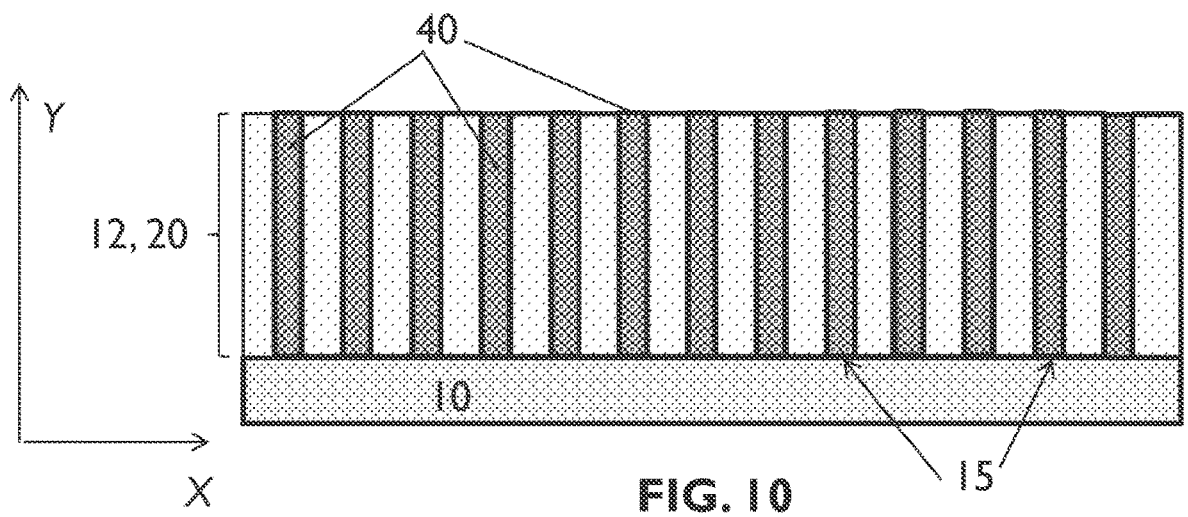
FIG. 10 schematically shows a cross section illustrating results of successive steps of the process sequence of FIG. 9, according to example embodiments.

The method 200 further comprises depositing 202 a solid functional material within the (nano)channels 13 of the template 20. This results in formation of a plurality of spaced (nano)structures 40 inside the plurality of spaced channels 13, the plurality of spaced (nano)structures being aligned longitudinally along the first direction, as schematically shown in FIG. 10. In the example shown in FIG. 10, the plurality of (nano)channels 13 is completely filled with the solid functional material, resulting in a plurality of (nano)wires 40 having a length (size in their longitudinal direction Y) substantially equal to a thickness of the template 20. However, the present disclosure is not limited thereto and in embodiments of the second aspect of the present disclosure the plurality of (nano)channels 13 may be filled only partially. For example, in embodiments the functional material may be deposited within the plurality of (nano)channels 13 only in part of longitudinal direction Y, resulting in a plurality of (nano)structures 40 having a length smaller than a thickness of template 20. This can be controlled by controlling the deposition time.

In embodiments of a method of the third aspect of the present disclosure the solid functional material may be deposited within the plurality of (nano)channels 13 to thereby fully fill the plurality of (nano)channels 13 in lateral direction X, which may result for example in the formation of a plurality of (nano)wires or (nano)pillars within the plurality of (nano)channels. In other embodiments, the solid functional material may be deposited within the plurality of (nano)channels 13 to thereby only partially fill the plurality of (nano)channels 13 in lateral direction X, which may for example result in the formation of a plurality of (nano)tubes or hollow (nano)wires inside the plurality of (nano)channels 13.

Figure 11:
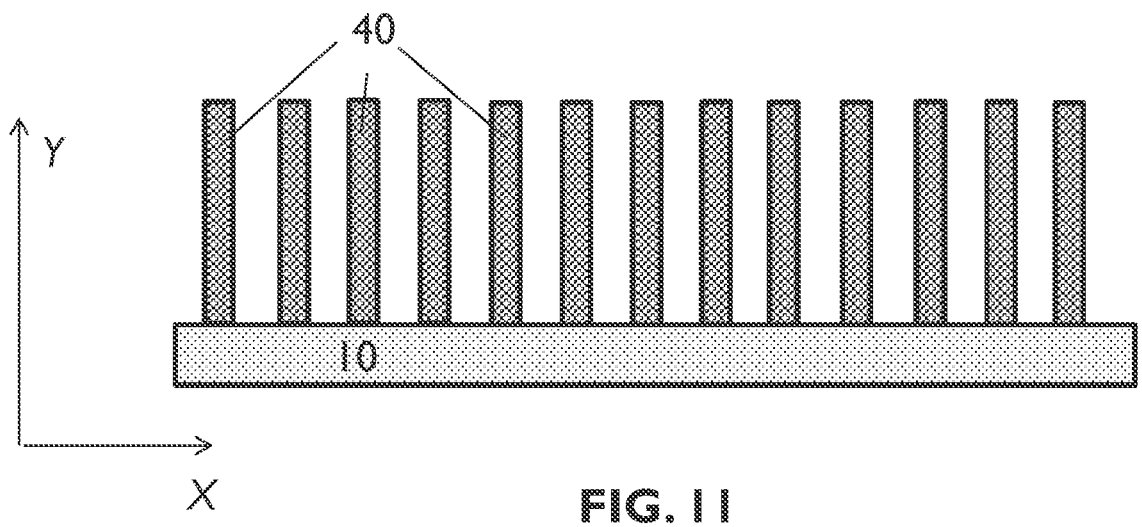
FIG. 11 schematically shows a cross section of an example of an entity and schematically shows a cross section illustrating results of successive steps of the process sequence of FIG. 9, according to example embodiments.

After having deposited the solid functional material, the template 20 may be removed by etching 203 (FIG. 9). For this etching step 203, for example a solution comprising 0.1M to 1M KOH may be used. The etching time may for example be in the range between 20 minutes and 90 minutes, and etching may be done at a temperature e.g. in the range between 20° C. and 60° C. The resulting structure is schematically shown in FIG. 11. It contains a plurality of spaced (nano)structures 40 on a substrate 10, more in particular on an electrically conductive substrate 10. The diameter of the plurality of (nano)structures 40, i.e. their size in lateral direction X, and their separation (i.e. the center-to-center distance between neighboring (nano)structures 40) depends on the diameter and separation of the (nano)channels 13 of the template 20. The diameter of the plurality of (nano)wires may for example be in the range between 10 nm and 500 nm, for example between 10 nm and 300 nm, e.g. between 15 nm and 200 nm or between 50 nm and 200 nm, and their separation distance may for example be in the range between 15 nm and 500 nm, e.g. between 50 nm and 250 nm, the present disclosure not being limited thereto.

In embodiments wherein the template is formed by anodization of only a part of the valve metal layer 11 (i.e. wherein anodization is done only partially in the thickness direction Y of the valve metal layer 11), such as in embodiments using a free-standing valve metal layer, the non-anodized part of the valve metal layer remains as a carrier or substrate 10 for the plurality of spaced (nano)structures 40 formed within the template. In such embodiments removal of the template 20 results in a plurality of spaced (nano)structures 40 on a remaining part of the valve metal layer (herein also referred to as a substrate 10), wherein the plurality of spaced (nano)structures 40 is substantially aligned longitudinally with their longitudinal direction along the first direction, such as for example a direction Y substantially orthogonal to the valve metal layer (substrate) surface, i.e. substantially orthogonal to direction X.

In embodiments of the third aspect of the present disclosure, depositing the solid functional material may comprise depositing an electrically conductive material, a semiconductor material, an electrically insulating material or a combination thereof. Depositing the solid functional material may for example comprise Chemical Vapor Deposition, e.g. Atomic Layer Deposition, the present disclosure not being limited thereto. Depositing an electrically conductive material may for example comprise depositing the material by galvanostatic or potentiostatic electrodeposition or plating, the present disclosure not being limited thereto.

For example, in a method 200 according to embodiments of the third aspect of the present disclosure, nickel (nano)structures 40 may be grown galvanostatically from a solution of nickel sulphamate and boric acid and/or nickel chloride at a temperature in the range between 20° C. and 60° C. The growth may be performed by application of a cathodic current e.g. (1-20 mA/cm$^2$) between the electrically conductive substrate 10 (or an electrically conductive layer being part of the substrate 10) and a metallic counter electrode, such as a nickel or platinum counter electrode. The (nano)structures are formed inside the plurality of spaced (nano)channels of the template and may form longitudinally aligned spaced (nano)wires or (nano)pillars or a three-dimensional network comprising longitudinally aligned spaced (nano)wires and interconnecting (nano)structures between the spaced (nano)wires, depending on the architecture of the (nano)channels of the template. The length of the (nano)wires can be controlled by controlling the time of deposition. For instance, it was experimentally found that deposition of nickel at 10 mA/cm$^2$ for 150 s inside the channels of a porous template formed from copper doped aluminum leads to the formation of 2 micrometers high interconnected nickel (nano)wires.

For example, in a method 200 according to embodiments of the third aspect of the present disclosure, a catalyst material such as for example gold may first be provided at the plurality of (nano)channel bottoms of the template, e.g. by plating, and afterwards a semiconductor functional material, such as for example Si, Ge, InP, GaP, or GaAs may be deposited within the (nano)channels, e.g. by Chemical Vapor Deposition, to thereby form a plurality of semiconducting (nano)wires inside the plurality of (nano)channels.

For example, in a method 200 according to embodiments of the third aspect of the present disclosure, a Metal-Insulator-Metal stack may be deposited within the plurality of (nano)channels, for example by Atomic Layer Deposition. In such embodiments the insulator material may for example comprise alumina or $HfO_2$, and the metal layer may for example comprise TiN or Ru, the present disclosure not being limited thereto.

Although in some embodiments of the third aspect of the present disclosure the plurality of (nano)structures are aligned longitudinally with their longitudinal direction Y substantially orthogonal to the valve metal layer (substrate) surface, i.e. substantially orthogonal to direction X, the present disclosure is not limited thereto. In embodiments of the present disclosure the longitudinal direction of the plurality of spaced (nano)structure may make an angle of from for example 60° to 90° with the substrate surface on which the (nano)wires abut. In some embodiments, this angle is from 80° to 90°, e.g. substantially 90°, i.e. substantially orthogonal.

Figure 12A:
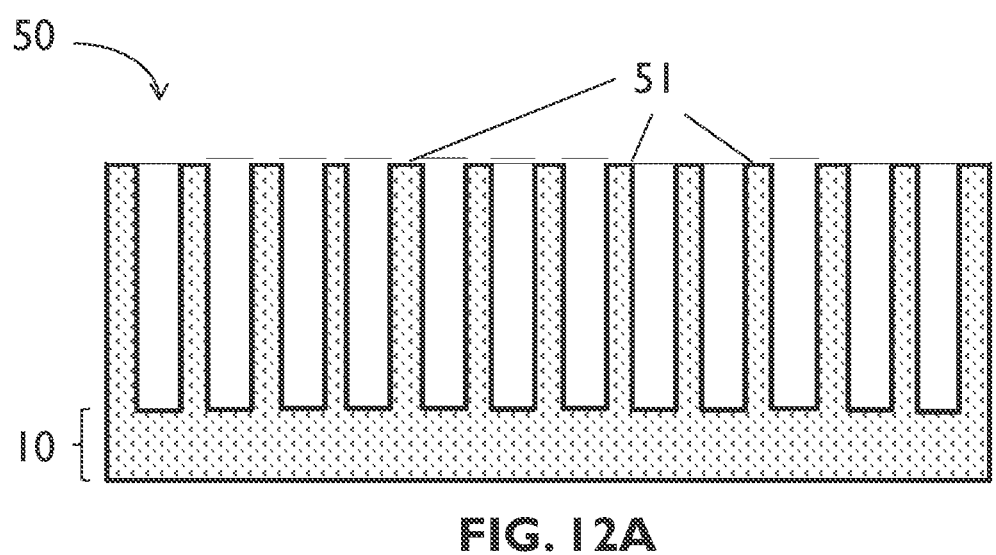
FIG. 12A schematically shows a cross section of an example of an entity, according to example embodiments.
Figure 12B:
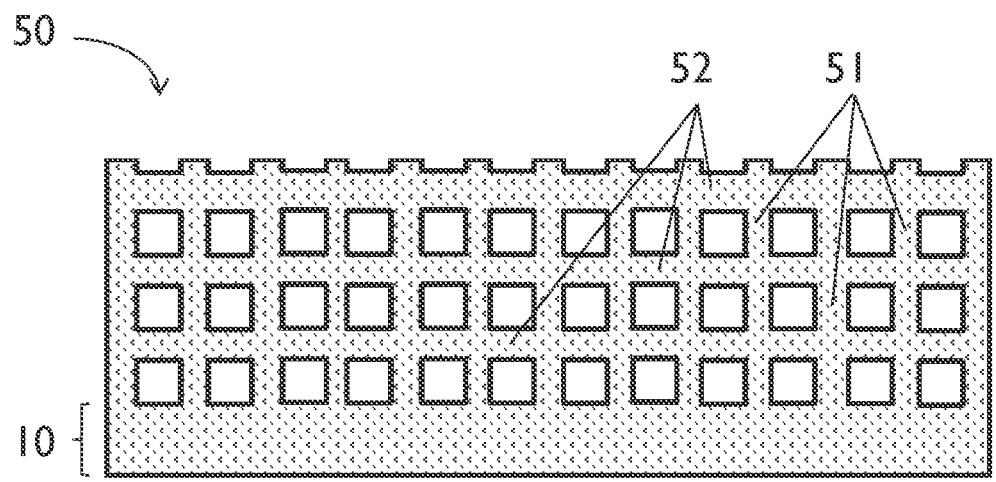
FIG. 12B schematically shows a cross section of an example of an entity, according to example embodiments.

According to a fourth aspect, the present disclosure related to an entity comprising a substrate and a plurality of spaced structures on the substrate, the plurality of spaced structures being aligned longitudinally along a first direction, as may be obtained using a method according to an embodiment of the third aspect of the present disclosure. FIG. 11, FIG. 12A and FIG. 12B each schematically show a cross section of an example of an entity according to an embodiment of the fourth aspect of the present disclosure. FIG. 12A illustrates an example of an entity 50 comprising a substrate 10 and a plurality of spaced structures 51 being aligned longitudinally along a first direction forming an angle of about 90° with respect to a surface of the substrate 10, i.e. being oriented substantially orthogonal to a surface of the substrate. FIG. 12B illustrates an example of an entity 50 comprising a substrate 10 and a plurality of spaced structures 51 being aligned longitudinally along a first direction forming an angle of about 90° with respect to a surface of the substrate 10, and further comprising a plurality of interconnecting structures 52 oriented along a second direction substantially orthogonal to the first direction.

According to a fifth aspect, the present disclosure relates to a device comprising an entity according to an embodiment of the fourth aspect of the present disclosure. Examples of devices wherein such an entity may be used are batteries, fuels cells, sensors, supercapacitors (such as Metal-Insulator-Metal supercapacitors), electrolyzers, photo-electrolyzers, and chemical reactors.

Figure 14:
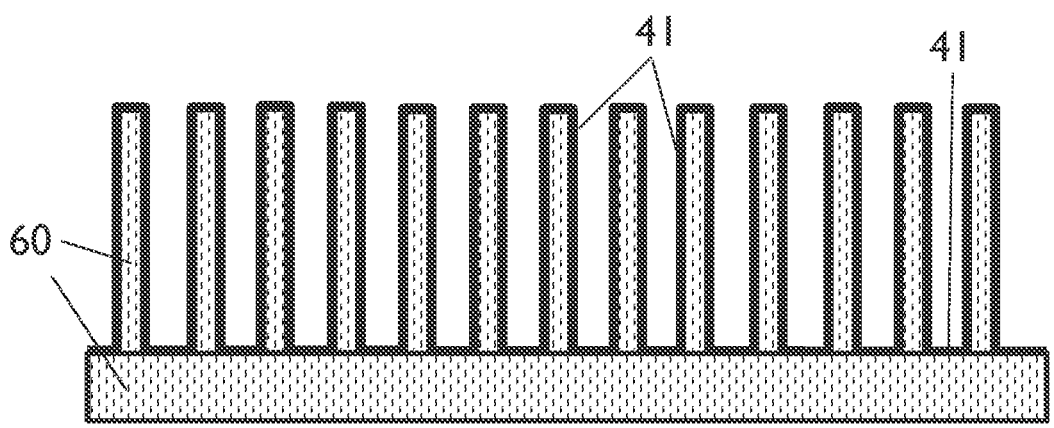
FIG. 14 schematically shows a cross section illustrating results of successive steps of the process sequence of FIG. 13, according to example embodiments.
Figure 15:
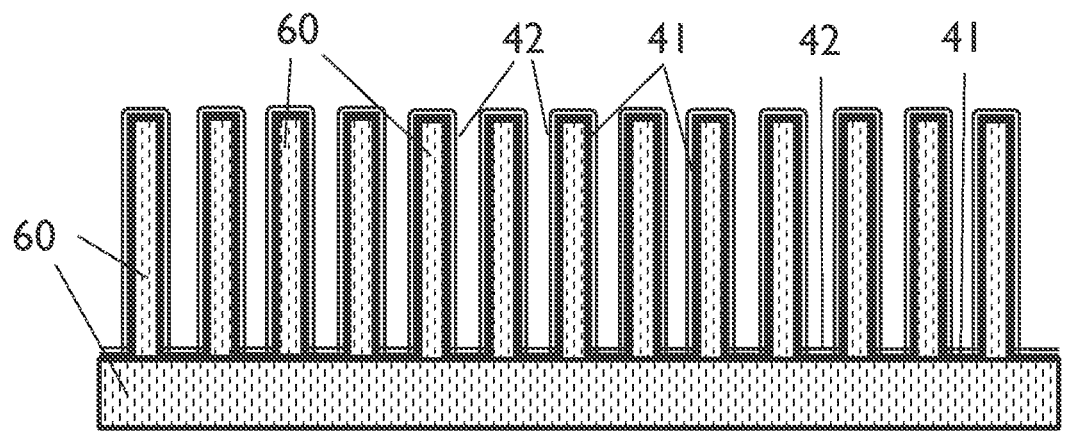
FIG. 15 schematically shows a cross section illustrating results of successive steps of the process sequence of FIG. 13, according to example embodiments.
Figure 16:
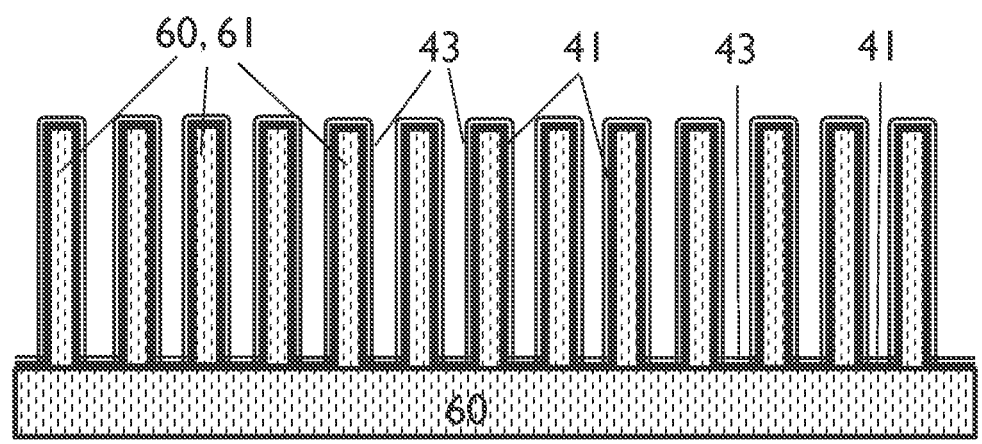
FIG. 16 schematically shows a cross section illustrating results of successive steps of the process sequence of FIG. 13, according to example embodiments.

According to a sixth aspect, the present disclosure relates to a method for forming a layer of functional material on an electrically conductive substrate. A method according to an embodiment of the sixth aspect of the present disclosure may for example be used for depositing an active electrode material on, for example, a transition metal substrate. An example of a method 300 according to the sixth aspect of the present disclosure is schematically illustrated in FIG. 13, showing a flow chart comprising an example process sequence, and in FIG. 14 to FIG. 16, schematically showing cross sections illustrating results of successive steps of the process sequence of FIG. 13.

Figure 13:
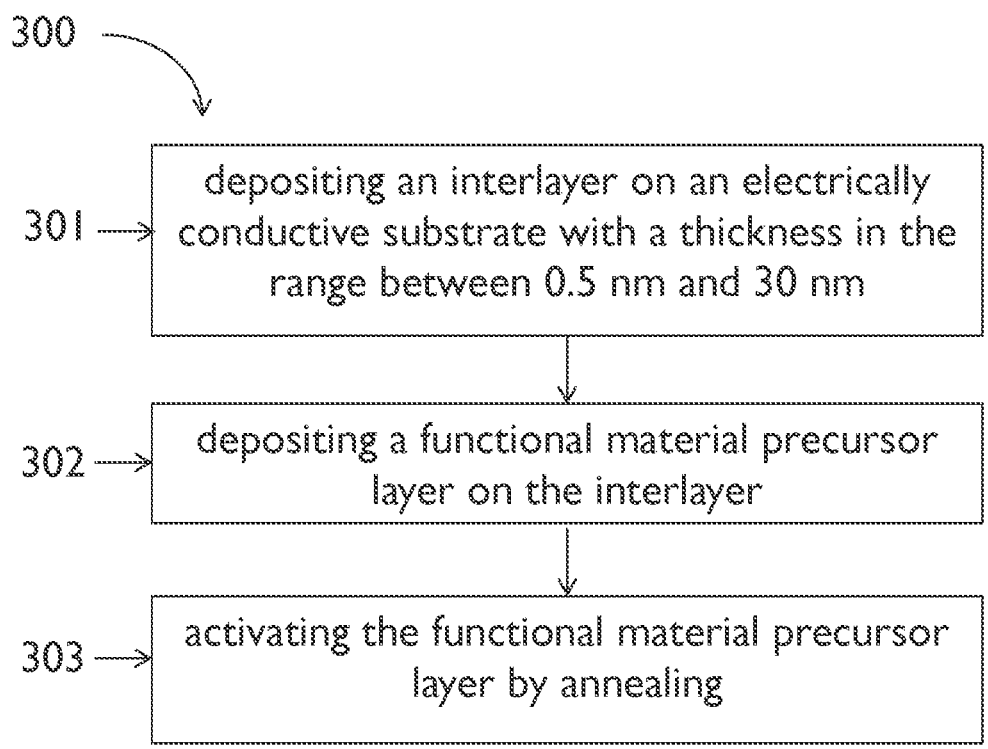
FIG. 13 illustrates a process sequence of a method for forming a layer of functional material on an electrically conductive substrate, according to example embodiments.

As illustrated in the example shown in FIG. 13, a method 300 according to an embodiment of the sixth aspect of the present disclosure comprises depositing 301 an interlayer on an electrically conductive substrate. The interlayer may for example have a thickness in the range between 0.5 nm and 30 nm, for example in the range between 0.5 nm and 5 nm, e.g. in the range between 0.5 nm and 3 nm.

In embodiments of the sixth aspect of the present disclosure the material of the interlayer is selected to provide protection against thermal degradation such as for example oxidation (i.e. to prevent oxidation) of the underlying electrically conductive substrate material during further process steps. For example, the material of the interlayer may be selected to have a low diffusivity of oxygen. It may be selected to be chemically inert with respect to a functional material precursor plating bath, to thereby prevent electro-oxidation of the underlying substrate material, e.g. transition metal, during electrodeposition. It may be selected to be chemically inert with respect to a layer of functional material precursor being deposited thereon in a further process step and/or being annealed in a further process step, to thereby prevent thermal oxidation of the underlying metal. In the context of the present disclosure, a low diffusivity of oxygen may refer to an oxygen diffusivity lower than the oxygen diffusivity in NiO at temperatures in the range between 300° C. and 500° C. In embodiments of the sixth aspect of the present disclosure the functional material precursor layer may for example be an electrode material precursor layer and the layer of functional material formed on the electrically conductive substrate may for example be an active electrode material, such as e.g. an active cathode material or an active anode material of a solid-state battery cell or battery.

In embodiments according to the sixth aspect of the present disclosure different interlayers may be combined, i.e. a stack of different types of interlayers may be deposited, to thereby provide protection of the substrate against both thermal oxidation and electro-oxidation.

The interlayer may for example comprise a transition metal oxide, a noble metal or a noble-metal oxide. For example, the interlayer may comprise $NiO_x$, $Cr_2O_3$, $TiO_2$, RuO, $RuO_2$, Ru, Au, or Pt, the present disclosure not being limited thereto. For example, a transition metal oxide interlayer such as a nickel oxide interlayer or a chromium oxide interlayer may be deposited using an electrodeposition process, e.g. in a weakly basic or basic solution having a pH in the range of 7 to 12. For example, the interlayer 31 may be deposited by immersing the substrate in a 0.1 M-1M solution of sodium citrate and applying a constant anodic current, for example in the range between 1 $mA/cm^2$ and 100 $mA/cm^2$ between the substrate (e.g. comprising a plurality of nickel (nano)wires) and a metallic counter electrode, for example for 1 to 10 minutes.

In particular, in embodiments wherein the electrically conductive substrate is a transition metal substrate the interlayer may substantially prevent or reduce oxidation of the transition metal during further process steps (e.g. for fabricating a battery cell). For example, it may prevent dissolution of nickel (nano)structures during deposition of a $MnO_x$ cathode precursor material layer, for example by anodic electrodeposition, and/or it may improve the resistance of nickel (nano)structures against oxidation during later thermal treatments, such as for example annealing for activating the layer of cathode precursor material.

A method according to embodiments of the sixth aspect of the present disclosure may be used for conformally forming a layer of active cathode material on a structure comprising a plurality of spaced (nano)structures, e.g. on a plurality of spaced (nano)wires or a plurality of spaced (nano)tubes, e.g. as may be formed in accordance with a method 200 of the third aspect of the present disclosure, for example on a plurality of spaced (nano)structures formed of an electrically conductive transition metal. Some examples of such a structure (three-dimensional substrate) are schematically illustrated in FIG. 11, FIG. 12A and FIG. 12B, but the present disclosure is not limited thereto.

When referring to a substrate in the context of the sixth aspect of the present disclosure, an electrically conductive substrate is indicated. This includes at one hand substrates or structures entirely made of an electrically conductive material, and at the other hand also substrates or structures comprising different materials or different material layers, with an electrically conductive layer, such as for example a nickel layer, being exposed at a surface thereof. An example of an electrically conductive substrate, more in particular a three-dimensional electrically conductive substrate on which layer of active cathode material may be formed in a sixth aspect of the present disclosure is schematically illustrated in FIG. 11, FIG. 12A and FIG. 12B.

FIG. 14 schematically shows an electrically conductive substrate 60, after deposition 301 of an interlayer 41 according to a method of the sixth aspect of the present disclosure.

In a next step, after deposition of the interlayer 41, a method 300 according to the sixth aspect of the present disclosure comprises depositing 302 (FIG. 13) a functional material precursor layer on the interlayer 41. The functional material precursor layer may for example be conformally deposited by potentiostatic or galvanic electrodeposition, such as anodic electrodeposition. FIG. 15 illustrates the structure after conformal deposition 302 of a functional material precursor layer 42 on the interlayer 41. A conformally deposited layer is a layer with a uniform thickness, exactly following the topography of the underlying layer.

In a subsequent step, a method 300 according to the sixth aspect of the present disclosure comprises activating 302 (FIG. 13) the functional material precursor layer 42 by annealing, to thereby form the layer of functional material 43. The resulting structure is schematically illustrated in FIG. 16, showing the electrically conductive substrate 60, in the example comprising a plurality of electrically conductive (nano)structures 61, being conformally coated with a layer of functional material 43, the layer of functional material 43 being provided over the interlayer 41.

The functional material precursor layer 42 may for example be a layer of cathode precursor material, for example comprising manganese oxide, manganese dioxide, cobalt oxide, manganese nickel oxide, iron phosphate. The layer of functional material 43 may for example be a layer of active cathode material, for example comprising lithium manganese oxide, lithium cobalt oxide, lithium iron phosphate, or lithium sulphide, the present disclosure not being limited thereto.

For example, depositing 302 a layer of cathode precursor material 42 on the interlayer 41 may comprise depositing a manganese dioxide ($MnO_2$) layer on the interlayer by applying a constant anodic current (e.g. in the range between 1 mA/cm2 and 100 mA/cm2) between the electrically conductive substrate and a metallic counter electrode, after immersing the substrate with the interlayer in a solution containing for example 0.1M to 10M $MnSO_4$, e.g. 0.1M to 1M $MnSO_4$, and 0.1M to 10M $H_2SO_4$, e.g. 0.1M to 1M $H_2SO_4$, at a temperature in the range between 20° C. and 100° C., e.g. between 20° C. and 50° C. The thickness of the layer of cathode precursor material may be controlled by controlling the time of electrodeposition. A layer of $MnO_x$ material deposited as described hereinabove typically has a porosity in the range between 10% and 80%. Such a porosity may allow for the accommodation of an ion precursor for activating the layer of cathode precursor material ($MnO_x$), such as for example a lithium containing precursor for conversion into lithiated manganese oxide. The porosity may further allow for the accommodation of an electrolyte, which may be provided in a further process step.

Activating 302 the layer of cathode precursor material by annealing comprises activating the layer of cathode precursor material for ion insertion/extraction. This annealing may be done in the presence of an ion containing precursor, such as for example a lithium containing precursor, a sodium containing precursor or a magnesium containing precursor, to thereby form a layer of active cathode material. This activating step may for example comprise coating the layer of cathode precursor material with a lithium-containing precursor such as a lithium-containing salt and afterwards annealing, for example annealing at a temperature in the range between 250° C. and 600° C.

Examples are provided hereinbelow, which illustrate experiments in which a method according to embodiments of the sixth aspect of the present disclosure was used for forming a layer of active cathode material on an electrically conductive transition metal substrate. These examples are provided for illustrating features of embodiments of the third aspect of the present disclosure, and to aid the skilled person in reducing the disclosure to practice. However, these examples should not be construed as limiting the disclosure in any way.

The formation of the NiO containing interlayer was found to show a self-terminating behavior. The thickness of this interlayer was found to be limited to about 1 nm.

It was experimentally shown that the interlayer 41 may prevent electro-oxidation of the underlying nickel substrate 40 during subsequent $MnO_x$ electroplating, while the deposition of $MnO_x$ by electroplating is still possible.

Figure 17:
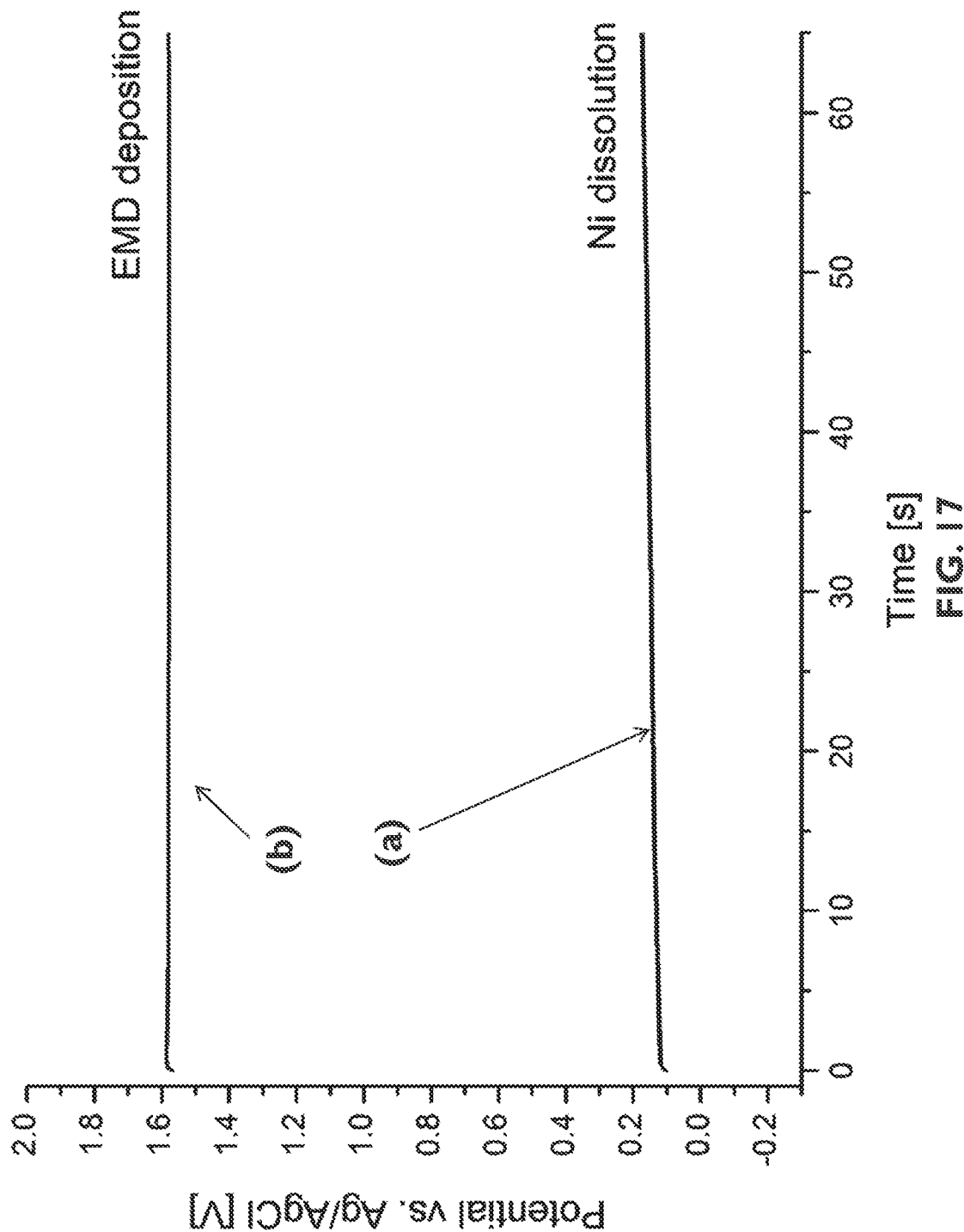
FIG. 17 shows potential transients as measured during galvanostatic deposition of a $MnO_x$ cathode precursor layer on Ni nano-mesh samples. The curves labeled (a) corresponds to samples without an interlayer being provided, whereas the curve labeled (b) corresponds to samples covered with an interlayer, according to example embodiments.

This is illustrated in FIG. 17, showing potential transients as measured during galvanostatic deposition of a $MnO_x$ cathode precursor layer on Ni nano-mesh samples. The samples used in the experiments comprise a 3.3 micrometer thick Ni nano-mesh layer on a TiN/Si wafer. For a first part (1) of the samples, an interlayer 41 was provided on the Ni nano-mesh layer, by electrodeposition in a 0.4M sodium citrate solution at 30° C. and by subsequent application of an anodic current at 2.4 $mA/cm^2$ and 6 $mA/cm^2$ current density for 60 s each. A Pt counter electrode was used. For a second part (2) of the samples no interlayer was provided, leaving the Ni nano-mesh layer exposed. The galvanostatic deposition of $MnO_x$ was done in a 0.3M $MnSO_4$+0.55M $H_2SO_4$ bath at 30° C. using a current density of 16 $mA/cm^2$ footprint (or 0.16 $mA/cm^2$ of nano-mesh real area). The Ni nano-mesh layer acted as a working electrode, a platinum mesh was used as a counter electrode and Ag/AgCl as a reference electrode.

The curve labeled (b) in FIG. 17 shows potential transients as measured on the Ni nano-mesh substrate covered with an interlayer 41, according to an embodiment of the third aspect of the present disclosure. The curve corresponds to the $MnO_x$ potential and illustrates $MnO_x$ deposition on the Ni nano-mesh substrate. A SEM analysis did not show any visible degradation of the nano-mesh. The curve labeled (a) in FIG. 17 shows potential transients as measured on the Ni nano-mesh substrate on which no interlayer was provided and wherein the Ni was thus exposed to the electroplating solution. It corresponds to the potential of Ni dissolution. A SEM analysis showed degradation of the Ni nano-mesh, and did not reveal any $MnO_x$ deposition.

Figure 18:
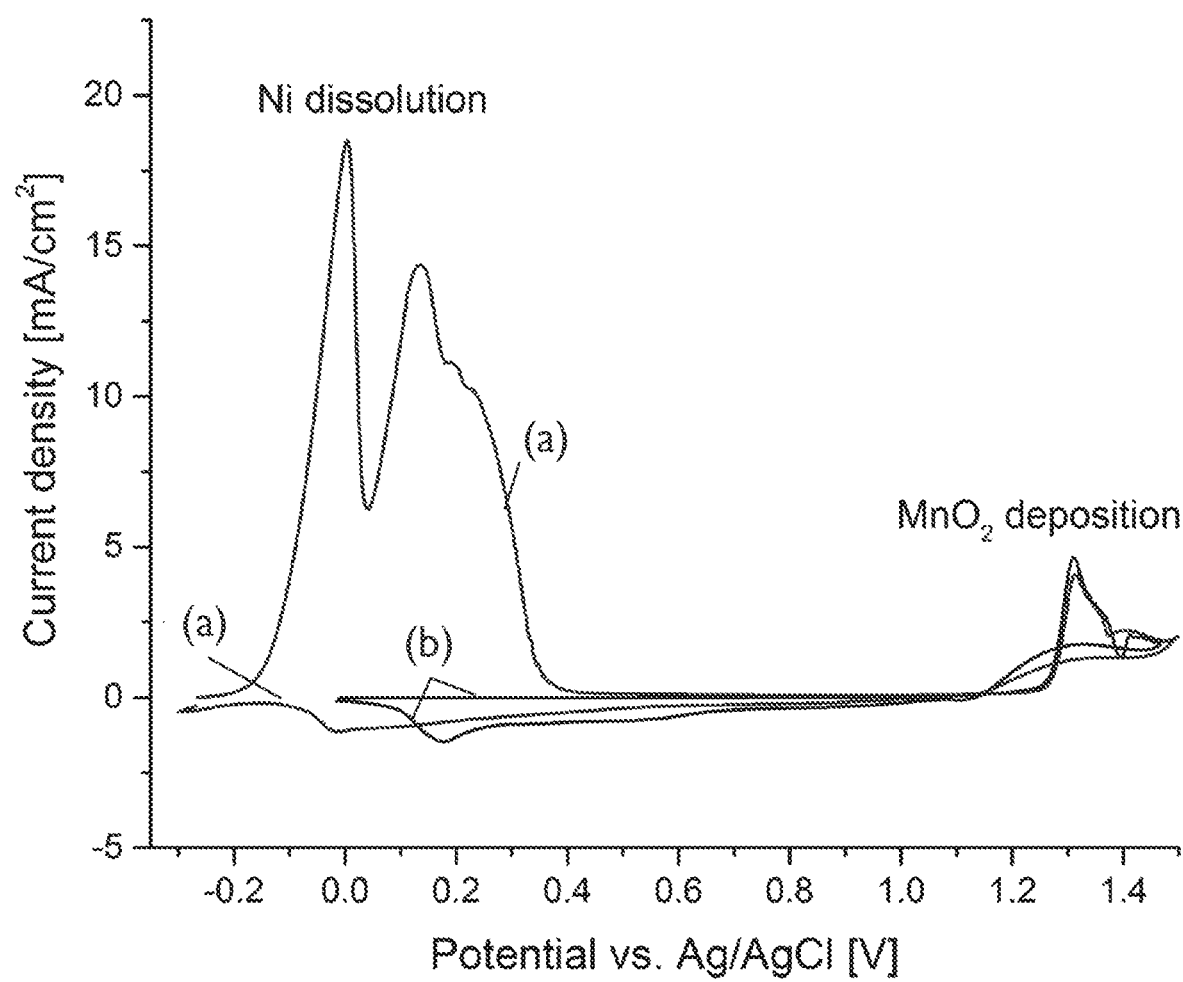
FIG. 18 shows results of a cyclic voltammetry experiment on a structure comprising a nickel substrate with a $MnO_x$ layer deposited thereon. Curves labeled (a) correspond to a structure without an interlayer being provided, whereas curves labeled (b) correspond to a structure having an interlayer provided thereon before deposition of the $MnO_x$ layer, according to example embodiments.

This is further illustrated in FIG. 18, showing results of cyclic voltammetry experiments. In these experiments, samples comprising a planar 150 nm thick Ni layer provided by Physical Vapor Deposition on top of a 150 nm thick TiN layer on a Si wafer were used. The sample labeled (a) in FIG. 18 was cleaned with acetone and IPA and dried with $N_2$, while the sample labeled (b) was cleaned with 20% HCl, water and IPA and dried with $N_a$. An interlayer was subsequently provided on sample (b) by electrochemical deposition. An anodic current of 6 mA/cm$^2$ was passed through the nickel layer immersed in a sodium citrate bath at 30° C., for 180 s. It was found that this resulted in a very thin layer of NiO/Ni(OH)$_2$, possibly functionalized with citrate moieties, formed on the surface of nickel layer: $Ni+3H_2O \rightarrow NiO+ 2e^-+2H_3O^+$. For the electrodeposition of a MnO$_x$ layer the samples were used as a working electrode, a platinum mesh was used as a counter electrode and Ag/AgCl (3M KCL) was used as a reference electrode. The solution consisted of 0.3M MnSO$_4$ and 0.55M H$_2$SO$_4$. The cyclic voltamograms shown in FIG. 18 were recorded between the open circuit potential of the working electrode and 1.5 V vs Ag/AgCl, at a scanning speed of 10 mV/s, at 25° C. Curves labeled (a) correspond to a structure without an interlayer being provided before deposition of the MnO$_x$ layer, whereas curves labeled (b) correspond to a structure having an interlayer provided thereon before deposition of the MnO$_x$ layer, in accordance with an embodiment of the third aspect of the present disclosure. Upon application of anodic potentials, nickel dissolution peaks between −0.1V and 0.3V can clearly be seen for sample (a) without an interlayer being provided on the nickel electrode, and no nickel dissolution is visible for sample (b) having a NiO interlayer between the nickel electrode and the MnO$_x$ active cathode material. No MnO$_x$ deposition was observed for sample (a). This illustrates that the anodic dissolution of nickel in the acidic medium is more thermodynamically and kinetically favorable than deposition of MnO$_x$.

In embodiments of a method according to the sixth aspect of the present disclosure, the interlayer 41 may further protect the underlying metal, e.g. nickel, for oxidation during later annealing steps. For example, the step of activating 303 the layer of cathode precursor material 42 may comprise lithiation (activation for lithium insertion/extraction), resulting in conversion of the cathode precursor material (e.g. MnO$_x$) to a lithium-containing active cathode material (e.g. manganese oxide (LMO)). The lithiation may comprise an electrochemical conversion or a solid-state conversion. The lithiation step may for example comprise coating the MnO$_x$ layer with a lithium-containing salt (e.g. Li$_2$CO$_3$, LiOH, LiNO$_3$) and annealing at an elevated temperature, for example at a temperature in the range between 250° C. and 600° C., to form electroactive lithium manganese oxide. It was experimentally found that, due to the oxidizing nature of MnO$_x$ upon annealing in a nitrogen atmosphere of a sample comprising a MnO$_x$ layer being provided directly on a substrate comprising nickel nanowires, the nickel nanowires were oxidized. A relatively thick nickel oxide layer was formed (e.g. 5 nm to 20 nm thick, corresponding to 25% to 100% of the nanowires diameter). The reaction can be written as follows:

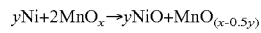

$$yNi+2MnO_x \rightarrow yNiO+MnO_{(x-0.5y)}$$

where $1<x \leq 2$ and $y \leq -2(1-x)$.

In most extreme cases (longer annealing times or higher temperatures), complete oxidation of nickel (nano)wires was observed. Nickel oxide is a p-type semiconductor and thus is not suitable as a material for a battery current collector, which should be conductive for both negative and positive currents.

By providing an interlayer 41 according to embodiments of the sixth aspect of the present disclosure, such oxidation of the current collector material (such as nickel) may be substantially avoided. In some embodiments according to the sixth aspect of the present disclosure, the interlayer may form an effective oxygen diffusion barrier which shields the underlying metal, e.g. nickel, from oxidation, e.g. by the active cathode material precursors, e.g. MnO$_x$ precursors. The interlayer may be a thin layer, e.g. having at thickness smaller than 30 nm, e.g. smaller than 5 nm, in view of not adding excessive volume to the electrode and to have reasonable electronic conductance.

The interlayer can for example consist of nickel oxide as described above, or it can consist of a transition metal such as titanium or chromium, or a noble metal such as ruthenium, gold, or platinum. The interlayer may also be formed with oxides of such metals. The metal or metal oxide interlayers may be coated on (nano) structures, e.g. nickel (nano)structures, either by electrodeposition or by gas phase methods such as ALD (Atomic Layer Deposition) or CVD (Chemical Vapor Deposition). The interlayer can in general be deposited by various methods, such as but not limited to, electrodeposition, physical vapor deposition, chemical vapor deposition, or atomic layer deposition. Atomic layer deposition may yield the highest conformality of the deposited interlayer on high aspect ratio surfaces and may thus for that reason be used. After coating, an additional step of annealing in a reducing atmosphere (e.g. H$_2$/Ar, forming gas) may optionally be done to reduce the metal oxide to its corresponding metallic form.

In an embodiment, a spinel LiMn$_2$O$_4$ layer of active cathode material may be formed. After deposition of a layer of MnO$_x$ as described above, the substrate with deposited MnO$_x$ may be immersed in a solution containing lithium salts such as 0.1M to 3M LiOH or LiNO$_3$ or Li$_2$CO$_3$, and subjected to spin coating for removal of excess solution. Next an annealing step, e.g. at 350° C., may be done to form spinel phase LiMn$_2$O$_4$. The excess of lithium salt may be further removed by washing in water. The so-formed active material typically has a porosity between 10% and 80% and allows accommodating a volume of later provided electrolyte material.

According to a seventh aspect, the present disclosure relates to a method for fabricating a solid-state battery cell, wherein the method comprises forming a plurality of electrically conductive (nano)structures according to an embodiment of the third aspect of the present disclosure, and forming a first layer of active electrode material on the plurality of electrically conductive structures, wherein the first layer of active electrode material conformally coats surfaces of the plurality of electrically conductive structures. Next an electrolyte layer is deposited over the layer of active electrode material, and a second layer of active anode material is formed over the electrolyte layer. One of the first layer of active electrode material and the second layer of active electrode material forms a cathode layer and the other one forms an anode layer of the solid-state battery cell. A current collector layer may be deposited over the second layer of active electrode material.

In embodiments according to the seventh aspect of the present disclosure the substrate comprises an electrically conductive layer. In embodiments the substrate may consist of an electrically conductive layer, such as for example a metal foil, e.g. an aluminum, copper, chromium, or nickel foil. The plurality of spaced electrically conductive (nano) structures may for example comprise (nano)wires or (nano) tubes. The plurality of spaced electrically conductive (nano)

structures may for example comprise nickel, aluminum, copper, or chromium and they may have a longitudinal direction oriented substantially orthogonal to the substrate surface. The cathode material may for example contain manganese (di)oxide (e.g. MnO or $MnO_2$), lithium manganese oxide (e.g. $LiMn_2O_4$, $LiMnO_2$, or $Li_2MnO_3$), lithium manganese nickel oxide, lithium cobalt oxide (e.g. $LiCoO_2$ or $LiCo_2O_4$), lithium nickel oxide (e.g. $LiNiO_2$), cobalt (II,III) oxide, lithium manganese phosphate (e.g. $LiMnPO_4$), lithium iron phosphate (e.g. $LiFePO_4$), lithium cobalt phosphate (e.g. $LiCoPO_4$), lithium sulfide (e.g. $Li_2S$), lithium titanium sulfide (e.g. $LiTiS_2$), sodium iron phosphate, tungsten selenide, vanadium pentoxide, molybdenum disulfide, or sulfur. The layer of active anode material may for example comprise lithium titanium oxide (e.g. $Li_4Ti_5O_{12}$), metallic lithium, titanium dioxide, vanadium pentoxide, silicon, graphite, manganese(II) monoxide, metallic magnesium, metallic sodium, metallic potassium, metallic germanium, or metallic tin. In some embodiments, it may be formed by a method according to an embodiment of the third aspect of the present disclosure. The current collector layer may for example comprise metallic lithium or a foil of nickel, aluminum, copper, chromium, or zinc, the present disclosure not being limited thereto.

In embodiments according to the seventh aspect of the present disclosure, an electrolyte layer is deposited over the first layer of active electrode material. In some embodiments, the electrolyte layer may be a solid electrolyte layer. The solid electrolyte layer may be deposited conformally over the first layer of active electrode material or it may be deposited non-conformally, such as for example with an upper surface that is substantially flat and substantially parallel to the substrate surface. In embodiments, a combination of a conformally coated solid electrolyte layer and a non-conformally coated solid electrolyte layer may be used. For example, a first solid electrolyte layer may be conformally deposited over the first layer of active electrode material and next a second solid electrolyte layer may be non-conformally deposited over the first solid electrolyte layer. Deposition of a solid electrolyte layer may for example be done using electrodeposition, by drop casting an electrolyte precursor solution and spin coating the excess of the precursor solution, or by vapor phase deposition such as atomic layer deposition. In other embodiments, the electrolyte layer may be a liquid electrolyte layer.

For example, in an embodiment the solid electrolyte layer may comprise lithium phosphorous oxynitride (LiPON) or a solid composite electrolyte (e.g. $Li_2S$—$P_2S_5$). A solid LiPON electrolyte layer may for example be deposited by ALD cycling of lithium tert-butoxide, trimethylphosphate, and water, with or without addition of nitrogen in the deposition chamber. This leads to impregnation of the cathode active material with the solid-state electrolyte. Additionally, an electrolyte layer, for example having a thickness in the range between 50 nm and 1 micrometer may be deposited on top of the stack, e.g. by sputter coating or spin coating. Following the additional deposition, the stack may be subjected to a heat treatment, for example at a temperature in the range between 50° C. and 350° C., for enhanced gelification or sintering purposes. In an alternative embodiment, the liquid electrolyte may comprise a solution of $LiPF_6$ in propylene carbonate and ethylene carbonate. In order to prevent e.g. direct contact between an anode and a cathode, a thin porous separator may be combined with liquid electrolyte. The separator may for example comprise a cellulose membrane or a perforated cellulose membrane.

In embodiments according to the seventh aspect of the present disclosure, a second layer of active electrode material is formed over the electrolyte layer. The second layer of active electrode material may be deposited conformally over the electrolyte layer or it may be deposited non-conformally, such as for example with an upper surface that is substantially flat and substantially parallel to the substrate surface. In embodiments, a combination of a conformally coated second layer of active electrode material and a non-conformally coated layer may be used. Deposition of a second layer of active electrode material may for example be done using vapor phase deposition, such as DC sputtering, thermal evaporation, atomic layer deposition, or chemical vapor deposition. For example, in an embodiment, the second active electrode material may be metallic lithium. The layer of metallic lithium may for example have a thickness in the range between 0.5 micrometer and 10 micrometers. It may for example be deposited by thermal evaporation of lithium onto the electrolyte layer. In another embodiment, the second layer of active electrode material may for example comprise spinel $Li_4Ti_5O_{12}$ or amorphous $TiO_2$. These active anode materials may for example be deposited by DC sputtering or ALD coating, followed by annealing (sintering), e.g. at a temperature in the range between 200° C. and 400° C. If some embodiments a thin electrically conductive layer, such as an aluminum layer or a nickel layer, e.g. having a thickness in the range between 50 nm and 1 micrometer, may be deposited on top of the layer of active anode material, for example by DC sputtering or thermal evaporation.

The battery cell thus obtained may be coated with a polymer layer such as a polydimethoxysilane (PDMS) layer or a poly(methyl methacrylate) layer, for example with a thickness in the range between 100 nm and 5 micrometer, to protect it from air and moisture. The polymer layer may for example be applied by spin coating, blade coating, or drop casting, followed by curing at a temperature for example in the range between 20° C. and 150° C.

According to an eighth aspect, the present disclosure is related to a method for fabricating a solid-state battery cell, the method comprising: forming a plurality of spaced electrically conductive structures on a substrate; forming a first layer of active electrode material on the plurality of spaced electrically conductive structures according to a method of the sixth aspect of the present disclosure, wherein the first layer of active electrode material conformally coats surfaces of the plurality of electrically conductive structures; depositing an electrolyte layer over the first layer of active electrode material; and depositing a second layer of active electrode material over the electrolyte layer. One of the first layer of active electrode material and the second layer of active electrode material forms a cathode layer and the other one forms an anode layer of the solid-state battery cell. A current collector layer may be deposited over the second layer of active electrode material.

According to a ninth aspect, the present disclosure is related to a method for fabricating a solid-state battery. A method according to the ninth aspect of the present disclosure comprises: fabricating a plurality of solid-state battery cells in accordance with an embodiment of the seventh or the eighth aspect of the present disclosure; and forming a stack of the plurality of solid-state battery cells with an electrolyte being provided in between neighboring solid-state battery cells.

Figure 19:
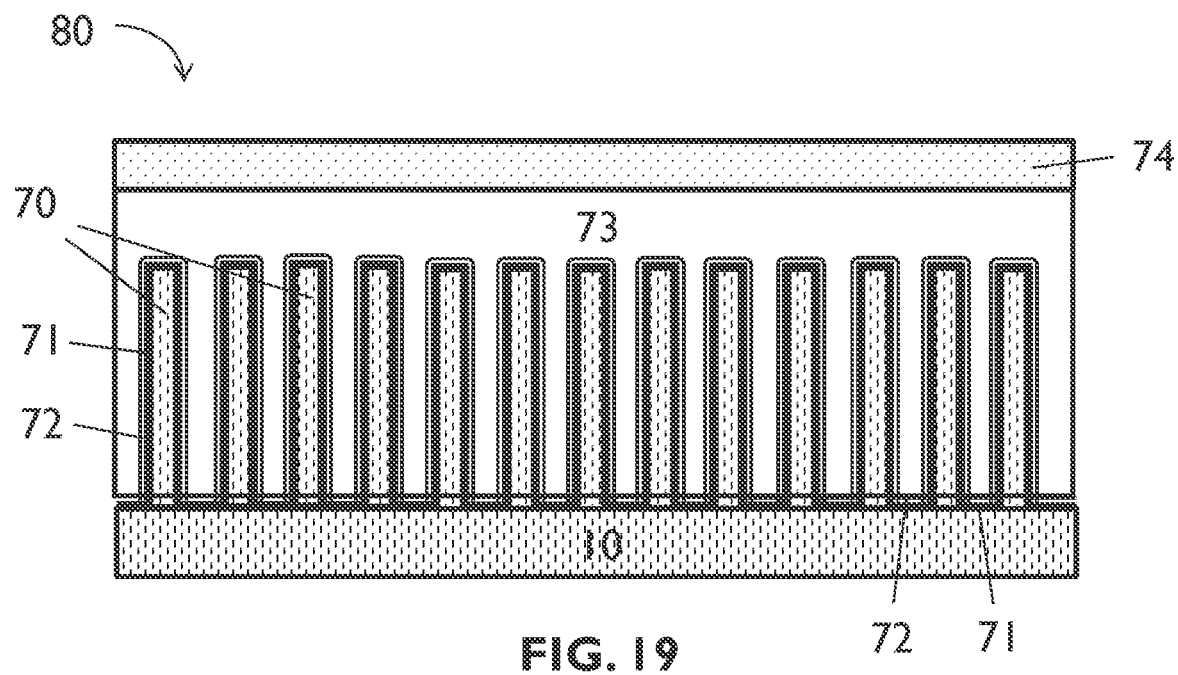
FIG. 19 schematically shows a cross section of an example of a solid-state battery cell, according to example embodiments.

According to a tenth aspect, the present disclosure is related to a solid-state battery cell. An example of a solid-state battery cell according to an embodiment of the tenth aspect of the present disclosure is schematically illustrated in FIG. 19. In the example shown, the solid-state battery cell 80 comprises a plurality of spaced electrically conductive structures 70. More in particular, FIG. 19 shows an embodiment wherein the plurality of spaced electrically conductive structures 70 is aligned along a direction substantially orthogonal to a substrate 10 on which those structures are provided. This is only an example, and in embodiments of the tenth aspect of the present disclosure other orientations, shapes and/or configurations may be used. As illustrated in FIG. 19, the plurality of spaced electrically conductive structures 70 is conformally coated with an interlayer 71, the interlayer 71 being conformally coated with a first layer of active electrode material 72. The solid-state battery cell 80 further comprises a solid electrolyte layer 73 over the first layer of active electrode material 72. In the example shown, the solid electrolyte layer 73 is provided non-conformally and has an upper surface that is substantially flat and substantially parallel to a surface of the substrate 10. However, this is only an example and the present disclosure is not limited thereto. The solid-state battery cell 80 further comprises a second layer of active electrode material 74 over the solid electrolyte layer 73.

In a solid-state battery cell 80 according to an embodiment of the tenth aspect of the present disclosure the interlayer 71 may for example comprise a transition metal oxide layer, a noble metal layer or a noble-metal oxide layer. It may for example have a thickness in the range between 0.5 nm and 30 nm. One of the first layer of active electrode material 72 and the second layer of active electrode material 74 forms a cathode layer and the other one forms an anode layer of the solid-state battery cell 80.

Battery cells of the tenth aspect of the present disclosure may further be stacked into batteries or battery packs, for example for increasing the delivered electrical potential or current of the device upon discharging.

Figure 20:
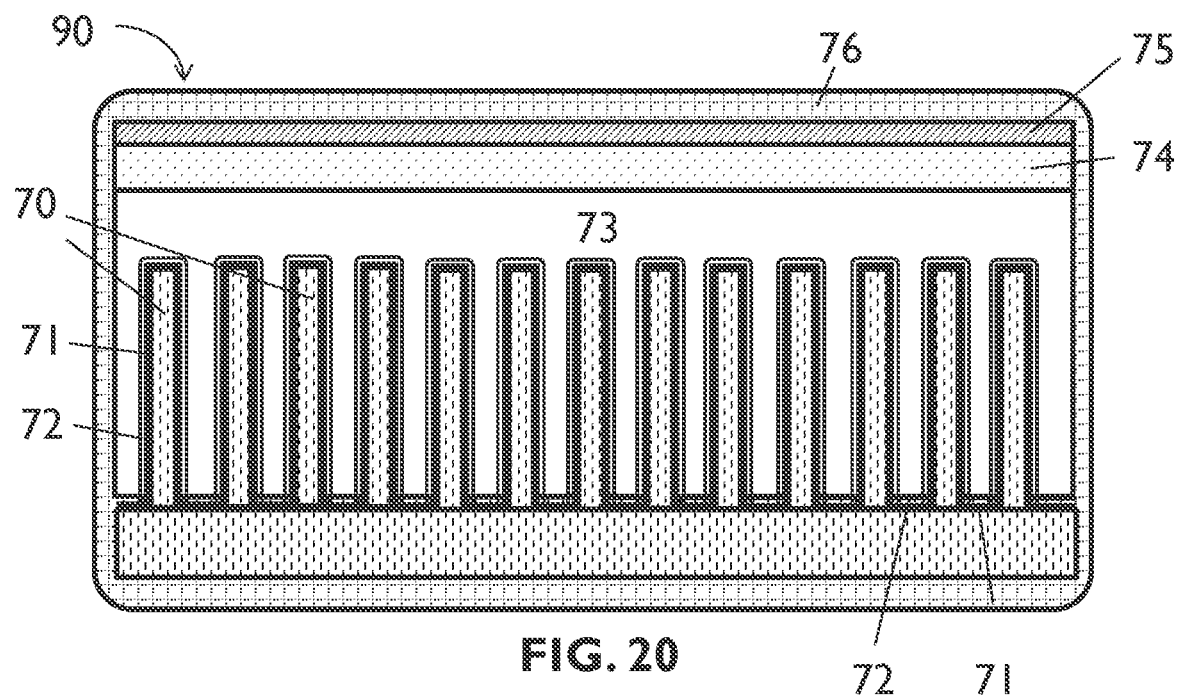
FIG. 20 schematically shows a cross section of an example of a solid-state battery, according to example embodiments.

According to an eleventh aspect, the present disclosure relates to a solid-state battery comprising at least one solid-state battery cell in accordance with an embodiment of the tenth aspect of the present disclosure. FIG. 20 schematically shows a cross section of an example of such a solid-state battery 90. In the example shown in FIG. 20, the solid-state battery 90 comprises a single solid-state battery cell 80 corresponding to the example illustrated in FIG. 19. However, the present disclosure is not limited thereto. Further, a solid-state battery 90 in accordance with the eleventh aspect of the present disclosure may comprise more than one, for example two, for example a plurality of solid-state battery cells 80 (not illustrated).

In the solid-state battery shown in FIG. 20, the plurality of electrically conductive structures 70 have the function of a first current collector of the battery 90. The solid-state battery 90 further comprises a second current collector 75 over the second layer of active electrode material 74, and an encapsulation layer 76.

Example 1: Fabrication of a 3D-2D Battery

Figure 21:
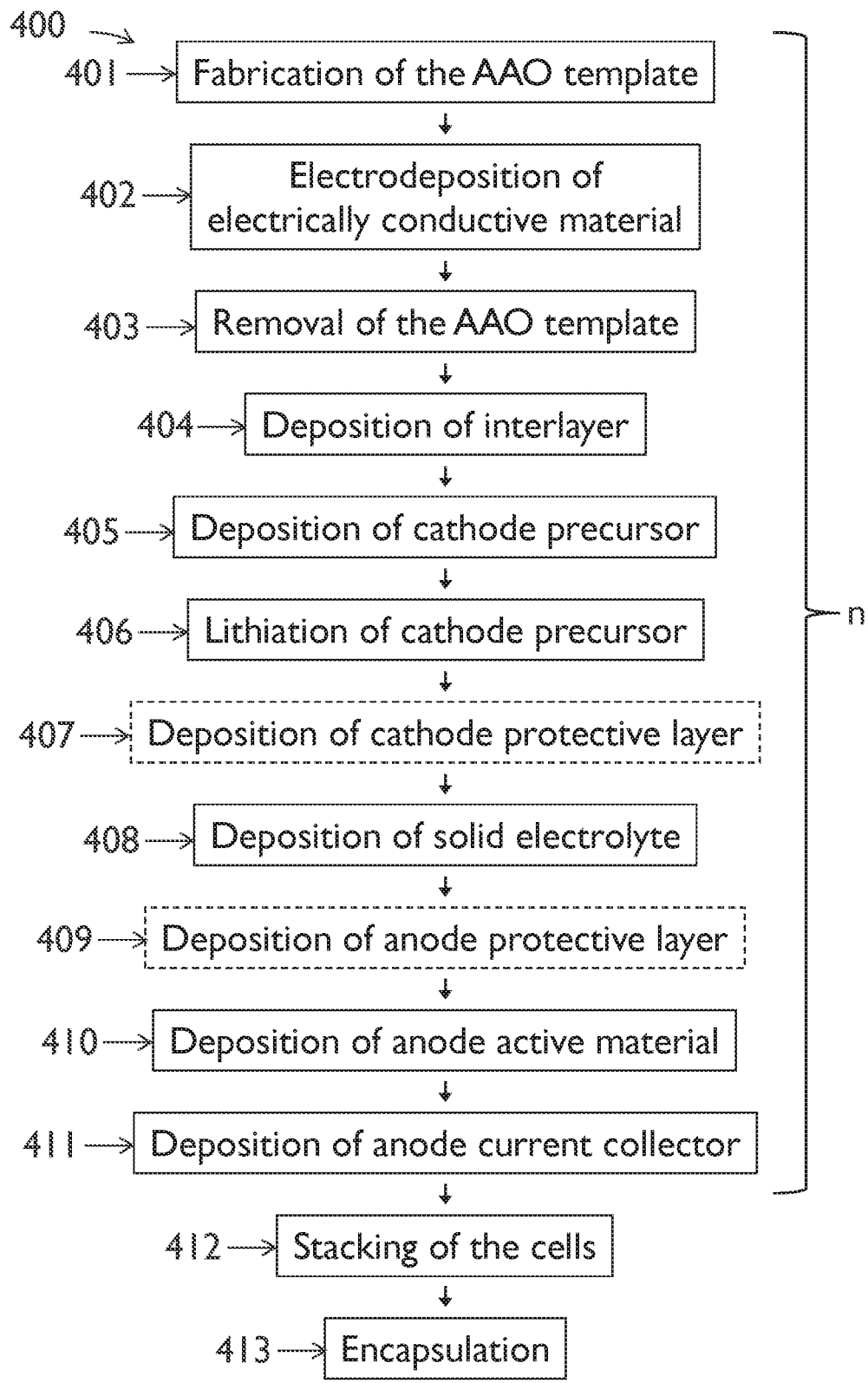
FIG. 21 illustrates an example process sequence of a method for fabricating solid-state battery cells and/or solid-state batteries, according to example embodiments.

A flow-chart of different steps in a method 400 is shown in FIG. 21.

A 40 μm thick aluminum layer doped with 0.2 at. % copper was anodized 401 in 0.3 M oxalic acid at 30° C. and 40 V. The anodization was performed for 220 min to form a 40 μm thick porous anodic aluminum oxide (AAO) template supported by a 5 μm non-anodized aluminum layer 10 (e.g. the cathode current collector 10 or first current collector 10). This structure could be used to fabricate one-sided nano-mesh-based electrodes, represented in FIG. 22.

Alternatively, a 80 μm thick aluminum layer doped with 0.2 at. % copper was anodized 401 on both sides in 0.3 M oxalic acid at 30° C. and 40 V. The anodization was performed for 220 min to form 40 μm thick AAO templates on both sides of the remaining (e.g. 5 μm) non-anodized aluminum layer 10. This structure could be used to fabricate double-sided nano-mesh-based electrodes, represented in FIG. 23.

The template was subjected to a protective treatment by annealing at 500° C. for 12 h in air. Following that, a second anodization was applied in oxalic acid with addition of isopropanol, at 40 V for 60 s. After that, the template's barrier layer was etched from the channel bottoms with 5% orthophosphoric acid at 30° C. during 40 min. After that, an electrically conductive material (e.g. a metal) 70c was electrodeposited 402 inside the template, thereby forming a plurality of spaced electrically conductive structures, more in particular a plurality of spaced nanowires forming a nano-mesh structure. When the nano-mesh 70c was made of nickel, the plating was done from a 0.6 M nickel(II) sulfamate+0.6 M boric acid bath, using a cathodic current density of 10 mA/cm$^2$, at 30° C. to form an approximately 40 μm thick nano-mesh network 70c. Following that, the AAO template was removed 403 using an Al$_2$O$_3$ selective etchant. The etchant could consist for example of a 1.6% HCrO$_4$+5% H$_3$PO$_4$ mixture and the etching could be performed at 30° C. for 1 h. Alternatively, 0.5 M NH$_4$F in glacial acetic acid could be used to selectively etch Al$_2$O$_3$ over non-anodized aluminum substrate 10 and nickel nano-mesh 70c, at 20° C. for 1 h.

The cathode nano-mesh 70c was then subjected 404 to the deposition of an interlayer comprising, for example, anodization in a 0.4 M sodium citrate solution at 50 mA/cm$^2$ and 20° C. for one minute.

In another example, the nano-mesh electrode 70c was subjected 404 to the deposition of an interlayer, the deposition comprising 5 cycles of: immersing in 0.1 M solution of propargyl alcohol, washing with water, immersing in 0.1 M solution of potassium permanganate and washing with water.

Figure 22:
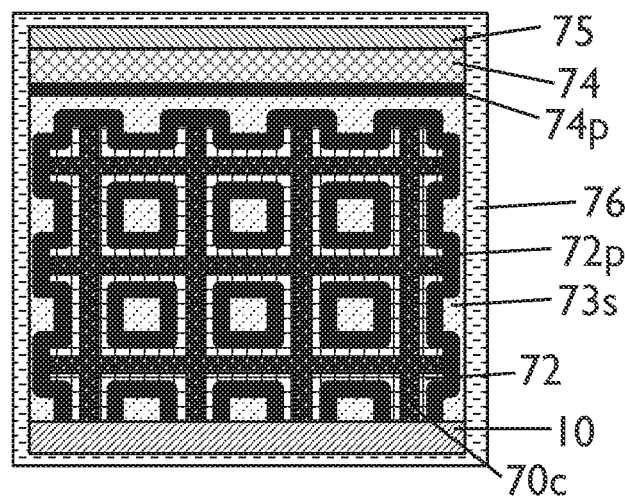
FIG. 22 schematically shows a cross section of an example of solid-state battery cells, according to example embodiments.
Figure 23:
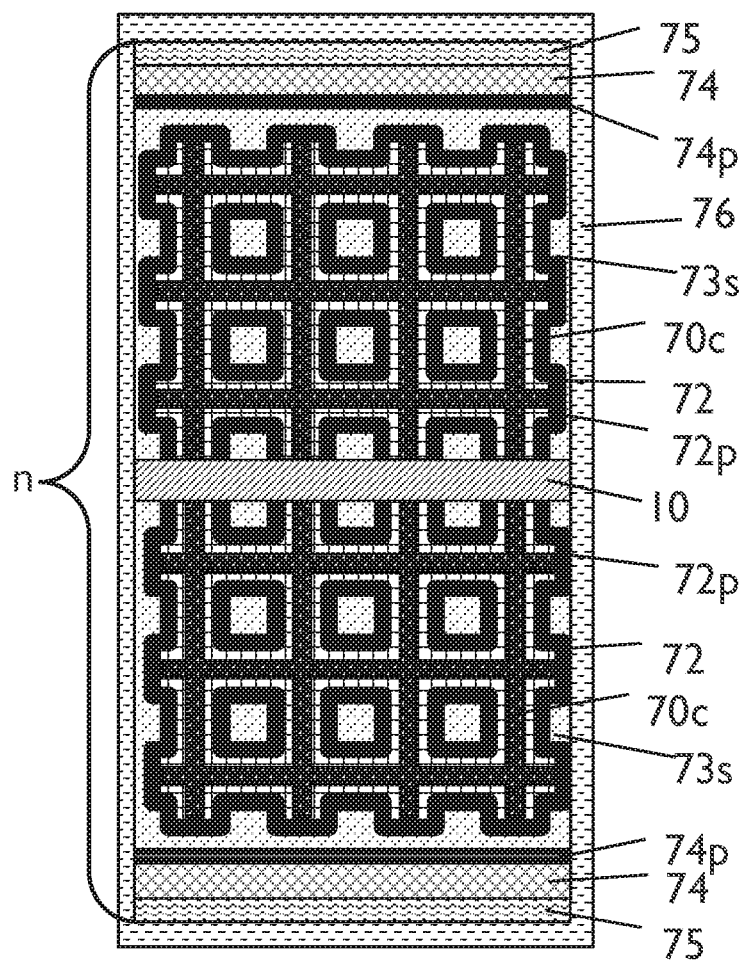
FIG. 23 schematically shows a cross section of an example of solid-state battery cells, according to example embodiments.
Figure 24:
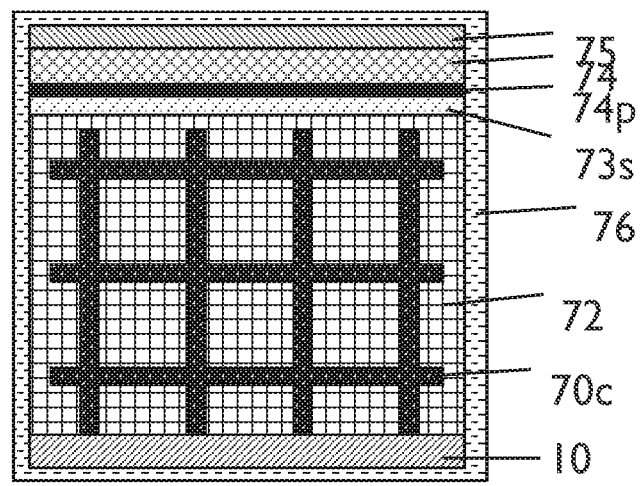
FIG. 24 schematically shows a cross section of an example of solid-state battery cells, according to example embodiments.
Figure 25:
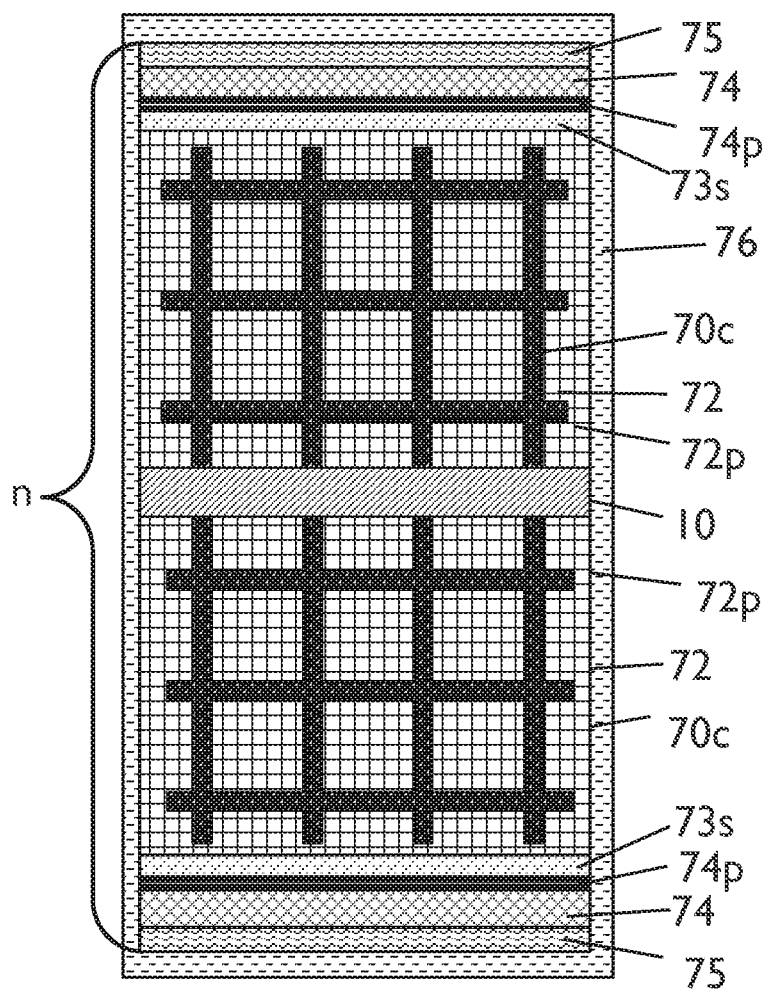
FIG. 25 schematically shows a cross section of an example of solid-state battery cells, according to example embodiments.

The protected cathode nano-mesh 70c (i.e. the cathode nano-mesh 70c covered with the interlayer) was then subjected to coating 405 with the cathode precursor consisting of, for example, electrolytic manganese oxide (EMD or MnO$_x$). The deposition could be carried out from 0.3 M MnSO$_4$+0.55 M H$_2$SO$_4$ at 30° C. at the anodic current density of 100 mA/cm$^2$. The time of the plating could be adjusted to either conformally coat the nanowires and leave some degree of the space inside of the electrode empty, as depicted in FIG. 22 and FIG. 23, or to completely fill up the free space inside of the electrode, as depicted in FIG. 24 and FIG. 25. For example, deposition for 40 s gave a conformal coating of the nanowires with 10 nm of MnO$_x$ precursor while the deposition for 120 s resulted in complete filling of the spacing between the nanowires. The design in FIG. 22 and FIG. 23 may achieve a high power density of the battery cell. The design in FIG. 24 and FIG. 25 may achieve a high energy density of the battery cell. The above notwithstanding, the design in FIG. 24 and FIG. 25 is in principle applicable to the nanowire networks of 5 μm thickness or less, so as to minimize the diffusion resistance of the lithium ions within the bulk of the active material; such design could therefore be used in microbattery applications.

The electrode was then subjected 406 to a lithiation step. First, a lithium-containing precursor, such as lithium carbonate, was impregnated within the sample. The impregnation could be done by, for example, drop casting or atomic layer deposition. The atomic layer deposition could be done using a sequence of pulsing steps with, for example, lithium tert-butoxide, water and carbon dioxide reactants. The ALD could be done for the total number of cycles dependent on the desired lithium carbonate thickness, for example 87 cycles yielded 2 nm of lithium carbonate. The deposition was performed at the temperature of 200° C.-250° C., for example 250° C.

Following the immersion with the lithium precursor, the sample was annealed for 2 h at a temperature between 250° C. and 350° C., for example, 280° C. to introduce lithium into the structure of the cathode precursor, so as to form the cathode active material 72 (e.g. the first layer of active electrode material 72). Following the annealing, the sample was washed with water to remove any by-products of the reaction.

Following the deposition of the cathode active material 72, the layer of cathode active material 72 could be subjected 407 to an optional protective step, forming a cathode protective layer 72p. This could be an atomic layer deposition of a thin layer of, for example, lithium phosphorous oxynitride (LiPON), aluminum oxide, or titanium oxide. The deposition of titanium dioxide could be done using titanium(IV) tetramethoxide and water precursors. The layer could have a thickness of, for example, 2 nm or less.

The cathode was then subjected 408 to impregnation with a solid electrolyte 73s. The solid electrolyte 73s may consist of, for example, a nanostructured silica matrix with a lithium salt. The solid electrolyte 73s could be prepared by mixing a silicon dioxide precursor (e.g. tetraethyl orthosilicats, TEOS) with an ionic liquid (e.g. 1-butyl-1-methylpyrrolidinium bis(trifluoromethylsulfonyl)imide, BMP-TFSI) and a lithium salt (e.g. lithium bis(trifluoromethylsulfonyl)amine, LiTFSI). Such mixture was poured into the nano-mesh electrode 70c and left for gellification and drying in air or vacuum. The volume of the electrolyte 73s was adjusted to form a layer over the top of the cathode, for example with a thickness of 5 μm.

In an alternative approach, the electrolyte consisted of a lithium-containing glass, for example lithium phosphorous oxynitride (LiPON). The material could be deposited on the cathode using, for example, ion sputtering, plasma-assisted ion sputtering or atomic layer deposition. The deposition time was adjusted to form a layer of the electrolyte on top of the cathode, for example with a thickness of 1 μm.

After depositing 408 the solid electrolyte 73s, it could be optionally coated 409 using physical- or chemical vapor deposition, with a protective layer 74p (e.g. an anode protective layer 74p), such as LiPON, Al, $Al_2O_3$, LiF, $Li_3N$, or $TiO_2$. The layer could be made substantially thin, in the range of 1-100 nm, for example 5 nm.

In one example, the anode active material 74 (e.g. the second layer of active electrode material 74) was then deposited 410 on top of the solid electrolyte 73s, or on top of the protective layer 74p if present. The anode active material 74 could consist of, for example, Li, Si, Sn, Ge, C, $TiO_2$, $Li_4Ti_5O_{12}$, Na, K, or Mg. The deposition could be done using, for example, ion sputtering or evaporation. The thickness of the anode active material 74 was adjusted to match the energy capacity of the cathode. For example, a 40 μm thick nano-mesh 70c coated with 10 nm of $Li_2Mn_2O_4$ 72 may include at least 6 μm of metallic lithium 74 as an anode to match the capacity of the cathode.

The anode active material 74 was then coated 411 with the anode current collector 75 (e.g. a second current collector 75), for example with copper or TiN. The coating could be done by physical vapor deposition, atomic layer deposition or pressing of a material foil on top of the anode active material 74.

In another example, the anode active material 74 was not deposited on top of the electrolyte 73s and the electrolyte 73s was directly put in contact with the anode current collector 75. In that case, the anode active material 74 was in-situ deposited on the anode current collector 75 during charging of the battery. This may consist of, for example, plating metallic lithium from the electrolyte 73s directly on the anode current collector 75 by application of the positive polarity to the anode and negative polarity to the cathode.

After depositing 411 the anode current collector 75, the battery cells could be stacked 412 multiple times one on the other (n in FIG. 21, FIG. 23 and FIG. 25), providing a battery stack with increased energy density.

Finally, the battery cell or the battery stack was encapsulated 413 in a packaging material 76, not permeable to water or air. The encapsulation layer 76 could consist of, for example, SiN (in case of the single battery cell; FIG. 22) or a pouch (in case of a battery stack; FIG. 23).

Example 2: Fabrication of a 3D-3D Battery Using a Solid Electrolyte

Figure 26:
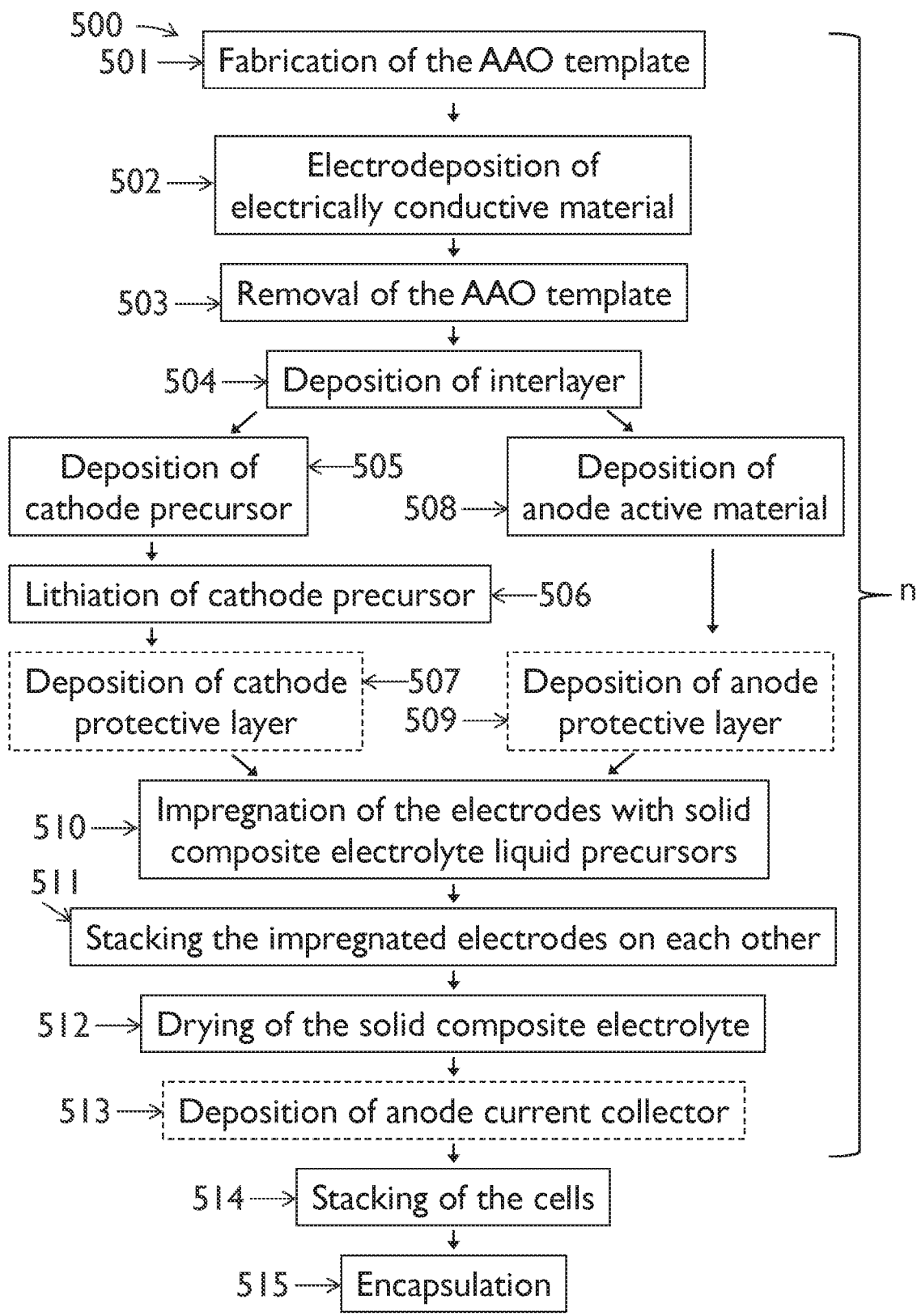
FIG. 26 illustrates an example process sequence of a method for fabricating solid-state battery cells and/or solid-state batteries, according to example embodiments.

A flow-chart of different steps in a method 500 is shown in FIG. 26.

A 40 μm thick aluminum layer doped with 0.2 at. % copper was anodized 501 in 0.3 M oxalic acid at 30° C. and 40 V. The anodization was performed for 220 min to form a 40 μm thick AAO template supported by a 5 μm non-anodized aluminum layer 10. This structure could be used to fabricate one-sided nano-mesh-based electrodes, represented in FIG. 27.

Alternatively, a 80 μm thick aluminum layer doped with 0.2 at. % copper was anodized 501 on both sides in 0.3 M oxalic acid at 30° C. and 40 V. The anodization was performed for 220 min to form 40 μm thick AAO templates on both sides of the remaining (e.g. 5 μm) non-anodized aluminum layer 10. This structure could be used to fabricate double-sided nano-mesh-based electrodes, represented in FIG. 28.

The template was subjected to protective treatment by annealing at 500° C. for 12 h in air. Following that, a second anodization was applied in oxalic acid with addition of isopropanol, at 40 V for 60 s. After that, the template's barrier layer was etched from the channel bottoms with 5% orthophosphoric acid at 30° C. during 40 min. After that, an electrically conductive material (e.g. a metal) was electrodeposited 502 inside the template, thereby forming a plurality of spaced electrically conductive structures, more in particular a plurality of spaced nanowires forming a nano-mesh structure. When the nano-mesh was made of nickel, the plating was done from a 0.6 M nickel(II) sulfamate+0.6 M boric acid bath, using a cathodic current density of 10 mA/cm², at 30° C. to form an approximately 40 μm thick nano-mesh network. Following that, the AAO template was removed 403 using an $Al_2O_3$ selective etchant. The etchant could consist for example of a 1.6% $HCrO_4$+5% $H_3PO_4$ mixture and the etching could be performed at 30° C. for 1 h. Alternatively, 0.5 M $NH_4F$ in glacial acetic acid could be used to selectively etch $Al_2O_3$ over the non-anodized aluminum substrate 10 and nickel nano-mesh, at 20° C. for 1 h.

Two such nano-mesh structures were fabricated: one for forming a cathode electrode (cathode nano-mesh 70c) and another one for forming an anode electrode (anode nano-mesh 70a). The cathode nano-mesh 70c was to be impregnated with cathode active material 72 to form a battery cathode and the anode nano-mesh 70a was to be impregnated with the anode active material 74 for forming a battery anode. The anode nano-mesh 70a could consist of, for example, a copper nano-mesh or nickel nano-mesh. The cathode nano-mesh 70c could consist of, for example, a nickel nano-mesh, chromium nano-mesh, or aluminum nano-mesh. In the rest of this example, nickel was used as a material for the nano-mesh in both the cathode and the anode case.

The cathode nano-mesh 70c was then subjected 504 to deposition of an interlayer comprising, for example, anodization in a 0.4 M sodium citrate solution at 50 mA/cm$^2$ and 20° C. for one minute.

In another example, the cathode nano-mesh 70c was subjected 504 to deposition of an interlayer comprising 5 cycles of: immersing in 0.1 M solution of propargyl alcohol, washing with water, immersing in 0.1 M solution of potassium permanganate and washing with water.

The protected cathode nano-mesh 70c (i.e. the cathode nano-mesh 70c coated with the interlayer) was then subjected to coating 505 with the cathode precursor consisting of, for example, electrolytic manganese oxide (EMD or MnO$_x$). The deposition could be carried out from 0.3 M MnSO$_4$+0.55 M H$_2$SO$_4$ at 30° C. at the anodic current density of 100 mA/cm$^2$. For example, deposition for 40 s gave a conformal coating of the nanowires with 10 nm of MnO$_x$ precursor.

The electrode was then subjected 506 to a lithiation step. First, lithium-containing precursor, such as lithium carbonate, was impregnated within the sample. The impregnation could be done by, for example, drop casting or atomic layer deposition. The atomic layer deposition could be done using a sequence of pulsing steps with, for example, lithium tert-butoxide, water, and carbon dioxide reactants. The ALD could be done for the total number of cycles dependent on the desired lithium carbonate thickness, for example 87 cycles yielded 2 nm of lithium carbonate. The deposition was performed at the temperature of 200° C.-250° C., for example 250° C.

Following the immersion with the lithium precursor, the sample was annealed for 2 h at a temperature between 250° C. and 350° C., for example, 280° C. to introduce lithium into the structure of the cathode precursor, so as to form the cathode active material 72 (e.g. the first layer of active electrode material 72). Following the annealing, the sample was washed with water to remove any by-products of the reaction.

Following the deposition of the cathode active material 72, the layer of cathode active material 72 could be subjected 507 to an optional protective step, forming a cathode protective layer 72p. This could be an atomic layer deposition of a thin layer of, for example, lithium phosphorous oxynitride (LiPON), aluminum oxide, or titanium oxide. The deposition of titanium dioxide could be done using titanium(IV) tetramethoxide and water precursors. The layer could have a thickness of, for example, 2 nm or less.

The anode nano-mesh 70a could also optionally be subjected 504 to the deposition of an interlayer comprising, for example, anodization in a 0.4 M sodium citrate solution at 50 mA/cm$^2$ and 20° C. for one minute.

In one example, the anode nano-mesh 70a, or the interlayer if present, was then subjected to coating 508 with an anode active material 74 (e.g. the second layer of active electrode material 74), or with an anode precursor material consisting of e.g. titanium dioxide, tin dioxide or metallic lithium. The deposition could be done using, for example, electrodeposition or atomic layer deposition. The ALD of TiO$_2$ could be done using titanium(IV) tetramethoxide and water precursors.

Following the deposition 508 of the anode active material 74, the layer of anode active material 74 could be subjected 509 to an optional protective step. The protective layer 74p (e.g. the anode protective layer 74p) so provided could consist of atomic layer deposition of a thin layer of, for example, LiPON, Al, Al$_2$O$_3$, LiF, Li$_3$N, or TiO$_2$. The layer could have a thickness of, for example, 2 nm or less.

Both the anode and the cathode are then subjected to impregnation 510 with a solid electrolyte 73s. The solid electrolyte 73s may consist of, for example, a nanostructured silica matrix with a lithium salt. The solid electrolyte 73s could be prepared by mixing a silicon dioxide precursor (e.g. tetraethyl orthosilicats, TEOS) with an ionic liquid (e.g. 1-butyl-1-methylpyrrolidinium bis(trifluoromethylsulfonyl) imide, BMP-TFSI) and a lithium salt (e.g. lithium bis (trifluoromethylsulfonyl)amine, LiTFSI). Such mixture was poured into the nano-mesh electrodes 70c and 70a. The volume of the electrolyte 73s was adjusted to form a layer over the top of the cathode, for example 5 μm thick.

In another example, the anode nano-mesh 70a was not coated with anode active material 74 and the electrolyte 73s was directly put in contact with the anode nano-mesh 70a. In that case, the anode active material 74 was in-situ deposited on the anode nano-mesh 70a during charging of the battery. This may consist of, for example, plating metallic lithium from the electrolyte 73s directly on the anode nano-mesh 70a by application of the positive polarity to the anode and negative polarity to the cathode.

Figure 27:
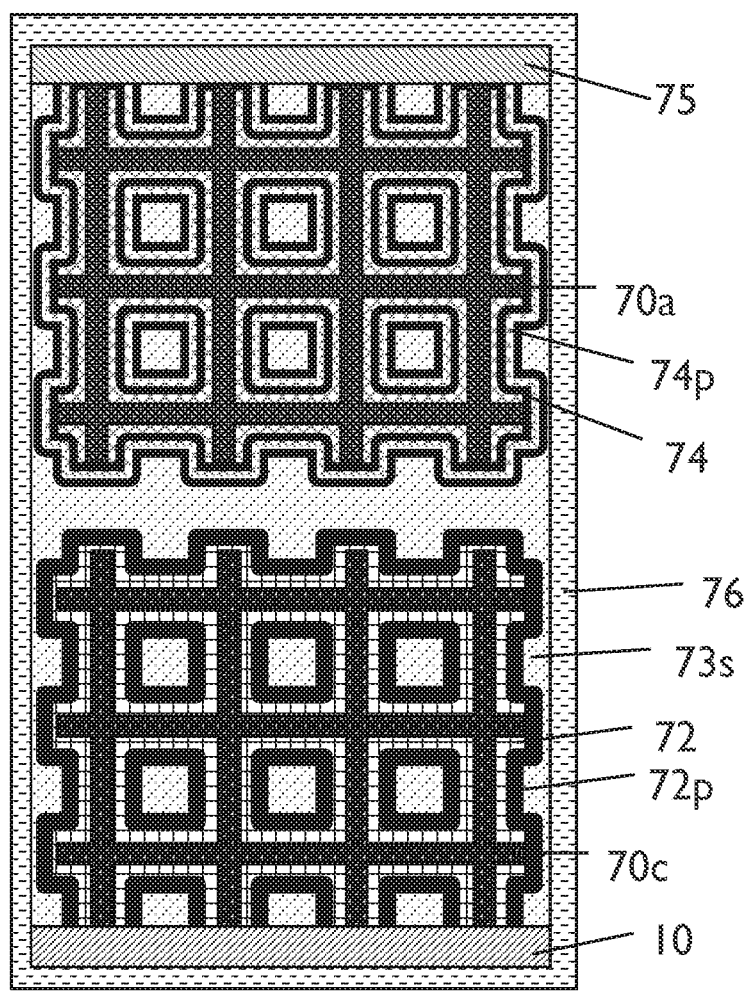
FIG. 27 schematically shows a cross section of an example of solid-state battery cells, according to example embodiments.
Figure 28:
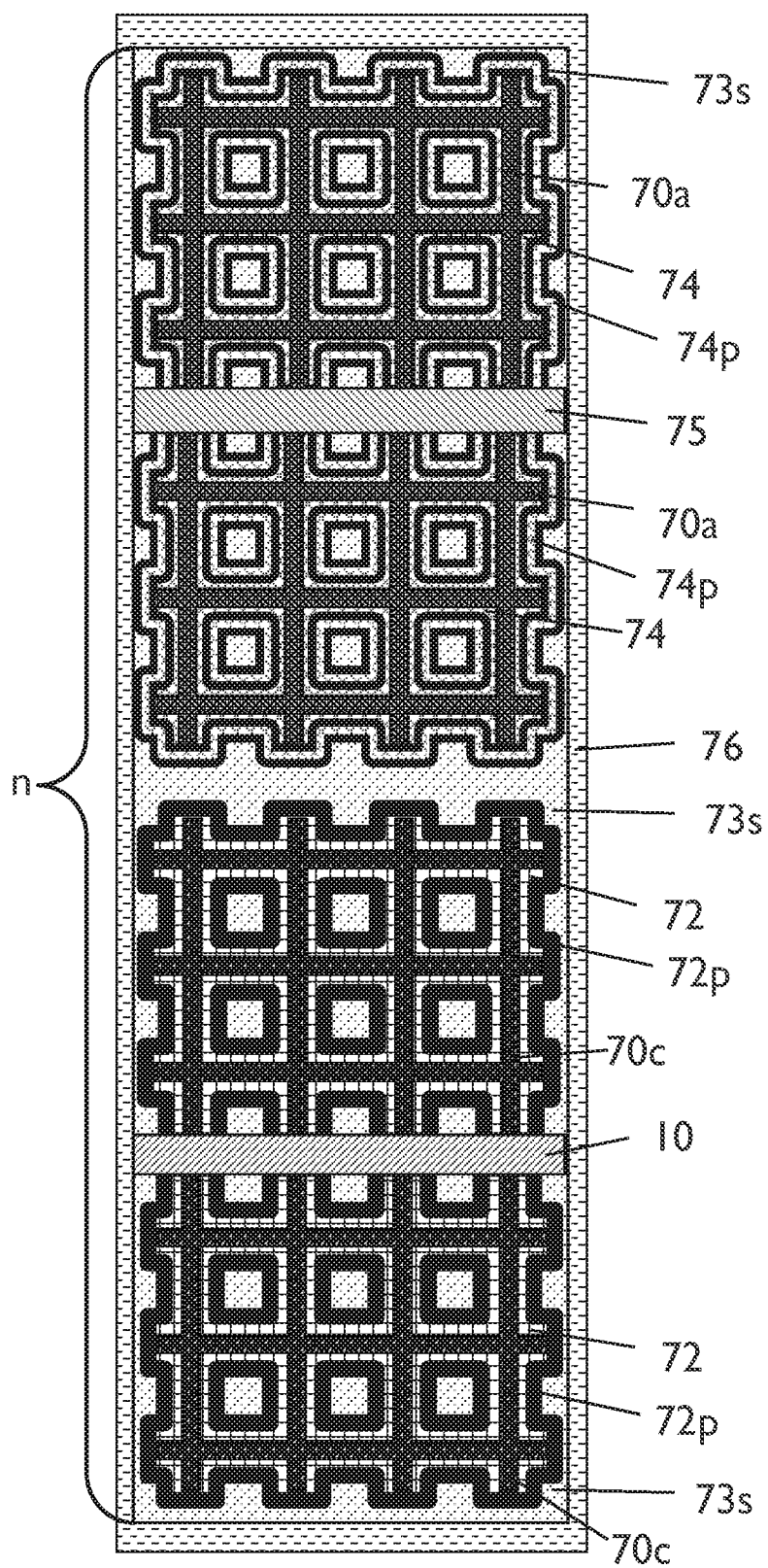
FIG. 28 schematically shows a cross section of an example of solid-state battery cells, according to example embodiments.

The anode nano-mesh 70a was then stacked 511 on top of the cathode nano-mesh 70c (as depicted in FIG. 27 and FIG. 28). The high viscosity of the solid electrolyte 73s mixture prevents the electrodes from contacting each other, i.e. a layer of solid electrolyte 73s remains in between the anode and the cathode such that there is no direct contact between both electrodes. The stacked electrodes are left for gelification and drying 512 of the electrolyte, in air or in vacuum.

In embodiments wherein the fabrication of the template 501 comprises single-side anodization of an aluminum layer, as illustrated in FIG. 27, an anode current collector 75 is deposited 513 after stacking 511 and drying 512. In embodiments wherein the fabrication of the template 501 comprises double-side anodization of an aluminum layer, there is no need for depositing an anode current collector 75. In such embodiments, the remaining non-anodized aluminum layer functions as an anode collector 75, as illustrated in FIG. 28.

Next, the battery cells could be stacked 514 multiple times one on the other (n in FIG. 26 and FIG. 28), providing a battery stack with increased energy density.

Finally, the battery cell or the battery stack was encapsulated 515 in a packaging material 76, not permeable to water or air. The encapsulation layer 76 could consist of, for example, SiN (in case of the single battery cell; FIG. 27) or a pouch (in case of a battery stack; FIG. 28).

Example 3: Fabrication of a 3D-3D Battery Using a Liquid Electrolyte

Figure 29:
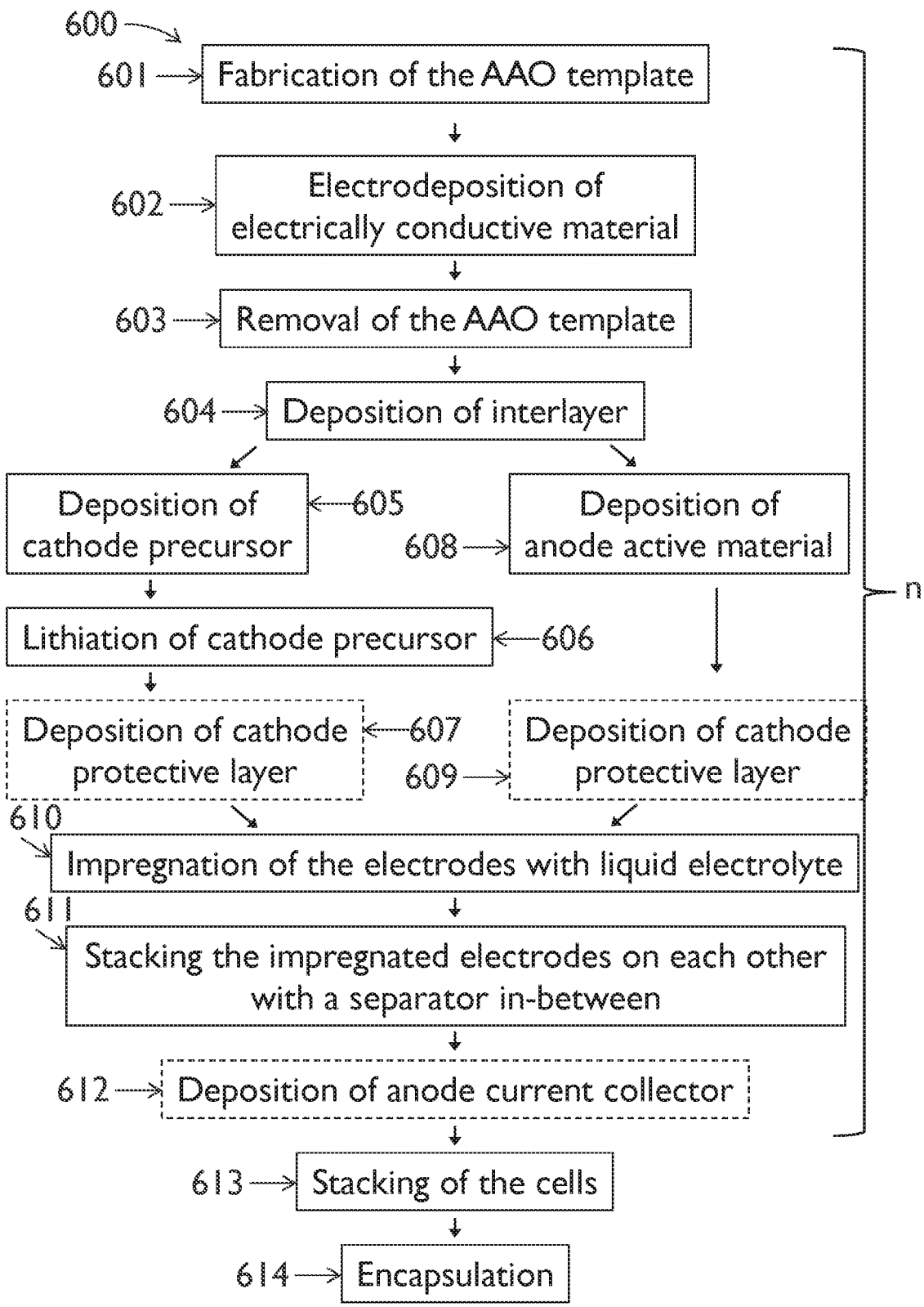
FIG. 29 illustrates an example process sequence of a method for fabricating solid-state battery cells and/or solid-state batteries, according to example embodiments.

A flow-chart of different steps in a method 600 is shown in FIG. 29. Method 500 was repeated, but a liquid electrolyte 731 was used; as opposed to the solid electrolyte 73s. Steps 601 to 609 were analogous to steps 501 to 509.

Figure 30:
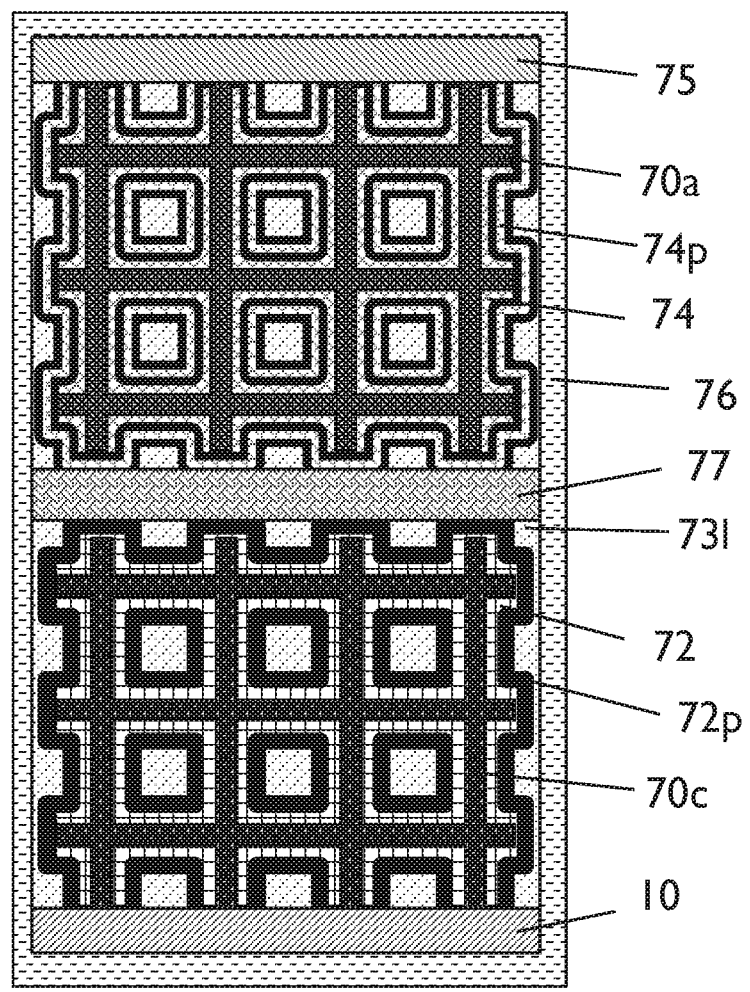
FIG. 30 schematically shows a cross section of an example of solid-state battery cells, according to example embodiments.
Figure 31:
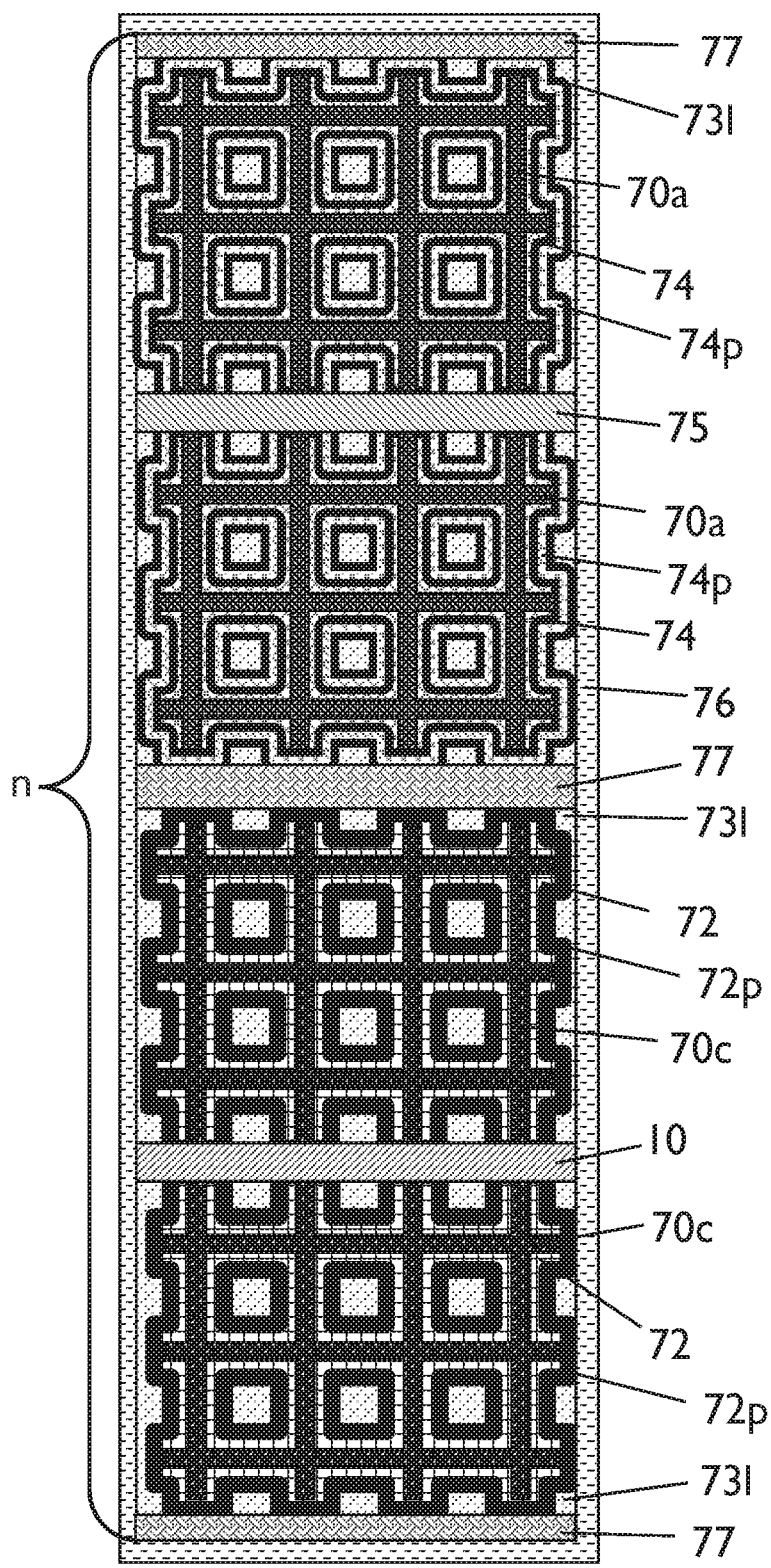
FIG. 31 schematically shows a cross section of an example of solid-state battery cells, according to example embodiments.

Impregnation 610 of the electrodes with the liquid electrolyte 731 could for example be with a 1 M solution of $LiPF_6$ in propylene carbonate and ethylene carbonate. In order to prevent direct contact between the anode and the cathode, a thin porous separator 77 made of, for example, a cellulose membrane or perforated cellulose membrane was put on the cathode nano-mesh 70c before stacking 611 it with the anode nano-mesh 70a. The anode nano-mesh was then put 611 on top of the separator 77, as depicted in FIG. 30. Such battery cells could also be stacked multiple times on top of each other (n in FIG. 29 and FIG. 31) to form a high energy density battery stack.

Example 4: Fabrication of a Full 3D Battery

Figure 32:
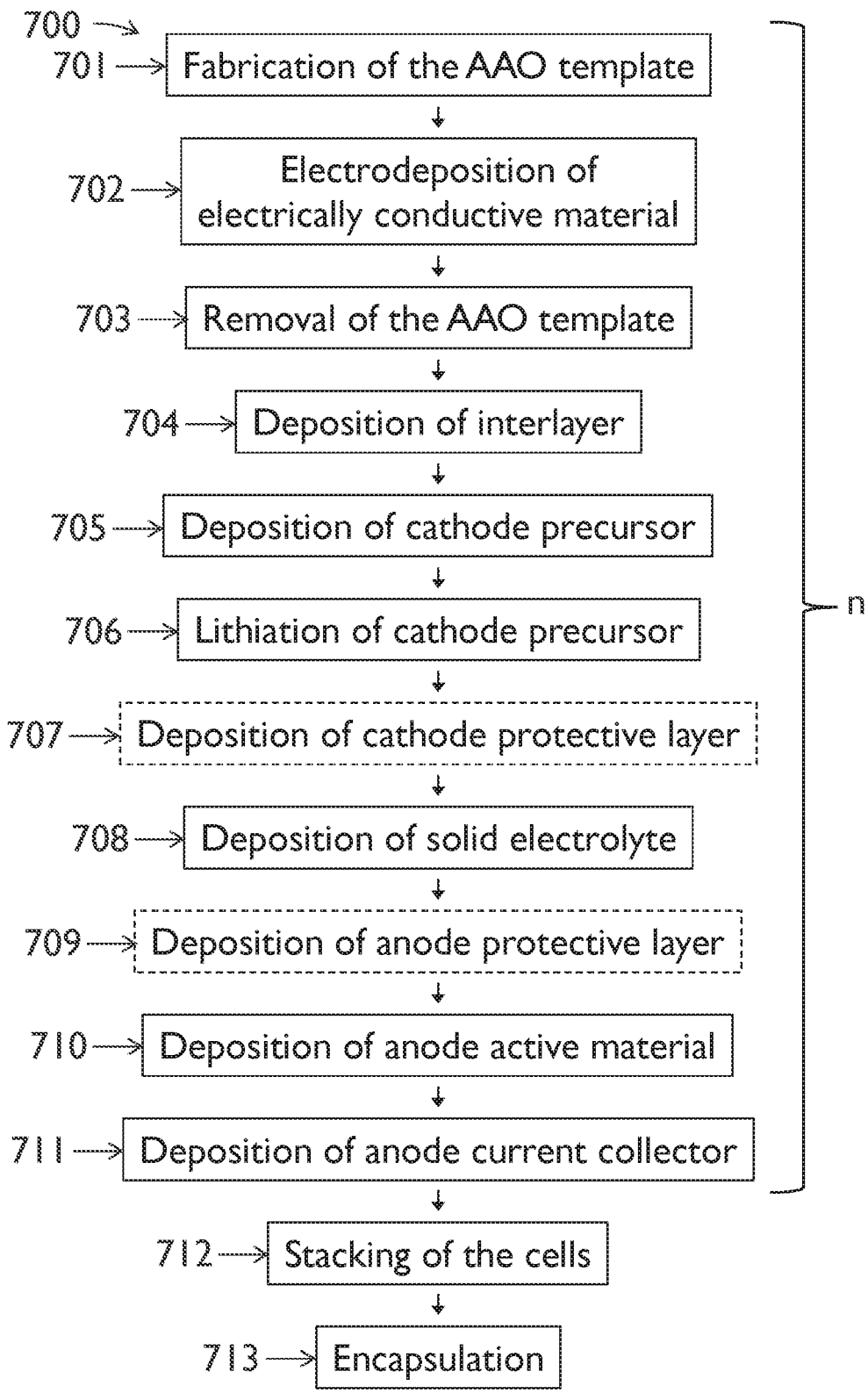
FIG. 32 illustrates an example process sequence of a method for fabricating solid-state battery cells and/or solid-state batteries, according to example embodiments.

A flow-chart of different steps in a method 700 is shown in FIG. 32.

A 40 μm thick aluminum layer doped with 0.2 at. % copper was anodized 701 in 0.3 M oxalic acid at 30° C. and 40 V. The anodization was performed for 220 min to form a 40 μm thick AAO template supported by a 5 μm non-anodized aluminum layer 10. This structure could be used to fabricate one-sided nano-mesh-based electrodes, represented in FIG. 33.

Alternatively, a 80 μm thick aluminum layer doped with 0.2 at. % copper was anodized 701 on both sides in 0.3 M oxalic acid at 30° C. and 40 V. The anodization was performed for 220 min to form 40 μm thick AAO templates on both sides of the remaining (e.g. 5 μm) non-anodized aluminum layer 10. This structure could be used to fabricate double-sided nano-mesh-based electrodes, represented in FIG. 34.

The template was subjected to protective treatment by annealing at 500° C. for 12 h in air. Following that, a second anodization was applied in oxalic acid with addition of isopropanol, at 40 V for 60 s. After that, the template's barrier layer was etched from the channel bottoms with 5% orthophosphoric acid at 30° C. during 40 min. After that, an electrically conductive material (e.g. a metal) 70c was electrodeposited 702 inside the template, thereby forming a plurality of spaced electrically conductive structures, more in particular a plurality of spaced nanowires forming a nano-mesh structure. When the nano-mesh 70c was made of nickel, the plating was done from a 0.6 M nickel(II) sulfamate+0.6 M boric acid bath, using a cathodic current density of 10 $mA/cm^2$, at 30° C. to form approximately 40 μm thick nano-mesh network 70c. Following that, the AAO template was removed 703 using an $Al_2O_3$ selective etchant. The etchant could consist of for example a 1.6% $HCrO_4$+5% $H_3PO_4$ mixture and the etching could be performed at 30° C. for 1 h. Alternatively, 0.5 M $NH_{4F}$ in glacial acetic acid could be used to selectively etch $Al_2O_3$ over the non-anodized aluminum substrate 10 and nickel nano-mesh 70c, at 20° C. for 1 h.

The cathode nano-mesh 70c was then subjected 704 to deposition of an interlayer comprising, for example, anodization in a 0.4 M sodium citrate solution at 50 $mA/cm^2$ and 20° C. for one minute.

In another example, the cathode nano-mesh 70c was subjected 704 to deposition of an interlayer comprising 5 cycles of: immersing in 0.1 M solution of propargyl alcohol, washing with water, immersing in 0.1 M solution of potassium permanganate and washing with water.

The protected cathode nano-mesh 70c (i.e. the cathode nano-mesh 70c coated with the interlayer) was then subjected to coating 705 with the cathode precursor consisting of, for example, electrolytic manganese oxide (EMD or $MnO_x$). The deposition was carried out from 0.3 M $MnSO_4$+ 0.55 M $H_2SO_4$ at 30° C. at the anodic current density of 100 $mA/cm^2$. For example, deposition for 20 s gave conformal coating of the nanowires with 5 nm of $MnO_x$ precursor.

The electrode was then subjected 706 to a lithiation step. First, lithium-containing precursor, such as lithium carbonate, was impregnated within the sample. The impregnation could be done by, for example, drop casting or atomic layer deposition. The atomic layer deposition could be done using the sequence of pulsing steps with, for example, lithium tert-butoxide, water, and carbon dioxide reactants. The ALD could be done for the total number of cycles dependent on the desired lithium carbonate thickness, for example 87 cycles yielded 2 nm of lithium carbonate. The deposition was performed at the temperature of 200° C.-250° C., for example 250° C.

Following the immersion with the lithium precursor, the sample was annealed for 2 h at temperature between 250° C. and 350° C., for example, 280° C. to introduce lithium into the structure of the cathode precursor, so as to form the cathode active material 72 (e.g. the first layer of active electrode material 72). Following the annealing, the sample was washed with water to remove any by-products of the reaction.

Following the deposition of the cathode active material 72, the layer of cathode active material 72 could be subjected 707 to an optional protective step, forming a cathode protective layer 72p. This could be an atomic layer deposition of a thin layer of, for example, lithium phosphorous oxynitride (LiPON), aluminum oxide, or titanium oxide. The deposition of titanium dioxide could be done using titanium(IV) tetramethoxide and water precursors. The layer could have a thickness of, for example, 2 nm or less.

Following that, the cathode active material 72 was coated 708 with a thin layer of a solid electrolyte 73s. The solid electrolyte 73s could consist of, for example, lithium phosphorous oxynitride (LiPON), deposited using atomic layer deposition. The layer thickness was adjusted to be at least 10 nm.

Following the deposition of the solid electrolyte 73s, it could optionally be subjected 709 to a protective step. The protection could consist of an atomic layer deposition of a thin layer of, for example, LiPON, Al, $Al_2O_3$, LiF, $Li_3N$, or $TiO_2$. The layer could have a thickness of, for example, 2 nm or less.

In one example, next, the anode active material 74 was deposited 710 on the electrolyte 73s, or on top of the protective layer if present. The anode active material 74 could be, for example, titanium dioxide, tin dioxide, or metallic lithium. The deposition could be done using, for example, atomic layer deposition. The ALD of $TiO_2$ could be done using titanium(IV) tetramethoxide and water precursors. The thickness of the layer could be adjusted to, for example 5 nm.

The anode active material 74 was then coated 711 with the anode current collector 75 (e.g. a second current collector 75), for example TiN. The coating could be done by physical vapor deposition or atomic layer deposition. The coating could be done to fill the remaining empty space inside the battery structure.

In another example, the electrolyte 73s was not coated with anode active material 74, but instead it was directly put in contact with the anode current collector 75. In that case, the anode active material 74 was in-situ deposited on the anode current collector 75 during charging of the battery.

This may consist of, for example, plating metallic lithium from the electrolyte 73s directly on the anode current collector 75 by application of the positive polarity to the anode and negative polarity to the cathode.

After depositing 711 the anode current collector 75, the battery cells could be stacked 712 multiple times one on each other (n in FIG. 32 and FIG. 34), providing a battery stack with increased energy density.

Figure 33:
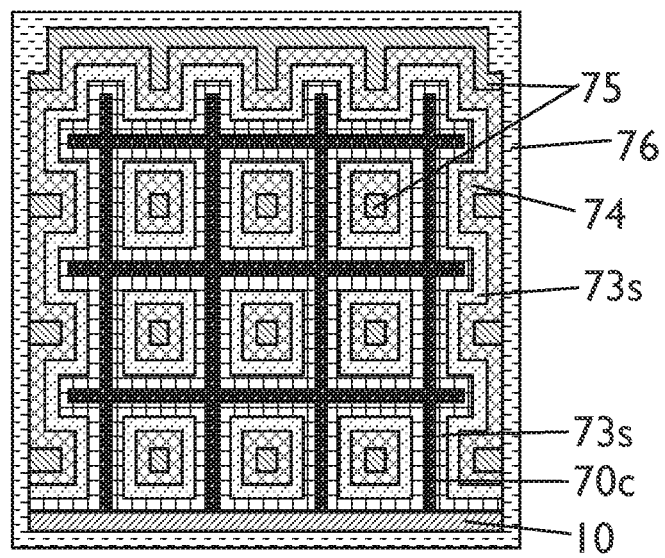
FIG. 33 schematically shows a cross section of an example of solid-state battery cells, according to example embodiments.
Figure 34:
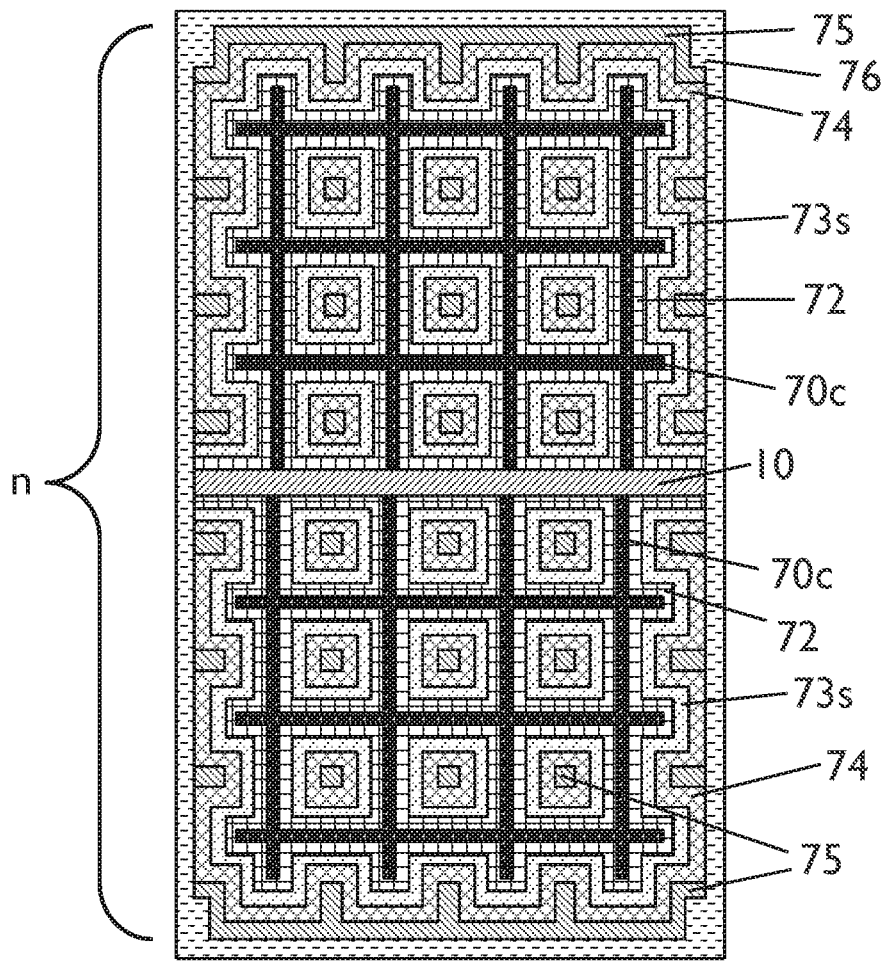
FIG. 34 schematically shows a cross section of an example of solid-state battery cells, according to example embodiments.

Finally, the battery cell or the battery stack was encapsulated 713 in a packaging material 76, not permeable to water or air. The encapsulation layer 76 could consist of, for example, SiN (in case of the single battery cell; FIG. 33) or a pouch (in case of a battery stack; FIG. 34). The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

It is to be understood that although embodiments, specific constructions and configurations, as well as materials, have been discussed herein for methods and devices according to the present disclosure various changes or modifications in form and detail may be made without departing from the scope of this disclosure. For example, steps may be added or deleted to methods described within the scope of the present disclosure.

Whereas the above detailed description as well as the summary of the disclosure has been focused on a method for fabricating a device, the present disclosure also relates to a device comprising patterned layers obtained using a method according to any of the embodiments as described above.

The invention claimed is:

1. A method for fabricating a solid-state battery cell, the method comprising:
   forming a plurality of spaced electrically conductive structures on a substrate, wherein forming the plurality of spaced electrically conductive structures on the substrate comprises transforming at least part of a valve metal layer into a template comprising a plurality of spaced channels aligned longitudinally along a first direction, and wherein transforming at least part of the valve metal layer into the template comprises:
      a first anodization step, which anodizes at least part of the valve metal layer in a thickness direction to form a porous layer of valve metal oxide comprising a plurality of channels, wherein each channel comprises channel walls aligned longitudinally along the first direction and a channel bottom, wherein the channel bottom is coated with a first insulating metal oxide barrier layer as a result of the first anodization step;
      a protective treatment that induces hydrophobic surfaces to the channel walls and channel bottoms;
      a second anodization step after the protective treatment, which substantially removes the first insulating metal oxide barrier layer from the channel bottoms to induce anodization only at the bottoms of the plurality of channels and create a second insulating metal oxide barrier layer at the channel bottoms; and
      an etching step in an etching solution, wherein the etching step removes the second insulating metal oxide barrier layer from the channel bottoms, the method further comprising:
   depositing a solid functional material within the channels of the template to form the plurality of spaced structures inside the plurality of channels, wherein the plurality of spaced structures are aligned longitudinally along the first direction;
   forming a first layer of active electrode material on the plurality of spaced electrically conductive structures, wherein the first layer of active electrode material conformally coats surfaces of the plurality of spaced electrically conductive structures;
   depositing an electrolyte layer over the first layer of active electrode material; and
   forming a second layer of active electrode material over the electrolyte layer, wherein:
      the first layer of active electrode material forms a cathode layer of the solid-state battery cell and the second layer of active electrode material forms an anode layer of the solid-state battery cell; or
      the second layer of active electrode material forms the cathode layer of the solid-state battery cell and the first layer of active electrode material forms the anode layer of the solid-state battery cell.

2. The method for according to claim 1, wherein the valve metal layer comprises a layer of aluminum, an aluminum alloy, titanium, a titanium alloy, tantalum, or a tantalum alloy.

3. The method according to claim 1, wherein the protective treatment comprises annealing at a temperature between 300° C. and 550° C.

4. The method according to claim 1, wherein the protective treatment comprises depositing a protective layer on the channel walls and on the channel bottoms, and wherein the second anodization step further comprises removing the protective layer only from the channel bottoms.

5. The method according to claim 4, wherein the protective layer comprises hydrophobic silane or a polymer that is resistant to the etching solution.

6. The method according to claim 4, wherein the protective layer comprises polystyrene, poly(methyl 2-methylpropanoate), or poly(dimethylsiloxane).

7. The method according to claim 1, wherein the etching solution is an aqueous etching solution comprising phosphoric acid, sulfuric acid, oxalic acid, chromic acid, ammonia, hydrogen peroxide, or potassium hydroxide.

8. The method according to claim 1, wherein the etching solution comprises a surface tension adjusting agent.

9. The method according to claim 1, further comprising providing ultrasonic waves during the second anodization step.

10. The method according to claim 1, wherein the first anodization step anodizes only a part of the valve metal layer in the thickness direction, to thereby form the template and a substrate supporting the template, and wherein the substrate comprises a remaining, non-anodized part of the valve metal layer.

11. The method according to claim 1, wherein depositing the solid functional material comprises depositing an electrically conductive material, a semiconductor material, or an electrically insulating material.

12. The method according to claim 1, wherein forming the first layer of active electrode material comprises:
   depositing an interlayer on the substrate, wherein the interlayer comprises a transition metal oxide, a noble metal, or a noble-metal oxide, and wherein the interlayer has a thickness between 0.5 nm and 30 nm;

depositing a functional material precursor layer on the interlayer; and activating the functional material precursor layer by annealing in order to form the layer of functional material.

13. The method of claim 1, wherein the protective treatment is performed after the first anodization step.

14. A method for fabricating a solid-state battery cell, the method comprising:

forming a plurality of spaced electrically conductive structures on a substrate;

forming a first layer of active electrode material on the plurality of spaced electrically conductive structures, wherein forming the first layer of active electrode material on the plurality of spaced electrically conductive structures comprises:

depositing an interlayer on the substrate, wherein the interlayer comprises a transition metal oxide, a noble metal, or a noble-metal oxide, and wherein the interlayer has a thickness in the range between 0.5 nm and 30 nm;

depositing a functional material precursor layer on the interlayer; and activating the functional material precursor layer by annealing in order to form the layer of functional material, wherein the first layer of active electrode material conformally coats surfaces of the plurality of spaced electrically conductive structures;

depositing an electrolyte layer over the first layer of active electrode material; and forming a second layer of active electrode material over the electrolyte layer, wherein:

the first layer of active electrode material forms a cathode layer of the solid-state battery cell and the second layer of active electrode material forms an anode layer of the solid-state battery cell; or the second layer of active electrode material forms the cathode layer of the solid-state battery cell and the first layer of active electrode material forms the anode layer of the solid-state battery cell.

15. The method according to claim 14, wherein depositing the functional material precursor layer comprises depositing an electrode material precursor layer, and wherein activating the functional material precursor layer comprises annealing with an ion containing precursor present, thereby forming a layer of active electrode material.

16. The method according to claim 14, wherein depositing the functional material precursor layer comprises anodic electrodeposition.

17. The method according to claim 14, wherein the electrically conductive substrate is a transition metal substrate.

18. The method according to claim 14, wherein the electrically conductive substrate is a three-dimensional substrate comprising a plurality of electrically conductive structures being aligned longitudinally along a first direction.

19. The method according to claim 18, wherein the electrically conductive substrate further comprises a plurality of electrically conductive interconnecting structures oriented along a second direction different from the first direction.

20. The method according to claim 14, wherein the interlayer comprises a transition metal oxide and wherein depositing the interlayer comprises electrodeposition in a solution having a pH between 7 and 12.

* * * * *